US007695033B2

(12) United States Patent
Mae et al.

(10) Patent No.: US 7,695,033 B2
(45) Date of Patent: Apr. 13, 2010

(54) IMPACT-ABSORBING DEVICE

(75) Inventors: Hiroyuki Mae, Wako (JP); Toshiharu Yamamoto, Kawasaki (JP)

(73) Assignees: Honda Motor Co., Ltd., Tokyo (JP); Asahi Kasei Engineering Corporation, Tokyo (JP)

( * ) Notice: Subject to any disclaimer, the term of this patent is extended or adjusted under 35 U.S.C. 154(b) by 0 days.

(21) Appl. No.: 11/852,651

(22) Filed: Sep. 10, 2007

(65) Prior Publication Data

US 2008/0061567 A1 Mar. 13, 2008

(30) Foreign Application Priority Data

Sep. 11, 2006 (JP) ............................ 2006-245995
Feb. 14, 2007 (JP) ............................ 2007-033585

(51) Int. Cl.
*B60R 19/03* (2006.01)

(52) U.S. Cl. .................. 293/102; 293/120; 296/187.04

(58) Field of Classification Search ............ 296/187.03, 296/187.02, 187.04, 187.09, 187.1, 187.11, 296/187.12; 293/102, 120, 126, 128; 280/751
See application file for complete search history.

(56) References Cited

U.S. PATENT DOCUMENTS

2007/0284896 A1* 12/2007 Wakabayashi et al. ...... 293/120
2008/0012364 A1* 1/2008 Boggess ..................... 293/120

FOREIGN PATENT DOCUMENTS

JP 10-217880 8/1998
JP 2004-114864 4/2004

* cited by examiner

*Primary Examiner*—Joseph D Pape
(74) *Attorney, Agent, or Firm*—Rankin, Hill & Clark LLP

(57) ABSTRACT

An impact-absorbing device that absorbs impact force when a collision has occurred with an object having relatively low rigidity. The impact-absorbing device is provided with a guide piece that extends in a horizontal direction substantially horizontal to the input direction of the impact, and a movable piece that is movably supported along the guide piece. The guide piece and movable piece deform to absorb impact force when the impact force has acted on the guide piece.

16 Claims, 36 Drawing Sheets

10
12
12a
13
13a
15
16
16a
17
18
20
21
22
23
32
4
4

20
23
22
27
31b
27a
W2
S1
F1
25a
25
25c
33
33(33A)
32
26
31
26a
31a

33(33A)
33
15
16
16a
25d
33
33(33A)
26
S1
W2
31
22
32
23
20
27

53
55
54
56
15
16a
52
26
55
54
27
27a
56
50
31
32
22
26a
51

27
26
60
61
31
32

70
72
23
74
74A
77
75a
75d
75
25c
F1
S2
S3
H2
H3
73
73b
74e
74f
76
81
84
θ
82
74d
81b
74c
81e
81
74a
81c
81d
74
W6
74b
81a 74A
76
73b
74f
S3
S2
74
72
73d
73e
73
73a
F2
F2
14A
14A
74
74e
77
73c
74A 15
16
16a
73f
73d
23
74A
74
94
73a
73
72
70

10
15
43
L
72
70

72
15
73
74
10
70
23
43
74

10
72
15
73
74
77
76
23
23
43
70

10
72
15
73
74
77
76
23
23
74
43
70

102
105
105b
105a
101c
103a
107
103b
74
74
100
101
106
106a
74

106
100
101d
101
103a
103b
101c
107
74
74
74
74
81
102
105a
105
105b 74
101
15
16
103a
81d
101b
81c
104
101a
109
81
103b
81e
15a

74

81d
81a
81c
81
81e
81b
101
101b
103a
104
101a
103b 12
12a
17
131
131a
127
16a
133a
16
113
135
110
15a
114
18
13
133a
10
13a
133
15
132a
132

124
124a
117
128b
131
131a
129
128
127
135
116
122a
121a
128a
133a
121
122
135
133
118
S4
128c
125
135
113
125a
110
114
132a
132

12
187
15a
152
185
186
151
152
152
15
150
152
13
188

12
15a
155
15
13
163
152
161
152
152
162
160

12
15a
172
155
15
172
171
33
13
172
170

172
170
152
173
171
151
152a
172a
152
173
172

180
182
181
183
183
182a
182

IMPACT-ABSORBING DEVICE

FIELD OF THE INVENTION

The present invention relates to an impact-absorbing device that absorbs impacts that act on a vehicle.

BACKGROUND OF THE INVENTION

An automobile is provided with front and rear bumper beams in the front and rear part of a vehicle body, respectively, and the front and rear bumper beams are configured so as to deform and absorb an impact when an impact has acted on the front bumper beam or the rear bumper beam, and the vehicle occupants are protected by the absorption of the impact.

Front and rear bumper beams are provided with an impact-cushioning member for reducing an impact that acts on objects with relatively low rigidity when the automobile has collided with an obstacle (object) having relatively low rigidity. Such an impact-cushioning member is disclosed in Japanese Patent Laid-Open Publication No. 2004-114864 (JP 2004-114864 A).

The impact-cushioning member will be described below using the front bumper, selected from the front and rear bumper beam, as a bumper beam.

The impact-cushioning member is disposed along the lengthwise direction in the front surface of the bumper beam, and the cross-sectional shape is designed so as to deform under a relatively small impact.

The cross-sectional shape is designed so as to deform under a relatively small impact, whereby the impact-cushioning member deforms and cushions an impact that acts on an object having relatively low rigidity when the automobile has collided with an object having relatively low rigidity However, it is difficult to determine the cross-sectional shape of the impact-cushioning member so that impacts that act on objects having a relatively low-rigidity are cushioned.

The impact-cushioning member is preferably also used to reduce impacts on vehicle occupants, as well as cushioning impacts against objects having relatively low rigidity.

However, it is even more difficult to determine the cross-sectional shape of the impact-cushioning member so that the impact-cushioning member can be used to reduce impacts on objects having relatively low rigidity and to also reduce impacts on the vehicle occupants.

Japanese Patent Laid-Open Publication No. 10-217880 (JP 10-217880 A) discloses an impact-cushioning member in which a helically wound impact-absorbing tube is bonded and fixed to the side portion of an impact-absorbing pad, whereby impacts are absorbed first by the impact-absorbing tube alone when an impact has occurred, and the impact is absorbed midway during the impact by the impact-absorbing tube and the impact-absorbing pad.

The impact-absorbing tube uses an aluminum core element together with a soft material and is formed by helical winding. The impact-absorbing pad is composed of a foaming agent.

The impact-cushioning member of JP-A-10-217880 has an impact-absorbing tube that is bonded and fixed to the side portion of an impact-absorbing pad, and is therefore more capable of absorbing impacts in comparison with the impact-cushioning member of JP 2004-114864 A.

The impact-cushioning member of JP 10-217880 A is believed to be capable of relatively easily reducing an impact with an object having relatively low rigidity as well as reducing an impact on vehicle occupants when the member is provided to the front surface of the bumper beam.

As described above, the impact-cushioning member of JP 10-217880 A combines the use of an impact-absorbing tube and an impact-absorbing pad in that the impact-absorbing tube is bonded and fixed to the side portion of the impact-absorbing pad. For this reason, the impact-cushioning member has a relatively large shape and is difficult to provide to the bumper beam. Also, the member must be separately provided, and improvement is still needed in terms of assembly and manufacturing costs.

SUMMARY OF THE INVENTION

An object of the present invention is to provide an impact-absorbing device that can be used to reduce impacts on objects having relative low rigidity as well as impacts on vehicle occupants, and that can be provided to a bumper beam in a simple manner.

In accordance with the present invention, there is provided a device for absorbing an impact, which comprises: an impact-absorbing guide piece that extends in the horizontal direction substantially orthogonal to the input direction of the impact; and an impact-absorbing movable piece that is movably supported along the guide piece, wherein the movable piece is moved along the lengthwise direction of the guide piece when an impact has acted on the movable piece, and the guide piece and the movable piece are caused to deform to thereby absorb the impact.

When an impact acts on the impact-absorbing device, the movable piece is moved along the guide piece, and the guide piece and movable piece are caused to deform so as to absorb the impact.

The movable piece will be described below as a configuration of a plurality of movable elements.

When the center part of the movable piece collides with a rod-shaped object (object) having relatively low rigidity, the movable elements, which have collided with the rod-shaped object, undergo buckling deformation. The movable elements at the two sides of the rod-shaped object are pushed away to the two sides by the rod-shaped object and by the wound portions that have buckled and deformed. The load in the collision direction is dispersed and redirected axially in the lengthwise direction of the impact-absorbing device, and the movable elements are pushed away to the two sides of the rod-shaped body and are thereby moved in the lengthwise direction of the guide piece. The movable elements move in the lengthwise direction along the guide piece, and thereby generate movement (kinetic) energy.

The movable piece is moved along the guide piece, whereby frictional force (frictional energy) is generated between the movable piece and the guide piece.

Furthermore, the movable elements move in the lengthwise direction of the guide piece, and adjacent movable elements thereby move relative to each other in a state of mutual contact. The movable elements move relative to each other in contact with each other, whereby frictional force (frictional energy) is generated between adjacent movable elements.

Therefore, the energy produced by the impact is added to the deformation energy of the movable piece and the guide piece, and is effectively absorbed by the movement (kinetic) energy of the movable piece and frictional energy between the movable piece and the guide piece.

In the impact-cushioning member of the present invention, the two members, i.e., the guide piece and the movable piece are capable of absorbing impacts, whereby impacts against objects having relatively low rigidity and impacts on vehicle occupants can be reduced.

The movable piece is capable of moving in the lengthwise direction of the guide piece, and the movable piece is therefore pushed away to the two sides of a rod-shaped body and moved in the lengthwise direction of the guide piece to generate movement (kinetic) energy when an impact-absorbing device has collided with a rod-shaped object having relatively low rigidity.

Furthermore, the movable piece moves in the lengthwise direction along the guide piece, and thereby generate frictional force frictional energy) between the movable piece and the guide piece, and the movable elements constituting the movable piece are moved relative to each other while maintaining mutual contact, whereby frictional force (frictional energy) is generated between adjacent movable elements.

An impact produced in the initial stage of a collision can be sufficiently absorbed by the movement (kinetic) energy produced when the movable piece moves along the guide piece, by the frictional energy generated between the guide piece and the movable piece, and by the frictional energy generated between the movable elements. Impacts that act on a rod-shaped body having relatively low rigidity can thereby be reduced in a favorable manner in comparison with a conventional impact-absorbing device.

Impact-absorbing ability can be improved overall without producing a condition (a so-called bottom-hitting state) in which the impact-absorbing capability of the core element or windings is lost before the impact is sufficiently absorbed in the middle and latter stages of a collision.

When an impact-absorbing device has collided with a wall-shaped object (object), the entire surface of the impact-absorbing device collides with the wall-shaped object because the wall-shaped object is a wide object. Therefore, the entire impact-absorbing device undergoes compressive deformation and produces compressive strain energy. The impact during a collision is absorbed in a favorable manner via the compressive strain energy thus generated, whereby the impact that acts on the vehicle occupants can be reduced in a favorable manner.

Preferably, the guide piece comprises a core element for guiding the inside of the movable piece. The movable piece can therefore be externally exposed, an impact can be efficiently received by the movable piece, and the movable piece moves in an even more favorable manner along the guide piece. A movement (kinetic) energy and a frictional energy are thereby generated in a favorable manner and the impact is absorbed in an even more favorable fashion.

Desirably, a cross-sectional shape of the core element is set such that the dimension in the impact input direction is greater than the dimension in the direction vertically orthogonal to the impact input direction. In this manner, impact absorption characteristics during a collision can by assured and acceleration can be reduced in a favorable manner by setting the dimensions of the impact input direction to be a large value. Additionally, the amount of deformation or displacement of deformable portions during a collision is kept high and adequate impact-absorption level can be maintained.

In a preferred form, the movable piece have a helically wound external peripheral element. The two members, i.e., the guide piece and the movable piece, are thereby made compact and an impact-absorbing device can be provided in a simple manner in a bumper beam or other narrow space of a vehicle body.

Locations having a single winding will be described below as wound portions (specifically, the movable elements constituting the movable piece) of the helically wound movable piece.

For example, wound portions with which a rod-shaped object has collided undergo a buckling deformation when the center portion of the movable piece has collided with a rod-shaped body (object) having low rigidity. The wound portions positioned on the two sides of the rod-shaped object are pushed away to the two sides by the rod-shaped object and by the buckled and deformed wound portion. A load in the collision direction is dispersed and redirected axially in the lengthwise direction of the impact-absorbing device, and the wound portions are pushed away to the two sides of the rod-shaped body, and are thereby moved in the lengthwise direction of the guide piece. The wound portions move in the lengthwise direction along the guide piece, and thereby generate movement (kinetic) energy, and to generate frictional force (frictional energy) between the guide piece and the wound portions.

The wound portions furthermore move in the lengthwise direction of the guide piece, whereby adjacent wound portions make contact with each other and move relative to each other, and a frictional force (frictional energy) is generated between the adjacent wound portions. Therefore, the energy produced by an impact can be effectively absorbed by using the deformation energy of the core element and wound portions, and additionally using the movement (kinetic) energy of the wound portions, the frictional energy between the core element and the wound portions, and the frictional energy between the wound portions.

It is also preferred that the external peripheral element have a predetermined space formed in adjacent wound portions, where the location of a single helically formed winding is taken to be a wound portion. Therefore, when the impact-absorbing device has collided with a rod-shaped object having relatively low rigidity, adjacent wound portions will make contact with each other after a predetermined length of time has elapsed from the collision, whereby the time in which frictional force (frictional energy) has been generated between adjacent wound portions can be adjusted, and the impact absorption characteristics can be adjusted in a favorable manner.

For example, when the predetermined space between adjacent wound portions is set to be relatively large, the impact absorption characteristics in the initial stages of a collision are weakened and the impact absorption characteristics are somewhat improved thereafter. Conversely, when the predetermined space between adjacent wound portions is set to be relatively small, the impact absorption characteristics in the initial stages of a collision are increased and the impact absorption characteristics remain constant thereafter.

In this manner, the timing for generating frictional force (frictional energy) between mutually adjacent wound portions is adjusted, and the impact absorption characteristics are also adjusted in a favorable manner, whereby the impact that acts on a rod-shaped object having relatively low rigidity can be more favorably reduced.

Preferably, the movable piece comprises a plurality of vane-form movable elements formed substantially in the shape of a plate. For example, when the center portion of the movable piece has collided with a rod-shaped object (object) having relatively low rigidity, the vane-form movable elements with which the rod-shaped object has collided will undergo buckling deformation. The vane-form movable elements positioned on the two sides of the rod-shaped object are pushed away to the two sides by the rod-shaped object and by the wound portions that have buckled and deformed. The load in the collision direction is dispersed and redirected in the axial direction of the impact-absorbing device, and the vane-form movable elements are pushed away to the two sides of the rod-shaped body and are thereby moved in the lengthwise direction of the guide piece.

The vane-form movable elements move in the lengthwise direction along the guide piece, and thereby generate movement (kinetic) energy, and to generate frictional force (frictional energy) between the guide piece and the vane-like material. Adjacent vane-form movable elements move relative to each other while maintaining mutual contact, and thereby generate frictional force (frictional energy) between adjacent vane-form movable elements.

Therefore, the energy produced by the impact is added to the deformation energy of the vane-form movable elements and the guide piece, and is effectively absorbed by the movement (kinetic) energy of the vane-form movable elements, by the frictional energy between the guide piece and the vane-form movable elements, and by the frictional energy between the vane-form movable elements.

In a desired form, the vane-form movable elements have a predetermined space formed between adjacent vane-form movable elements. Therefore, when the impact-absorbing device has collided with a rod-shaped object having relatively low rigidity, adjacent vane-form movable elements make contact with each other after a predetermined length of time has elapsed from the collision. The time in which frictional force (frictional energy) has been generated between adjacent vane-form movable elements is thereby adjusted, and the impact absorption characteristics can be adjusted in a favorable manner. For example, when the predetermined space between adjacent vane-form movable elements is set to be relatively large, the impact absorption characteristics in the initial stages of a collision are weakened and the impact absorption characteristics are somewhat improved thereafter. Conversely, when the predetermined space between adjacent vane-form movable elements is set to be relatively small, the impact absorption characteristics in the initial stages of a collision are increased and the impact absorption characteristics remain constant thereafter.

In this manner, the timing for generating frictional force (frictional energy) between mutually adjacent vane-form movable elements is adjusted, and the impact absorption characteristics are also adjusted in a favorable manner, whereby the impact that acts on a rod-shaped object having relatively low rigidity can be reduced in a more favorable manner.

It is preferred that the movable piece and the guide piece are each formed using an foam material. The material therefore becomes a lightweight material, the good impact absorption characteristics of the core element and external peripheral element are assured, and the amount of impact absorption is sufficiently attained. Acceleration that acts during a collision can be reduced in a favorable manner by assuring good impact absorption characteristics and by sufficiently assuring the amount of impact absorption.

Preferably, the material of the movable piece is the same as the material of the guide piece, and that the expanded ratio is set below that of the material of the guide piece. Therefore, the movable piece can be a hard member in comparison with the guide piece even if the guide piece and the movable piece are formed from the same material, and the material can be shared with other components to bring down the costs.

It is preferred that the material of the movable piece be resin and that the material of the guide piece be an foam material. Therefore, the rigidity of the movable piece can be increased in comparison with the foam material, the acceleration buildup efficiency in the initial impact can be raised, and the amount of buckling deformation required for impact absorption and the amount of compressive deformation can be reduced.

It is preferred that the guide piece is a housing element for guiding an external side of the movable piece. Therefore, the movable piece can be covered from the outside, the movable piece can be mounted on the housing element in a simpler manner, and productivity can be increased.

It is preferred that the movable piece be a helically wound helical member. Therefore, when an impact acts on an impact-absorbing device, first, the helical member undergoes buckling deformation to absorb the impact. Pressing force acts on adjacent helical members together with the buckling deformation of the helical member, and the helical member is moved along the housing element to absorb the impact force. Therefore, the impact absorption characteristics of the movable piece can be adequately assured, and the amount of impact absorption can be sufficiently attained, whereby acceleration that acts during a collision can be reduced is a favorable manner. Additionally, by making the movable piece to be a helical member, the movable piece can be consolidated into a single member, the movable piece can be more easily handled, and productivity can be improved.

It is also preferred that the movable piece comprise a plurality of flat plate elements formed in the shape of a flat plate, and also comprise a soft part that is softer than the flat plate element and is disposed on the exterior side of the outermost flat plate selected from among the plurality of flat plate elements. Therefore, when an impact acts on an impact-absorbing device, first, a plurality of flat plate element is caused to undergo buckling deformation to absorb the impact. Pressing force acts on adjacent flat plate elements together with the buckling deformation of the flat plate elements, soft locations undergo compressive deformation under the pressing force, and the flat plate elements are moved to the left and right sides to absorb the impact force. Therefore, the impact absorption characteristics of the movable piece can be adequately assured, and the amount of impact absorption can be sufficiently attained, whereby acceleration that acts during a collision can be reduced in a favorable manner.

It is also preferred that the movable piece be a plurality of flat plate elements formed in the shape of a flat plate and that one side of each of the plurality of flat plate elements be made into a soft part. Therefore, when an impact acts on an impact-absorbing device, first, the flat plate elements undergo buckling deformation to absorb the impact. Pressing force acts on adjacent flat plate elements together with the buckling deformation of the flat plate elements, and soft locations undergo compressive deformation under the pressing force. The flat plate elements are thereby moved to the left and right sides to absorb the impact force. Therefore, the impact absorption characteristics of the movable piece can be adequately assured, and the amount of impact absorption can be sufficiently attained, whereby acceleration that acts during a collision can be reduced is a favorable manner.

It is also preferred that the movable piece be a plurality of flat plate elements formed in the shape of a flat plate, and that each of the plurality of flat plate elements have a projection disposed on one side thereof. Therefore, when an impact acts on an impact-absorbing device, first, the flat plate elements undergo buckling deformation to absorb the impact. Pressing force acts on adjacent flat plate elements together with the buckling deformation of the flat plate elements, and the projection is deformed (crushed) under the pressing force. The flat plate elements are thereby moved to the left and right sides to absorb the impact force. Therefore, the impact absorption characteristics of the movable piece can be adequately assured, and the amount of impact absorption can be sufficiently attained, whereby acceleration that acts during a collision can be reduced is a favorable manner.

It is also preferred that the movable piece be formed using a member that is harder than the guide piece. When the movable piece is a softer member than the guide piece, the movable piece does not move along the guide piece and undergoes deformation. Therefore, the movable piece is made to be a hard material, whereby the movable piece can be adequately moved along the guide piece. The movable piece is moved in a favorable manner, and thereby generate movement (kinetic) energy and frictional energy in a favorable manner to absorb the impact force.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Reference is made initially to FIGS. 1 to 11 showing an impact-absorbing device according to a first embodiment of the present invention.

Figure 1:
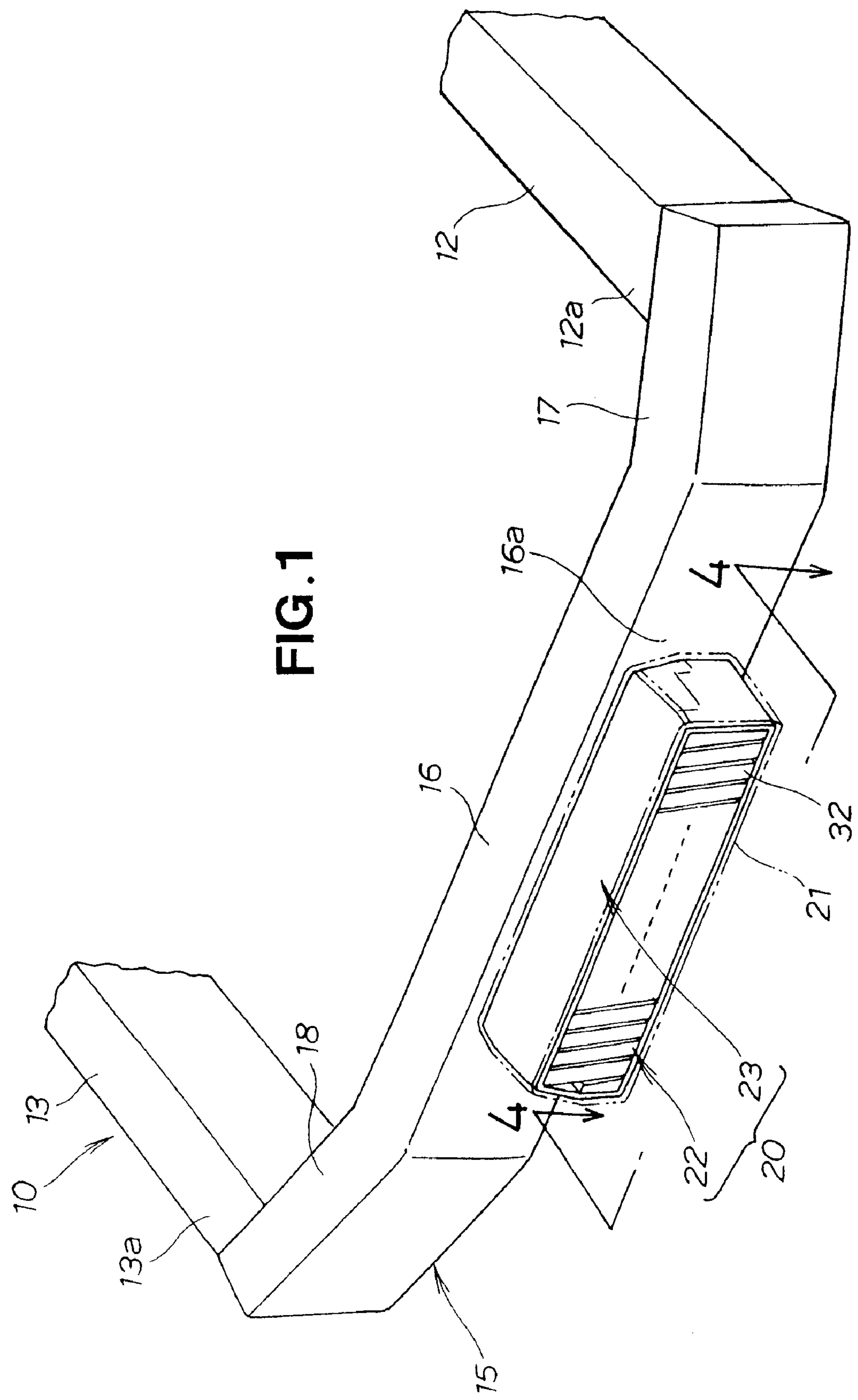
FIG. 1 is a perspective view of the front bumper beam provided with the impact-absorbing device according to a first embodiment of the present invention.

As shown in FIG. 1, the vehicle body 10 is provided with a left-front side frame 12, a right-front side frame 13, a front bumper beam 15 that spans the area between front end portions 12*a* and 13*a* of the left and right-front side frame 12 and 13, and an impact-absorbing device 20 disposed on a front bumper beam 15.

The front bumper beam 15 has a center portion 16 that extends in the width direction of the vehicle, a left bent portion 17 that extends outward from the left end portion of the center portion 16 and is inclined in the rearward direction, and a right bent portion 18 that extends outward from the right end portion of the center portion 16 and is inclined in the rearward direction.

The front bumper beam 15 has the left bent portion 17 mounted on the front end portion 12*a* and the right bent portion 18 mounted on the front end portion 13*a*, and is provided with an impact-absorbing device 20 on the center front portion 16*a* of the center portion 16. The impact-absorbing device 20 absorbs impacts when an impact occurs. Specifically, the impact on the object is reduced when the impact-absorbing device 20 has collided with a rod-shaped object (object) having relatively low rigidity, and the impact on a vehicle occupant is reduced when a collision has been made with the wall-shaped object (object).

The impact-absorbing device 20 is joined using an adhesive (not shown) to the center front portion 16*a* of the front bumper beam 15 while stored in a bag 21. The bag 21 is made of a polypropylene (PP), for example, and a sheet or woven cloth having a thickness of 1,000 μm may be used.

The bag 21 is omitted in the description below in order to facilitate understanding of the impact-absorbing device 20.

Figure 2:
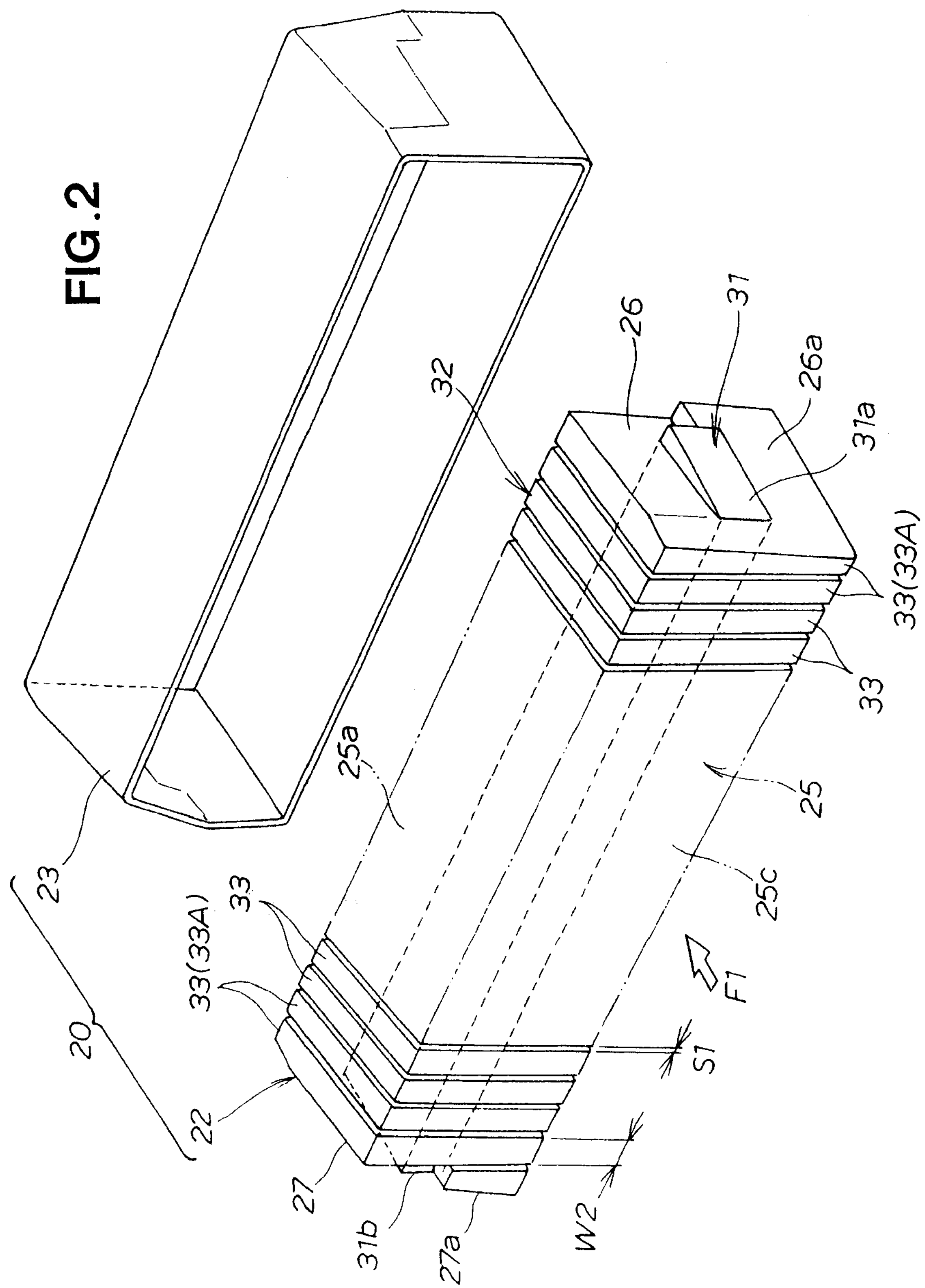
FIG. 2 is an exploded perspective view of the impact-absorbing device shown in the FIG. 1.
Figure 3A:
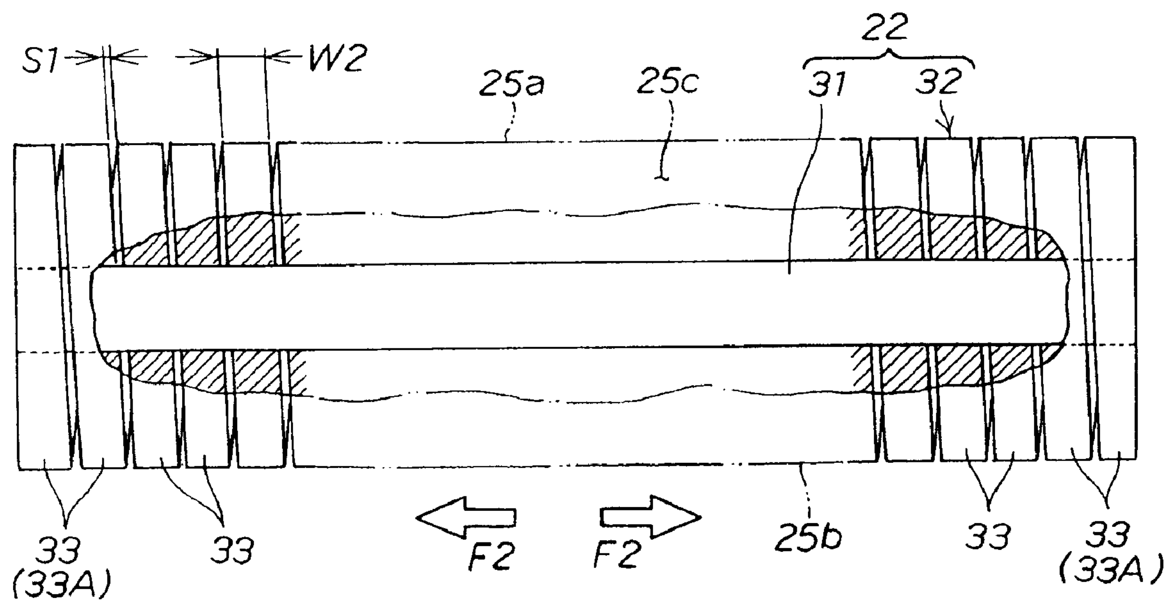
FIGS. 3A and 3B are respectively a cross-sectional view and a side elevational view showing the impact-absorbing member shown in FIG. 2.
Figure 3B:
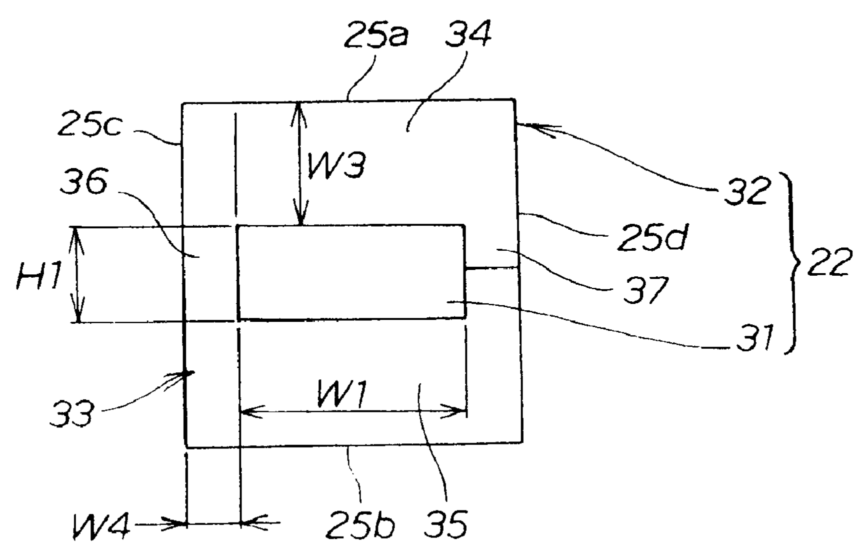

The impact-absorbing device 20 is composed of an impact-absorbing member 22 that absorbs impacts that have occurred, and a hollow shape-holding member 23 that surrounds the external periphery of the impact-absorbing member 22 in the lengthwise direction, as shown in FIGS. 2, 3A, and 3B.

The impact-absorbing member 22 has a configuration in which the external periphery 25 is formed in a substantially rectangular shape as viewed from the side, and is composed of upper and lower surfaces 25*a* and 25*b* (see reference numeral 25*b* in FIG. 3B) and front and rear surfaces 25*c* and 25*d* (see reference numeral 25*d* in FIG. 3B). In this configuration, parallel left and right surfaces 26*a* and 27*a* are formed in the right and left end portions 26, 27 in the front/rear direction of the vehicle body 10. The impact-absorbing member 22 is composed of a core element (guide piece) 31 that is capable of absorbing an impact, and is also composed of an external peripheral element (movable piece) 32 that is wound about the core element 31 in a helical manner and is capable of absorbing an impact.

The core element 31 extends in a direction substantially orthogonal to the width direction of the vehicle in the impact input direction, as shown in FIG. 3B, has a cross-sectional shape that is substantially rectangular, and is a strip-shaped member that guides the external peripheral element 32.

The cross-sectional shape of the core element 31 is set so that a dimension (hereinafter referred to as "width dimension") W1 in the impact input direction is greater than a dimension (hereinafter referred to as "height dimension") H1 in the direction orthogonal to the impact input direction.

In this manner, the width dimension W1 in the impact input direction is set to be greater than the height dimension H1, whereby the impact absorption characteristics during a collision remain at an adequate level, and acceleration can be reduced in a favorable manner.

Additionally, the width dimension W1 in the impact input direction is made large to increase the amount of deformation (deformable portions) during a collision and to ensure adequate impact absorption.

In this case, the impact input direction refers to the arrow direction (FIG. 2) in which an impact F1 generated by a collision acts on the impact-absorbing device 20 when the impact-absorbing device 20 has collided with an object.

The external peripheral element 32 is a harder member than the core element 31. The external peripheral element 32 is wound about the core element 31 in a helical manner and is thereby disposed across the core element 31 from the left end portion 31*a* to the right end portion 31*b*. The external peripheral element 32 has a plurality of locations 33 (hereinafter referred to as "wound portion 33") that have a single helical winding about the core element 31, and a predetermined space S1 is formed between adjacent wound portions 33, 33.

The width of the wound portion 33 is W2. The wound portion 33 acts as a movable element that can move along the lengthwise direction of the core element 31.

The external peripheral element 32 is wound about the core element 31 so that a plurality of wound portions 33 can move in the lengthwise direction of the core element 31 under a predetermined impact F2 when the impact has acted along the core element 31 in the manner indicated by arrow F2, as shown in FIG. 3A. The predetermined impact F2 is a force that acts when the impact-absorbing device 20 has collided with a rod-shaped object having relatively low rigidity.

In the impact-absorbing member 22, the external peripheral element 32 is made to be a member that is harder than the core element 31, and the wound portions 33 of the external peripheral element 32 thereby move in a favorable manner in the lengthwise direction of the core element 31 when the impact-absorbing device 20 has collided with a rod-shaped object having relatively low rigidity. Movement (kinetic) energy is generated when the wound portions 33 move appropriately in the lengthwise direction along the core element 31. Also, the wound portions 33 move, and thereby generate frictional force (frictional energy) between the core element 31 and the wound portions 33. Adjacent wound portions 33, 33 furthermore move relative to each other while maintaining mutual contact. Therefore, frictional force (frictional energy) is generated between the adjacent wound portions 33, 33.

The frictional energy generated between the core element 31 and the wound portions 33, and the frictional energy generated between the adjacent wound portions 33, 33, absorb the impact during a collision, and the impact is adequately absorbed. The impact that acts on the rod-shaped object having relatively low rigidity is thereby reduced in a favorable manner.

In the impact-absorbing member 22, a predetermined space S1 is formed between adjacent wound portions 33, 33. The adjacent wound portions 33, 33 accordingly make contact with each other after a predetermined length of time has elapsed after a collision when the impact-absorbing device 20 has collided with a rod-shaped object having relatively low rigidity and a predetermined impact has acted parallel to the lengthwise direction of the core element 31 in the same manner as arrow F2. The timing for generating a frictional force (frictional energy) between the adjacent wound portions 33, 33 can be adequately adjusted, as can the impact absorption characteristics.

For example, when the predetermined space S1 between the adjacent wound portions 33, 33 is set to be relatively large, the impact absorption characteristics in the initial stages of a collision are weakened and the impact absorption characteristics are somewhat increased thereafter.

Conversely, when the predetermined space S1 between the adjacent wound portions 33, 33 is set to be relatively small, the impact absorption characteristics in the initial stages of a collision are increased and are kept substantially uniform thereafter.

In this manner, the time during which frictional force (frictional energy) is generated between mutually adjacent wound portions 33, 33 is adequately adjusted, as are the impact absorption characteristics, whereby an impact that acts on a rod-shaped object having relatively low rigidity is reduced in a more favorable manner.

The external peripheral element 32 preferably has a configuration in which the width W2 of the wound portion 33 is 10 mm and the predetermined space S1 between adjacent wound portions 33, 33 is 1 mm, but no limitation is imposed by this configuration. For example, the width W2 may be 20 mm and the predetermined space S1 may be 2 mm, or the width W2 may be 7.5 mm and the predetermined space S1 may be 1 mm.

In the impact-absorbing member 22 of the first embodiment, the helical orientation of the external peripheral element 32 is shown as an example in FIG. 2, wherein the orientation is a clockwise direction from the left end portion of the core element 31 to the right end portion. However, the helical orientation of the external peripheral element 32 is not limited to the clockwise direction, and the counter-clockwise direction may also be used.

The wound portion 33 is formed in the upper and lower locations 34 and 35, and the front and rear locations 36 and 37, as shown in FIG. 3B. The upper and lower locations 34 and 35 are positioned on the upper and lower sides of the core element 31 and have a width W3. The front and rear locations 36 and 37 are positioned on the front and rear sides of the core element 31 and have a width W4. The width W3 is set to be greater than the width W4.

The core element 31 and external peripheral element 32 are formed from the same material. A lightweight foam material made of polypropylene (PP), for example, is used as the material of the core element 31 and external peripheral element 32.

The foam material of the external peripheral element 32 has an expansion ratio that is set to be lower than that of the foam material of the core element 31. As an example, polypropylene having an expansion ratio of 8 is used as the foam material of the external peripheral element 32, and polypropylene having an expansion ratio of 15 is used as the foam material of the core element 31.

A foam material is an element that can adequately deform and absorb an impact that has occurred. The impact absorption characteristics of the core element 31 and the external peripheral element 32 can be favorably assured and the amount of impact absorption can be sufficiently attained with a lightweight material by forming the core element 31 and the external peripheral element 32 from an foam material.

As described above, the core element 31 and external peripheral element 32 are the same material. When the expansion ratio of the external peripheral element 32 is set to be lower than that of the core element 31, the external peripheral element 32 becomes a member that is harder than the core element 31, even though the core element 31 and external peripheral element 32 are formed from the same material. The wound portions 33 of the external peripheral element 32 therefore move in a favorable manner in the lengthwise direction of the core element 31. The impact absorption characteristics of the impact-absorbing member 22 and an adequate amount of impact absorption can be maintained.

Materials can be shared among components and costs can be reduced when the core element 31 and external peripheral element 32 are made of the same material.

The shape-holding member 23 surrounds the upper and lower surfaces 25*a* and 25*b* and the right and left end portions 26, 27 of the impact-absorbing member 22, as shown in FIG. 2, whereby the right and left end portions 26, 27 of the external peripheral element 32 are held by the shape-holding member 23, and the right and left end portions 26, 27 are prevented from moving outward. The shape-holding member 23 described above furthermore surrounds the impact-absorbing member 22 so that the wound portions 33 of the external peripheral element 32 are not obstructed from moving along the core element 31. As an example, the wound portions 33 of the left and right ends (hereinafter the wound portions of the left and right ends will be referred to as 33A) of the wound portion 33 of the external peripheral element 32 slightly protrude in the vertical direction in comparison with the other wound portions 33. The shape-holding member 23 is accordingly held in a non-contact state with respect to the other wound portions 33.

The shape-holding member 23 is thereby surrounded by the impact-absorbing member 22, and the wound portions 33 are not prevented by the shape-holding member 23 from moving along the core element 31, when the right and left end portions 26, 27 of the external peripheral element 32 are held in place. The shape-holding member 23 holds the right and left end portions 26, 27 of the external peripheral element 32 in place, whereby the right and left end portions 26, 27 of the external peripheral element 32 are prevented from spreading to the left and right sides, respectively.

For example, low-expansion polypropylene (PP) in the form of a film having a thickness of 100 μm is used as the material of the shape-holding member 23.

The impact-absorbing device 20 is joined using an adhesive (not shown) to the center front portion 16*a* of the front bumper beam 15 while stored in the bag 21, as shown in FIG. 1.

Figure 4:
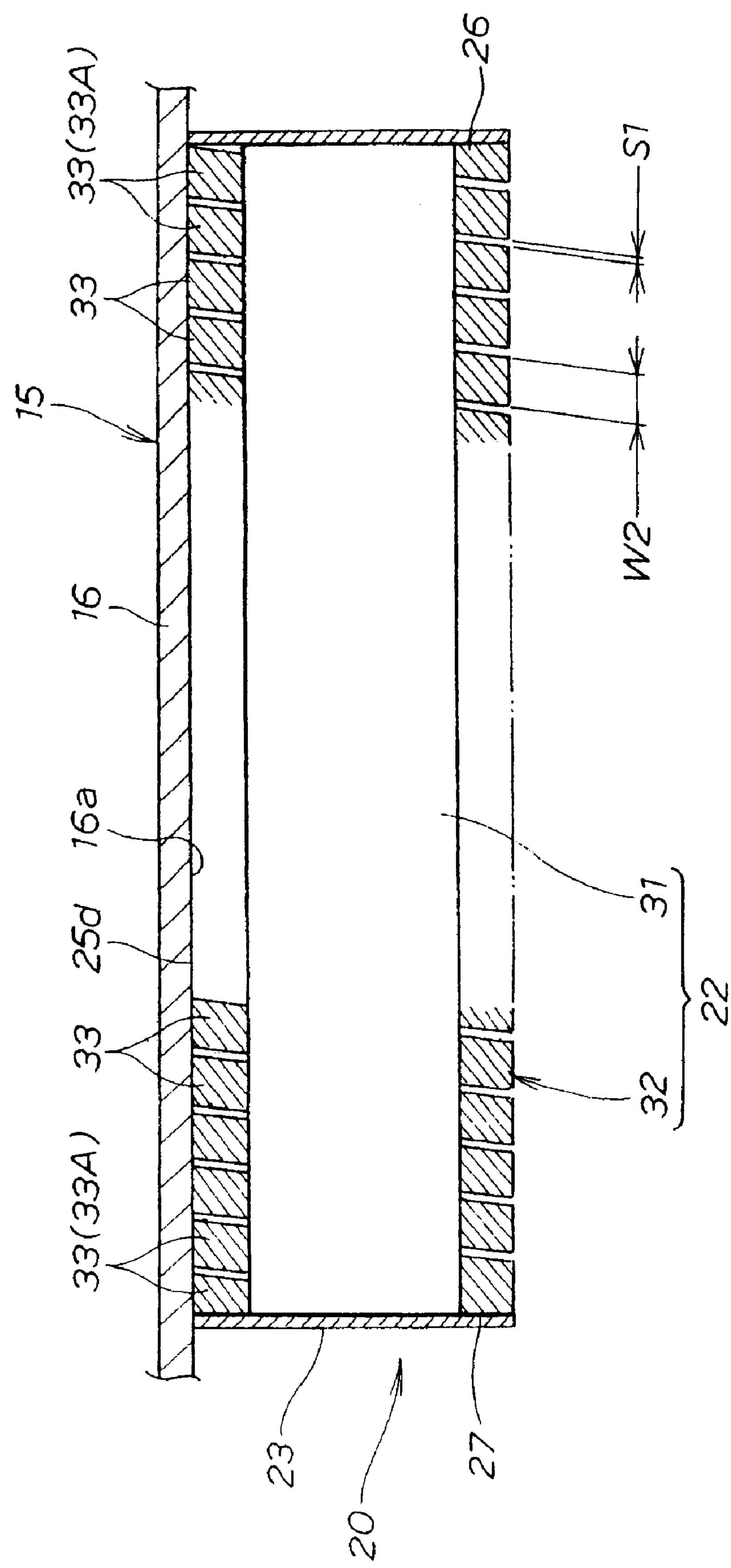
FIG. 4 is a cross-sectional view taken along line 4-4 of FIG. 1.

The rear surface 25*d* of the impact-absorbing device 20 is bonded to the center front portion 16*a* of the front bumper beam 15 using an adhesive (not shown) in a state in which the impact-absorbing device 20 is not housed in a bag 21, as shown, for example, in FIG. 4. When this bonding is carried out, the rear surface 25*d* of the impact-absorbing member 22 is bonded to the center front portion 16*a* so that the wound portions 33 of the external peripheral element 32 are not obstructed from moving along the core element 31.

Of the wound portion 33 of the external peripheral element 32, for example, the wound portions 33A of the left and right ends are made to slightly protrude, in comparison with the other wound portions 33, in the rearward direction of the vehicle body. Of the wound portion 33 of the external peripheral element 32, only the wound portions 33A of the left and right ends are bonded to the center front portion 16*a* using an adhesive, and the other wound portions 33 are not bonded to the center front portion 16*a* using an adhesive. The other wound portions 33 can thereby move along the core element 31.

Furthermore, the rear surface 25*d* of the impact-absorbing member 22 is covered by the shape-holding member 23, and the locations (shape-holding member 23) that cover the rear surface 25*d* can be bonded to the center portion 16 (center front portion 16*a*) of the front bumper beam 15.

As described above, in the impact-absorbing device 20, the impact-absorbing member 22 is composed of two members, i.e., the core element 31 and the external peripheral element 32, and the core element 31 and external peripheral element 32 are members that can absorb an impact. Therefore, the members 31, 32 can reduce impacts against vehicle occupants as well as against objects having relatively low rigidity.

The impact-absorbing member 22 has a configuration in which the external peripheral element 32 is wound about the core element 31 in a helical manner. The two members, i.e., the core element 31 and external peripheral element 32, can accordingly be made compact and the impact-absorbing device 20 can be provided to the front bumper beam 15 in a simple manner.

Advantageous effects of the impact-absorbing device 20 of the first embodiment will be described next with reference to FIGS. 5 through 9.

An embodiment will be described first with reference to FIGS. 5 through 7 in which the impact-absorbing device 20 collides with a rod-shaped object (object) 41 having relatively low rigidity.

Figure 5A:
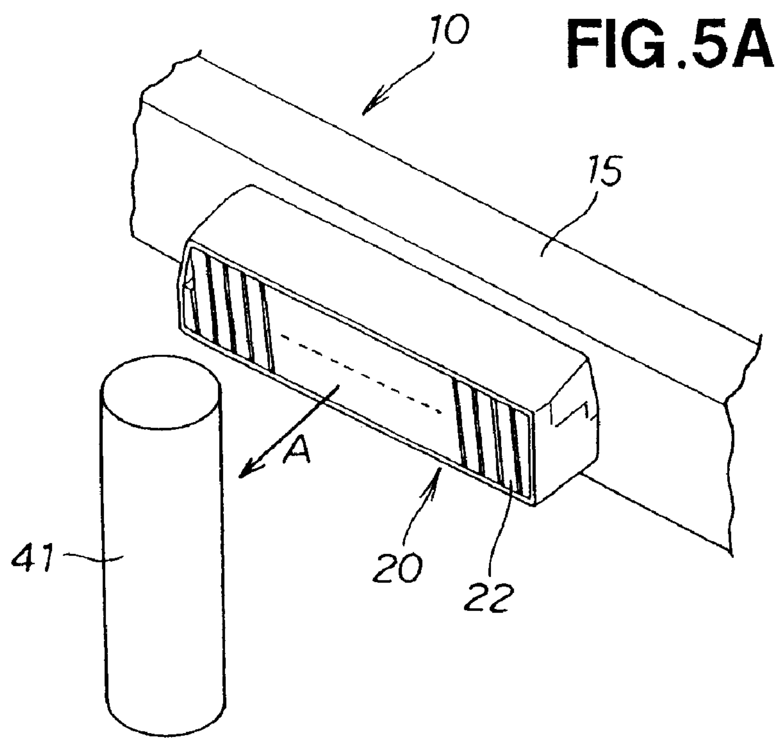
FIGS. 5A and 5B are schematic views showing a state in which the impact-absorbing device according to the first embodiment collides with a rod-shaped body.

In FIG. 5A, the vehicle body 10 moves in the manner indicated by arrow A, whereby the impact-absorbing device 20 moves together with the front bumper beam 15 in the manner indicated by arrow A toward the rod-shaped object 41 having relatively low rigidity.

Figure 5B:
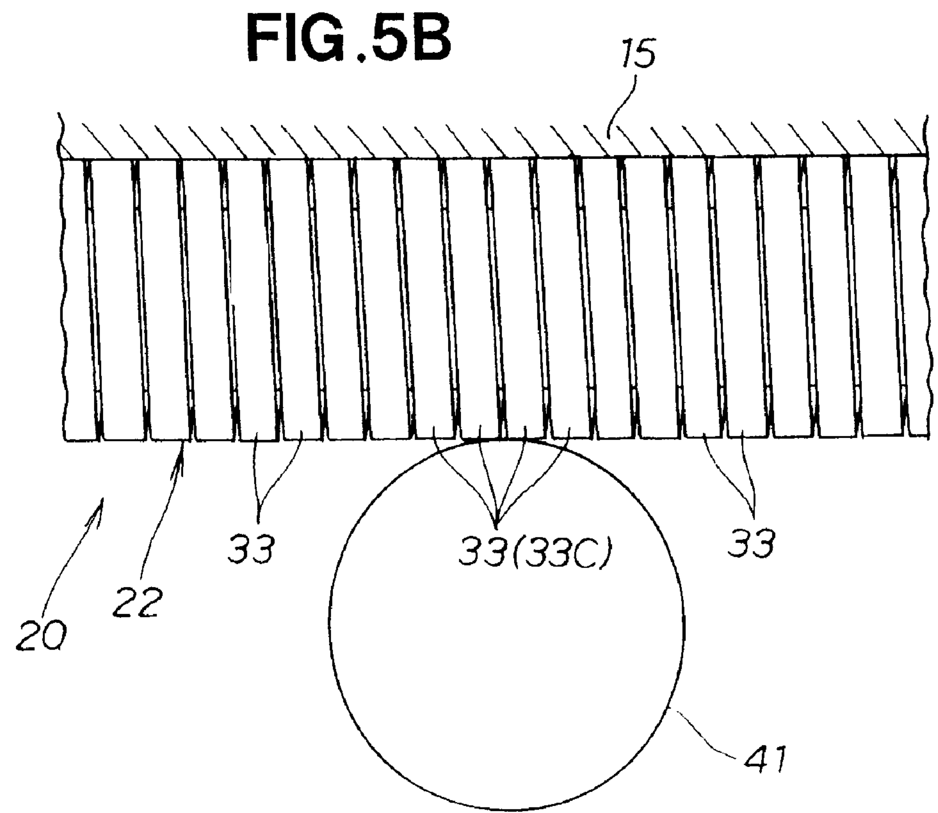

The impact-absorbing device 20 (specifically, the impact-absorbing member 22) collides with the rod-shaped object 41, as shown in FIG. 5B. The rod-shaped object 41 is a cylindrical object that has a relatively small outside diameter, and the wound portions 33 (hereinafter referred to as "central wound portions 33C") positioned in the center of the impact-absorbing member 22 therefore collide with the rod-shaped object 41.

Figure 6A:
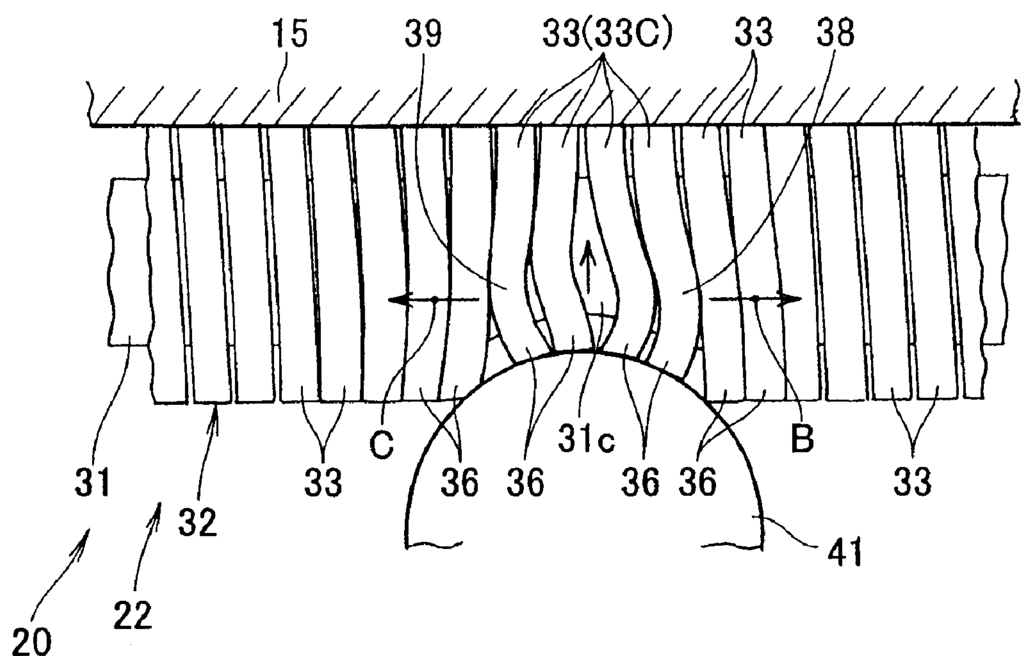
FIGS. 6A to 6F are schematic views showing a state in which the impact-absorbing device according to the first embodiment absorbs an impact force that has acted on the rod-shaped object.
Figure 7:
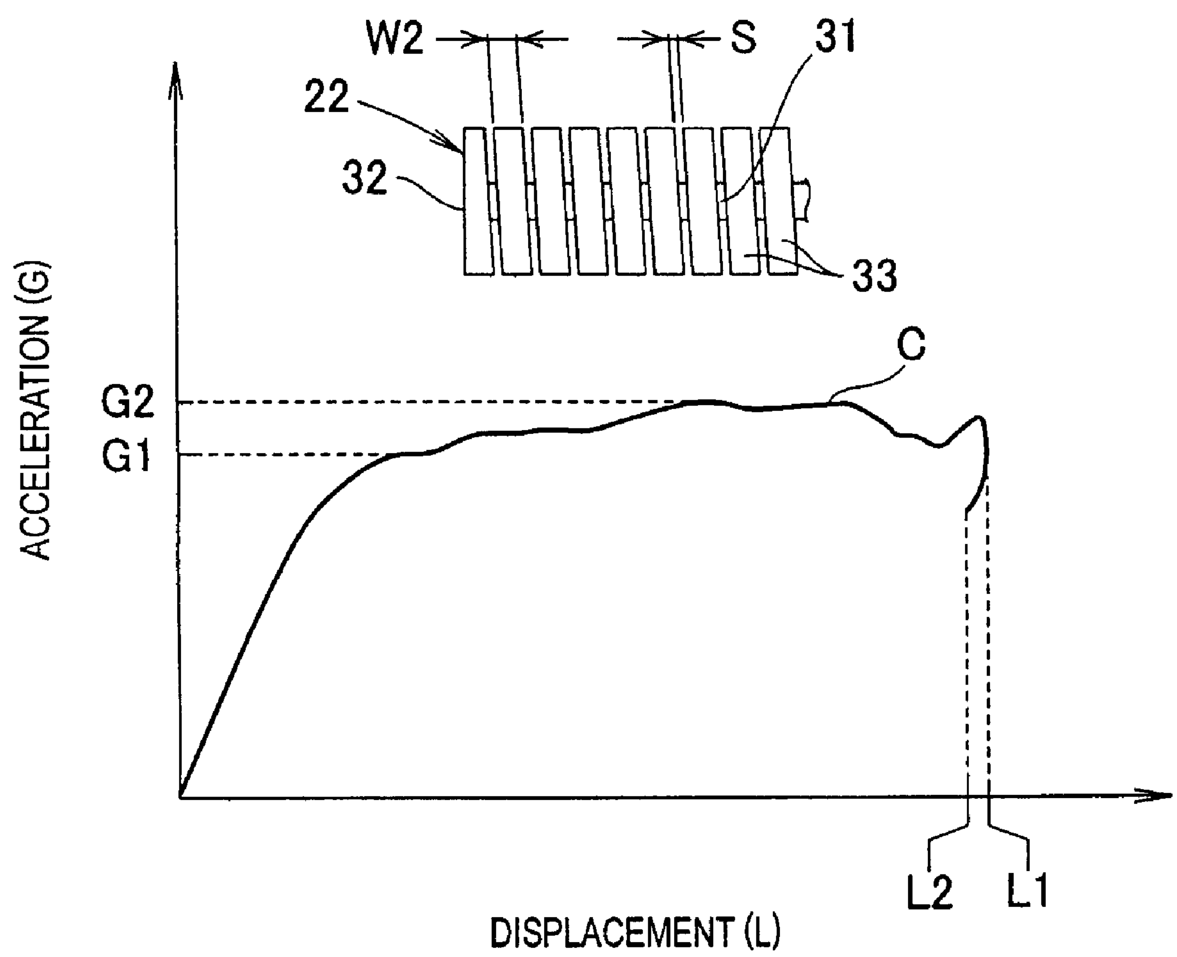
FIG. 7 is a graph showing a relationship between acceleration and displacement in the impact-absorbing device according to the first embodiment.

When the central wound portions 33C collide with the rod-shaped object 41, as shown in FIG. 6A, the collision force acts on the front locations 36 of the central wound portions 33C, a buckling load acts on the central wound portions 33C, and the central wound portions 33C undergo buckling deformation. The central wound portions 33C undergo buckling deformation, and thereby generate energy (hereinafter referred to as "buckling energy").

Of the central wound portions 33C, the location 38 of the left-side central wound portion 33C bulges to the left side, and the part of the left-side wound portion 33 on the side of the front location 36 is pressed by the location 38 in the manner indicated by arrow B.

Of the central wound portions 33C, the location 39 of the right-side central wound portion 33C bulges to the right side, and the part of the left-side wound portion 33 on the side of the front location 36 is pressed by the location 39 in the manner indicated by arrow C.

In this case, the external peripheral element 32 is a member that is harder than the core element 31. Therefore, the part of the left-side wound portions 33 on the side of the front locations 36 begins to move in the lengthwise direction of the core element 31 in the manner indicated by arrow B. At the same time, the part of the right-side wound portions 33 on the side of the front locations 36 begins to move in the lengthwise direction of the core element 31 in the manner indicated by arrow C. The central wound portions 33C furthermore undergo buckling deformation, whereby the front location 31*c* of the core element 31 is pressed in the manner indicated by the arrow at the front locations 36 of the center would portions 33C.

Figure 6B:
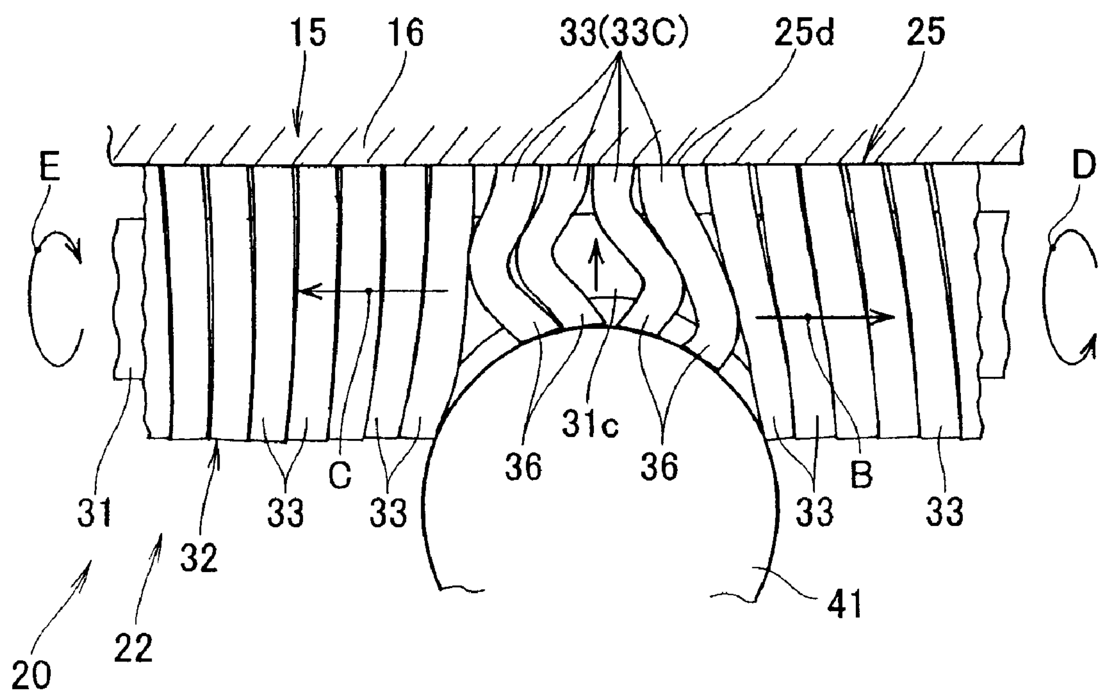

In FIG. 6B, the amount of buckling deformation of the central wound portions 33C becomes greater than in the state shown in FIG. 6A. Therefore, the front locations 36 side of the wound portions 33 on the left and right sides move in the lengthwise direction of the core element 31 in the manner indicated by the arrows B and C. Movement (kinetic) energy is thereby generated by the movement of the wound portions 33, and frictional force (frictional energy) is generated between the moving wound portions 33 and the core element 31.

The right and left end portions 26, 27 of the external peripheral element (FIG. 2) are held by the shape-holding member 23 so that the end portions do not spread to the left and right sides. The wound portions 33 accordingly move in the lengthwise direction of the core element 31, and thereby produce a state in which the adjacent wound portions 33, 33 are in contact with each other.

In this state, the wound portions 33 move in the lengthwise direction of the core element 31 (hereinafter referred to as the "direction of arrow B and direction of arrow C"), whereby the adjacent wound portions 33, 33 move relative to each other in a state of mutual contact (surface contact).

The adjacent wound portions 33, 33 move relative to each other in a state of mutual contact, and thereby produce movement (kinetic) energy as well as frictional force (frictional energy) between the adjacent wound portions 33, 33.

The external peripheral element 32 is helically wound about the core element 31. The adjacent wound portions 33, 33 move in the direction of arrow B and the direction of arrow C while maintaining mutual contact, and thereby produce torsional force in the external peripheral element 32, as indicated by the arrows D and E.

The rear surface (i.e., 25*d* of the external periphery) of the external peripheral element 32 is in contact with the center portion 16, and the torsional force thus generated is thereby expended by the deformation in the lengthwise direction of the core element 31 when torsional force is generated in the external peripheral element 32.

In this manner, deformation occurs in the lengthwise direction of the core element 31 due to the torsional force generated in the external peripheral element 32, and energy (hereinafter referred to as "torsional energy") is produced thereby.

On the other hand, the amount of buckling deformation of the central wound portions 33C increases, and pressure is thereby exerted on the front location 31*c* of the core element 31 at the front locations 36 of the central wound portions 33C in the manner indicated by the arrow. The front location 31*c* of the core element 31 is thereby compressively deformed. The front location 31*c* of the core element 31 undergoes compressive deformation, and compressive strain energy is thereby generated.

The core element 31 is held in a floating state inside the external peripheral element 32. When the external peripheral element 32 undergoes buckling deformation in this state, the core element 31 is pressed by the buckled and deformed external peripheral element 32, and the pressed locations locally deform in a concave shape toward the center portion 16.

The concave deformation is a local (small) deformation, and the locations adjacent to the two sides of the concave shape are crowded upward away from the center portion 16 so as to accommodate the concave deformation. For this reason, the core element 31 is bent and deformed as viewed from the concavely deformed locations and crowded locations.

In this manner, energy (hereinafter referred to "bending energy") is generated when the core element 31 undergoes bending deformation.

Figure 6C:
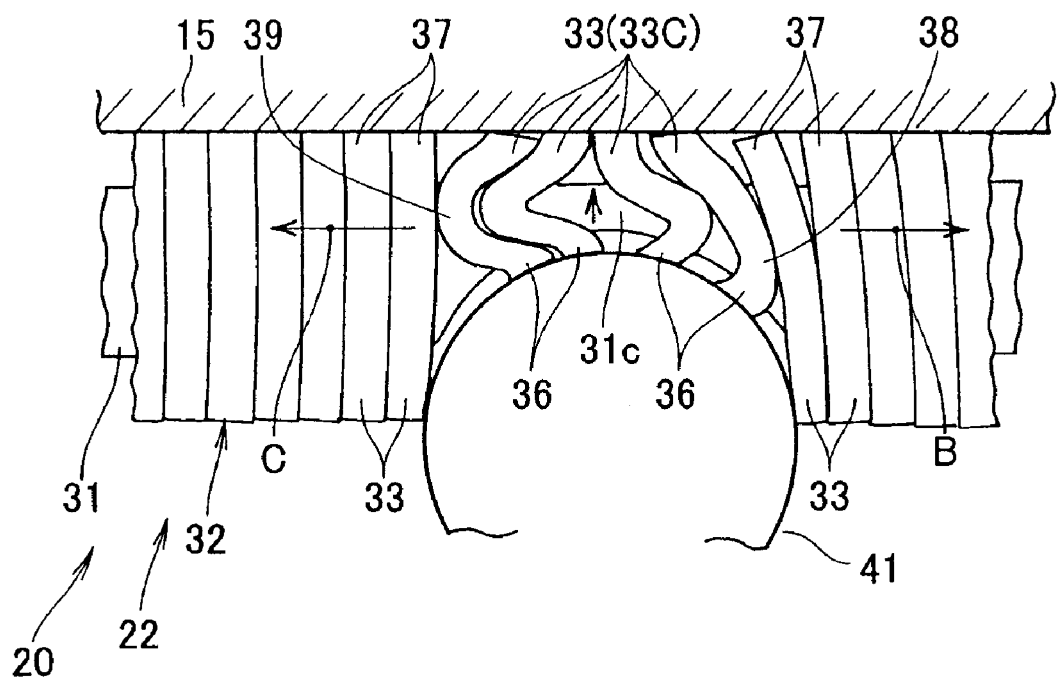

In FIG. 6C, the amount of buckling deformation of the central wound portions 33C becomes greater than in the state shown in FIG. 6C, and the amount of compressive deformation of the front location 31*c* in the core element 31 becomes greater than in the state shown in FIG. 6B.

The amount of compressive deformation increases and, among the central wound portions 33C, the location 38 of the left-side central wound portions 33C thereby moves to the rearward side of the vehicle body, and the location 38 presses the locations adjacent to the rear portion 37 of the left-side wound portion 33 in the manner indicated by arrow B. The locations adjacent to the rear portion 37 of the left-side wound portion 33 move in the lengthwise direction of the core element 31 in the manner indicated by arrow B.

In the same manner, the amount of compressive deformation increases and, among the central wound portions 33C, the location 39 of the right-side central wound portions 33C thereby moves to the rearward side of the vehicle body, and the location 39 presses the locations adjacent to the rear portion 37 of the right-side wound portion 33 in the manner indicated by arrow C. The locations adjacent to the rear portion 37 of the right-side wound portion 33 move in the lengthwise direction of the core element 31 in the manner indicated by arrow C.

Movement (kinetic) energy is thereby generated by the movement of the wound portions 33, and frictional force (frictional energy) is generated between the core element 31 and the moving wound portions 33.

The locations adjacent to the rear portion 37 of the left and right-side wound portion 33 move in the lengthwise direction (direction of arrow B, direction of arrow C) of the core element 31, whereby the adjacent wound portions 33, 33 move relative to each other in a state of mutual contact, movement (kinetic) energy is generated, and the adjacent wound portions 33, 33 generate frictional force (frictional energy).

Figure 6D:
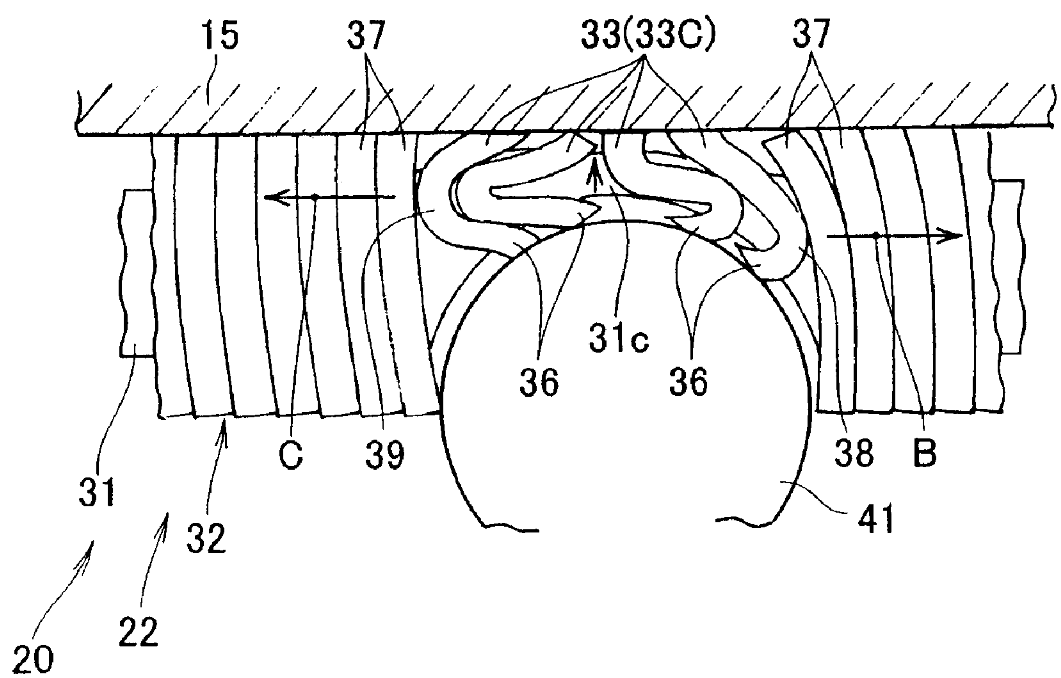

In FIG. 6D, the amount of buckling deformation of the wound portions 33 becomes greater than in the state shown in FIG. 6C, and the amount of compressive deformation of the front location 31*c* of the core material 31 becomes greater than in the state shown in FIG. 6C.

The location adjacent to the rear portion 37 of the left-side wound portion 33 is pulled toward the central wound portions 33C, and the locations adjacent to the rear portion 37 of the left-side wound portion 33 begins to undergo bending deformation.

Although not depicted, the location (location on the reverse side of the diagram surface) adjacent to the rear portion 37 of the right-side wound portion 33 is also pulled toward the central wound portions 33C, and the locations adjacent to the rear portion 37 of the right-side wound portion 33 begin to undergo bending deformation.

Figure 6E:
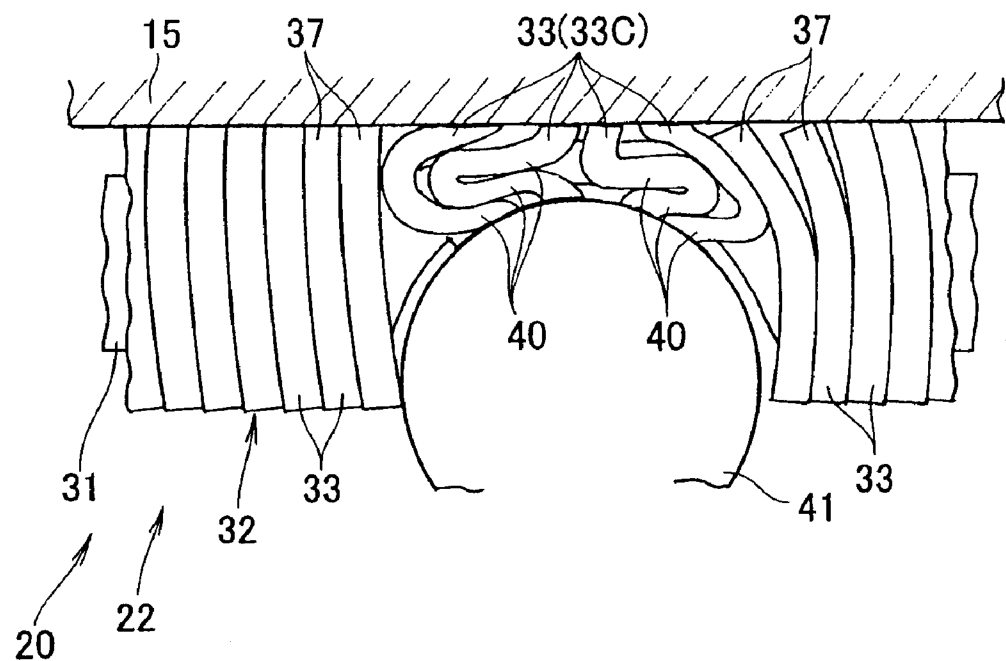

The amount of buckling deformation of the central wound portions 33C become greater than in the state shown in FIG. 6D, as shown in FIG. 6E, and the amount of compressive deformation of the front location 31*c* in the core element 31 becomes greater than in the state shown in FIG. 6D.

Additionally, the location adjacent to the rear portion 37 of the left-side wound portion 33 undergoes bending deformation, and the location (location on the reverse side of the diagram surface) adjacent to the rear portion 37 of the right-side wound portion 33 undergoes bending deformation.

The locations adjacent to the rear portion 37 of the left and right wound portion 33 undergo bending deformation, and thereby generate energy (hereinafter referred to as "bending energy").

At the same time, the buckled and deformed central wound portions 33C in contact with the contact locations 40 are compressed by the rod-shaped object 41. The contact locations 40 of the central wound portions 33C are thereby compressively deformed, and compressive strain energy is generated.

In this manner, frictional energy, buckling deformation energy, and compressive strain energy are generated in the external peripheral element 32 of the impact-absorbing device 20 when the impact-absorbing device 20 has collided with the rod-shaped object 41. At the same time, torsional energy, compressive strain energy, and bending energy are generated in the core element 31 of the impact-absorbing device 20. The impact can thereby be adequately (sufficiently) absorbed by the energy thus generated.

Additionally, the width dimension W1 of the core element 31 in the impact input direction is set to be greater than the height dimension H1, as shown in FIG. 3B. The amount of deformation (deformable portions) during a collision is kept high by setting a large value for the width dimension W1.

In this manner, an impact is adequately absorbed by the generated energy, and the amount of deformation (deformable portions) during a collision is kept high, whereby the impact absorption characteristics remain at an adequate level when the impact-absorbing device 20 has collided with a rod-shaped object 41, and adequate impact absorption can be maintained. The compressive strain energy of the core element 31 can thereby be advantageously generated and the impact can be absorbed even more favorably (sufficiently).

Figure 6F:
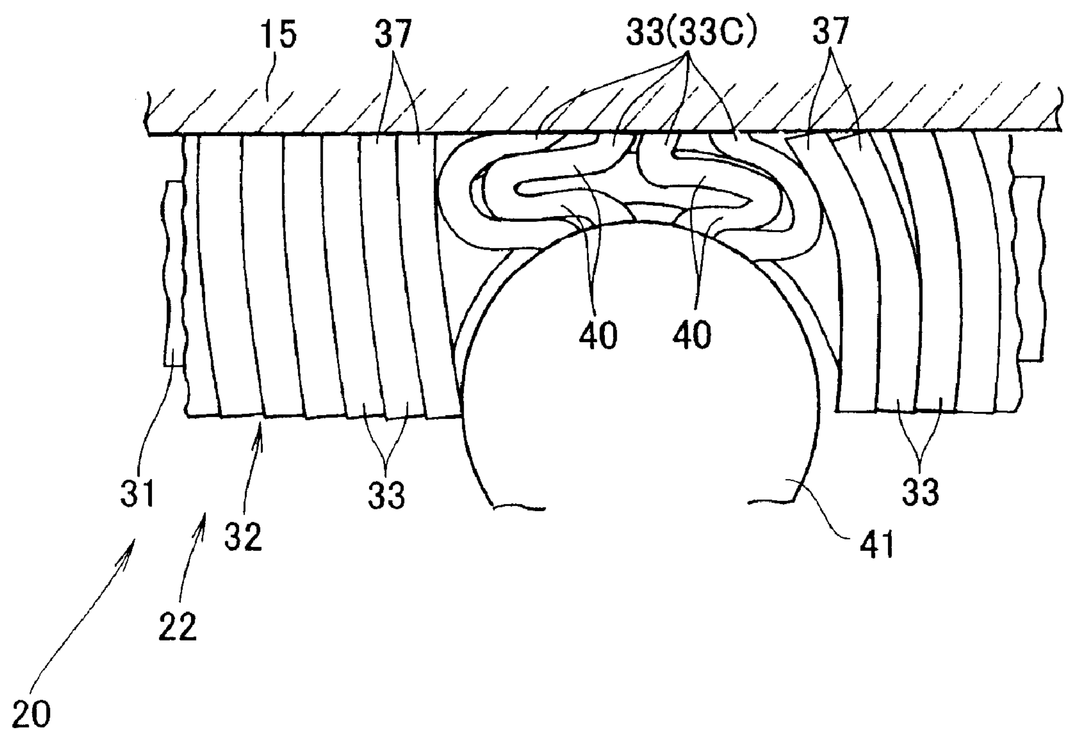

The impact produced by the collision can be sufficiently absorbed, whereby the impact on the central wound portions 33C ceases to exert an effect, as shown in FIG. 6F.

In other words, the buckled and deformed central wound portions 33C undergo slight recovery, and the contact locations 40 of the central wound portions 33C separate from the contacted state.

In this manner, the energy thus generated is adequately (sufficiently) absorbed, the amount of deformation (deformable portion) during a collision is kept high, and an impact that acts on the rod-shaped object 41 can be adequately reduced.

Next, the amount of impact absorption when an impact-absorbing device 20 collides with a rod-shaped object 41 will be described with reference to the graph shown in FIG. 7. In the graph, the vertical axis shows the acceleration (G) of the impact-absorbing device, and the horizontal axis shows the displacement (L) of the impact-absorbing device 20. Curve C shows an example of the relationship between acceleration and displacement of the impact-absorbing device 20 in which the width W2 of the wound portion 33 is set to 10 mm and the space S1 between the wound portions 33, 33 is set to 1 mm.

The impact-absorbing device 20 has a structure in which the right and left end portions 26, 27 of the external peripheral element 32 are held by the shape-holding member 23, as shown in FIG. 2. The external peripheral element 32 can be prevented from moving away in the initial stages of a collision by holding the left and right end portions 26, 27.

Furthermore, the impact absorption characteristics in the initial stage of a collision can be increased by setting the space S1 between the wound portions 33, 33 to be relatively small, i.e., 1 mm. In the initial stages of a collision, acceleration G1 having an advantageous magnitude can thereby be made to act on the rod-shaped object 41 (FIG. 5A), as shown by curve C.

An impact can be absorbed by the frictional energy, buckling deformation energy, torsional energy, compressive strain energy, and bending energy that are generated in the external peripheral element 32 and core element 31 when the impact-absorbing device 20 has collided with the rod-shaped object 41.

The impact absorption characteristics during a collision can be maintained at an adequate level by setting a large value for the width dimension W1 of the core element 31 in the impact input direction, as shown in FIG. 3B.

In this manner, an impact is absorbed by the energy generated in the external peripheral element 32 and core element 31 when the impact-absorbing device 20 has collided with a rod-shaped object 41, and adequate impact absorption characteristics can be maintained during a collision, whereby a relatively uniform acceleration can be made to act on the rod-shaped object 41 from the initial stages of a collision, and the maximum acceleration G2 that acts on the rod-shaped object 41 can be kept low. The impact that acts on the rod-shaped object 41 can thereby be reduced in a favorable manner.

The amount of deformation (i.e., displacement) during a collision can be kept high by setting a large value for the width dimension W1 of the core element 31 in the impact input direction. Adequate impact absorption can thereby be maintained by assuring that the displacement L1 of the impact-absorbing device 20 is a large value, as shown by curve C. In other words, an impact can be sufficiently absorbed by generating compressive strain energy in the core element 31 in a favorable manner.

The impact is sufficiently absorbed, and the buckled and deformed central wound portions 33C thereby undergo slight recovery, as shown in FIG. 8F. Specifically, the displacement of the impact-absorbing device 20 changes from L1 to L2. The displacement L1 and displacement L2 have a relationship in which L1>L2. The impact is thereby sufficiently absorbed by the impact-absorbing device 20, and the impact that acts on the rod-shaped object 41 can be reduced in an even more favorable manner.

Next, an example in which the impact-absorbing device 20 collides with a wall-shaped object (object) 43 will be described with reference to FIGS. 8 and 9.

Figure 8A:
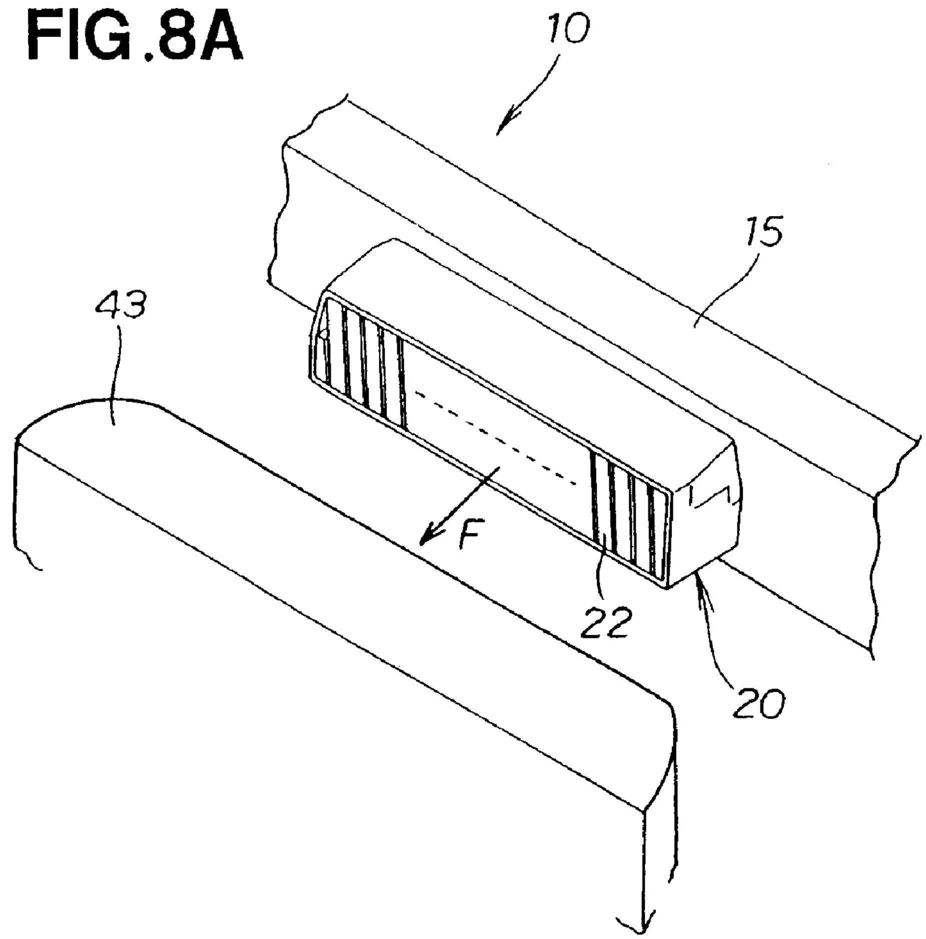
FIGS. 8A and 8B are schematic views showing a state in which the impact-absorbing device of the first embodiment has collided with a wall-shaped object.

In FIG. 8A, the vehicle body 10 moves in the manner indicated by the arrow F, and the impact-absorbing device 20 thereby moves in unison with the front bumper beam 15 in the manner indicated by the arrow F toward the wall-shaped object 43.

Figure 8B:
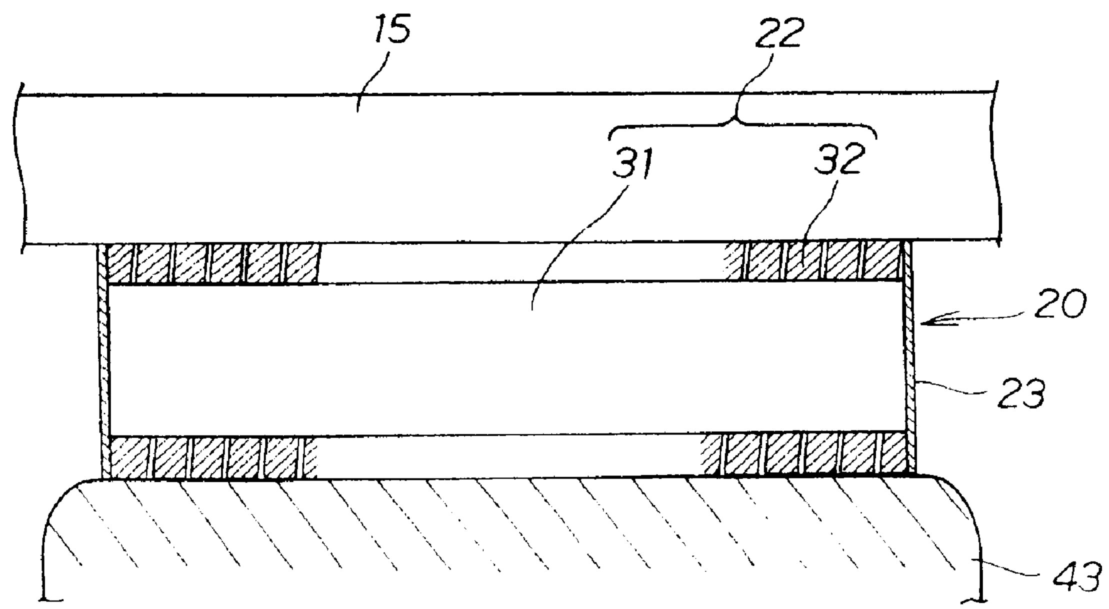

In FIG. 8B, the impact-absorbing device 20 collides with the wall-shaped object 43. Since the wall-shaped object 43 is a wide object, the wall-shaped object 43 collides with the entire surface of the impact-absorbing device 20.

Figure 9A:
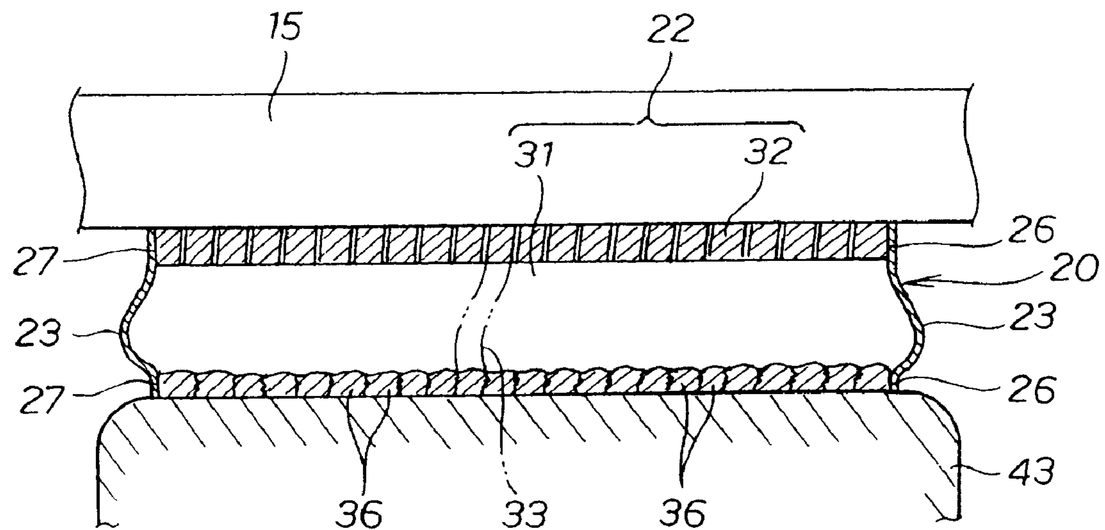
FIGS. 9A and 9B are schematic views showing a state in which the impact-absorbing device shown in FIG. 8 absorbs an impact that acts on the vehicle body.
Figure 9B:
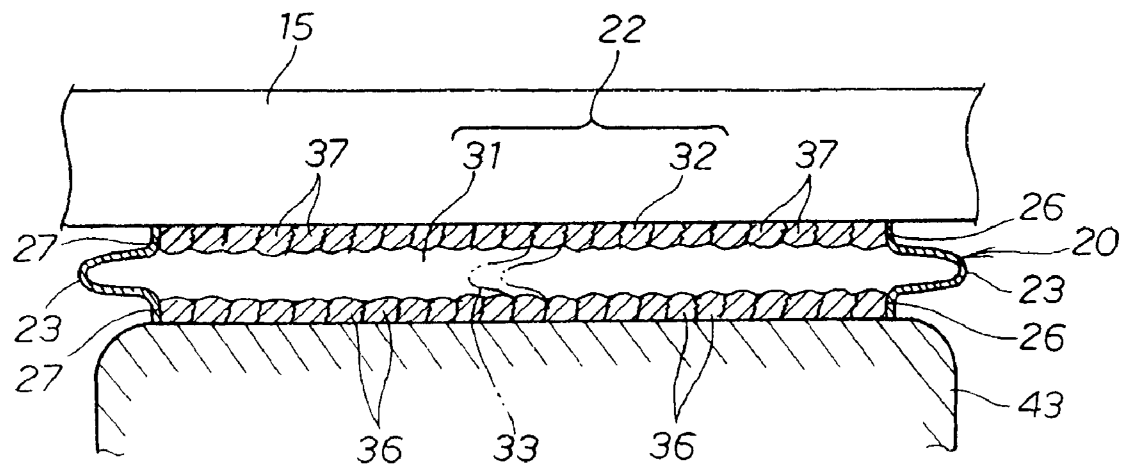

FIGS. 9A and 9B show an example in which an impact that acts on a vehicle body is absorbed by the impact-absorbing device 20.

In FIG. 9A, the impact-absorbing device 20 has a configuration in which the left and right end portions 26, 27 of the external peripheral element 32 are held by the shape-holding member 23 so as not to spread to the left and right sides. Therefore, the front portions 36 of the external peripheral element 32 are kept from moving to the left and right side of the wall-shaped object 43 when the entire surface of the impact-absorbing device 20 collides with the wall-shaped object (object) 43.

The front portions 36 of the wound portion 33 undergo compressive deformation and the wound portions 33 undergo buckling deformation. At the same time, the core element 31 undergoes compressive deformation.

In FIG. 9B, the amount of buckling deformation of the wound portions 33 becomes greater than in the state shown in FIG. 9A, and the compressive amount of deformation of the core element 31 becomes greater than in the state shown in FIG. 9A. The rear portions 37 of the wound portions 33 also undergo compressive deformation.

In this manner, the impact is absorbed by the compressive strain energy generated by the compressive deformation of the wound portions 33, the compressive strain energy generated by the compression deformation of the core element 31, and the buckling deformation energy generated by the buckling deformation of the wound portions 33. The impact can be adequately absorbed and the impact on the vehicle occupants can be favorably reduced.

Next, the impact-absorbing device of the 2nd through 12th embodiments will be described with reference to FIGS. 10 through 34. Members that are the same or similar to the impact-absorbing device 20 of the first embodiment will be assigned the same reference numeral, and a detailed description thereof will be omitted in the description of the 2nd through 12th embodiments.

Figure 10:
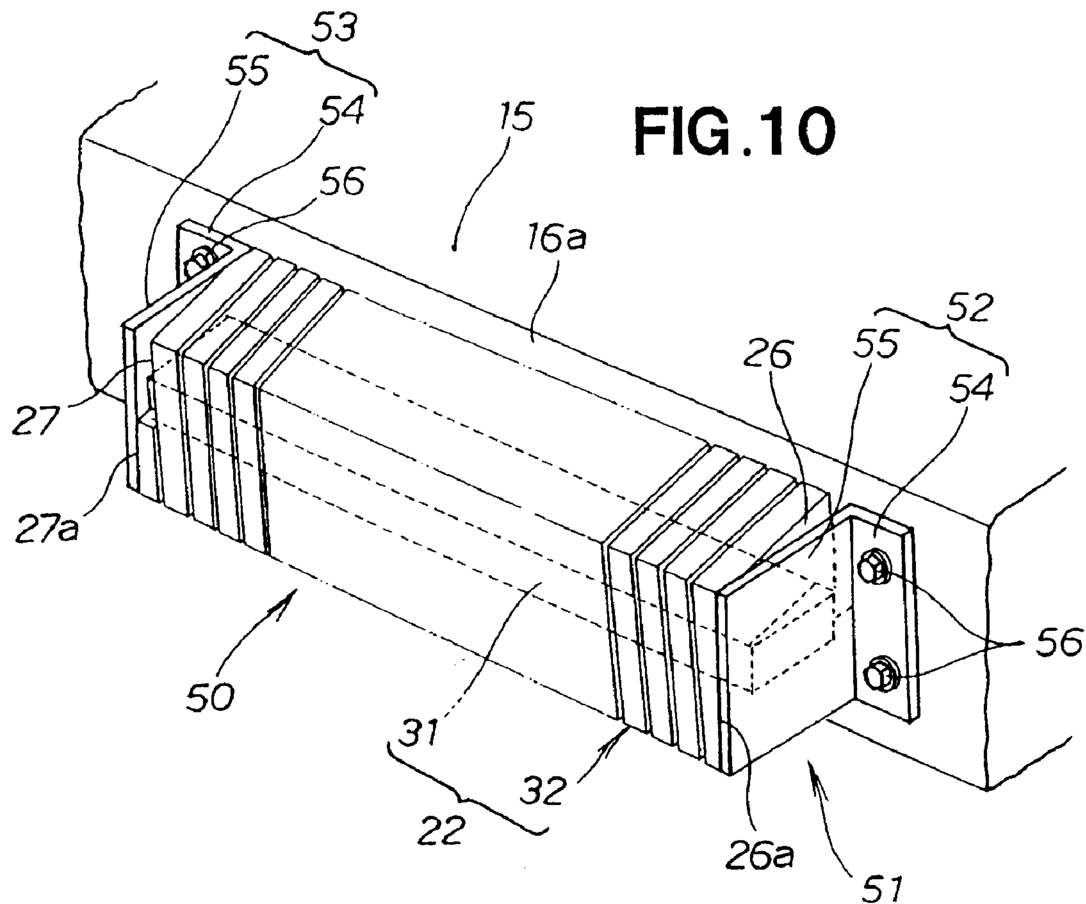
FIG. 10 is a perspective view showing an impact-absorbing device according to a second embodiment of the present invention.

FIG. 10 shows the impact-absorbing device 50 of the second embodiment.

The impact-absorbing device 50 of the second embodiment uses a shape-holding member 51 that has a different structure than that of the shape-holding member 23 of the first embodiment, but the configuration is otherwise the same as that of the impact-absorbing device 20 of the first embodiment.

The shape-holding member 51 of the second embodiment has a left holding body 52 that holds the left end portion 26 of the impact-absorbing member 22, and a right holding member 53 that holds the right end portion 27 of the impact-absorbing member 22.

The left holding body 52 is substantially formed in the shape of the letter L by using a base 54 that can be mounted on the front bumper beam 15 and by using a holding plate 55 disposed on the base 54.

The base 54 is formed in a rectangular shape and can be mounted on the center front portion 16*a* of the front bumper beam 15 using upper and lower bolts 56 and 56.

The holding plate 55 is formed in a rectangular shape, is orthogonal to the center front portion 16*a* from the right end of the base 54, and extends in the direction away from the center front portion 16*a*.

The right holding member 53 is a member that has left/right symmetry with the left holding body 52. The same reference numerals are assigned to the constituent elements and a description thereof is omitted.

In order to hold the impact-absorbing member 22 using the shape-holding member 51, the base 54 of the left holding body 52 is mounted on the center front portion 16*a* using the upper and lower bolts 56 and 56, and the base 54 of the right holding member 53 is mounted on the center front portion 16*a* using the upper and lower bolts 56 and 56.

The holding plate 55 of the left holding body 52 is joined using an adhesive to the left surface 26*a* of the left end portion 26 of the external peripheral element 32, and the holding plate 55 of the right holding member 53 is joined using an adhesive to the left surface 27*a* of the right end portion 27 of the external peripheral element 32. The impact-absorbing member 22 is thereby held between the left and right holding bodies 52 and 53, and the impact-absorbing member 22 is mounted on the center front portion 16*a* of the front bumper beam 15.

In the impact-absorbing device 50 of the second embodiment, the left and right end portions 26, 27 of the external peripheral element 32 are held by the shape-holding member 51, and thereby prevent the left and right end portions 26, 27 of the external peripheral element 32 from spreading out to the left and right sides. In other words, in the impact-absorbing device 50 of the second embodiment, the same effect as in the impact-absorbing device 20 of the first embodiment is obtained.

Figure 11:
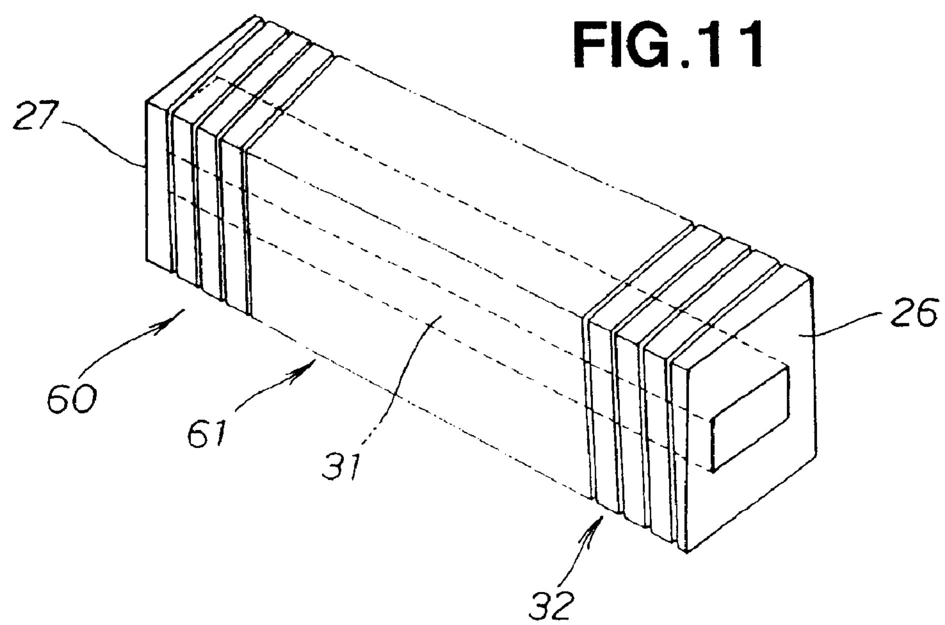
FIG. 11 is a perspective view showing an impact-absorbing device according to a third embodiment of the present invention.

FIG. 11 shows an impact-absorbing device 60 according to a third embodiment. The impact-absorbing device 60 of the third embodiment uses a shape-holding member 61 that has a different structure than that of the shape-holding member 23 of the first embodiment, but the configuration is otherwise the same as that of the impact-absorbing device 20 of the first embodiment.

The shape-holding member 61 of the third embodiment is configured so that the entire surface of the left and right end portions 26, 27 is flat, but the configuration is otherwise the same as that of the impact-absorbing member 22 of the first embodiment.

It is possible to consider cutting the left and right end portions 26, 27 as a method of making the entire surface of the left and right end portions 26, 27 flat.

In the impact-absorbing device 60 of the third embodiment, the same effect as in the impact-absorbing device 20 of the first embodiment is obtained.

FIGS. 12 through 19 show an impact-absorbing device 70 of a fourth embodiment. The impact-absorbing device 70 of the fourth embodiment uses an impact-absorbing device 72 that has a different structure than that of the shape-holding member 23 of the first embodiment, but the configuration is otherwise the same as that of the impact-absorbing member 22 of the first embodiment.

The impact-absorbing member 72 of the fourth embodiment is provided with a core element (guide piece) 73 that is capable of absorbing an impact, and a plurality of vane-form movable elements (movable piece) 74 that is capable of absorbing an impact and fits with the core element 73.

Figure 14A:
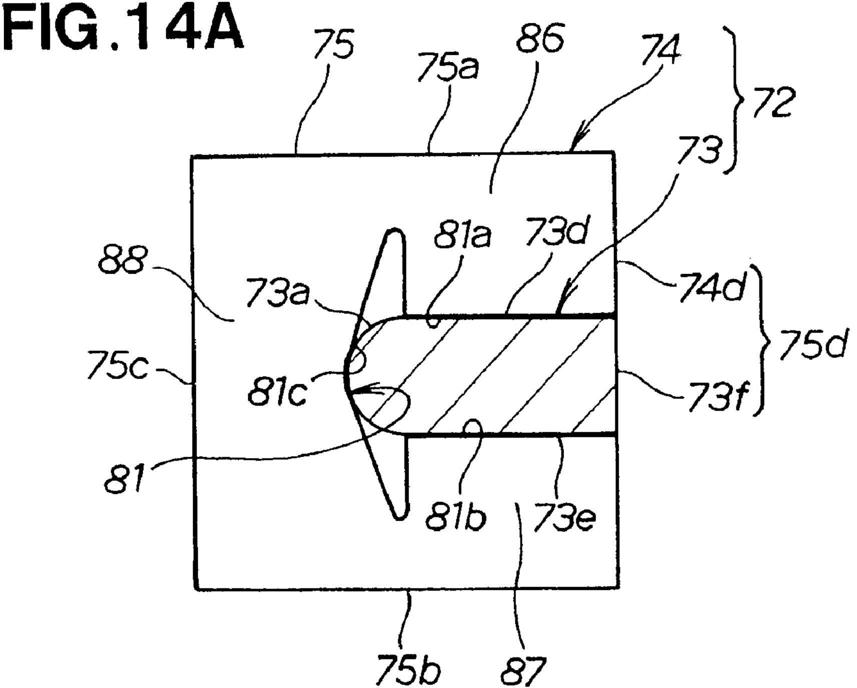
FIG. 14A is a cross-sectional view taken along line 14A-14A of FIG. 13.

The impact-absorbing member 72 is formed substantially in the shape of a rectangle in which the external periphery 75 is formed by the upper and lower surfaces 75*a*, 75*b* and the front and rear surfaces 75*c*, 75*d*, as shown in FIG. 14A, and left and right end surfaces 76, 77 are formed.

The rear surface 75*d* is formed by the rear surfaces 74 of a plurality of vane-form movable elements 74 and the rear surface 73*f* of the core element 73, as shown in FIG. 14A.

Figure 14B:
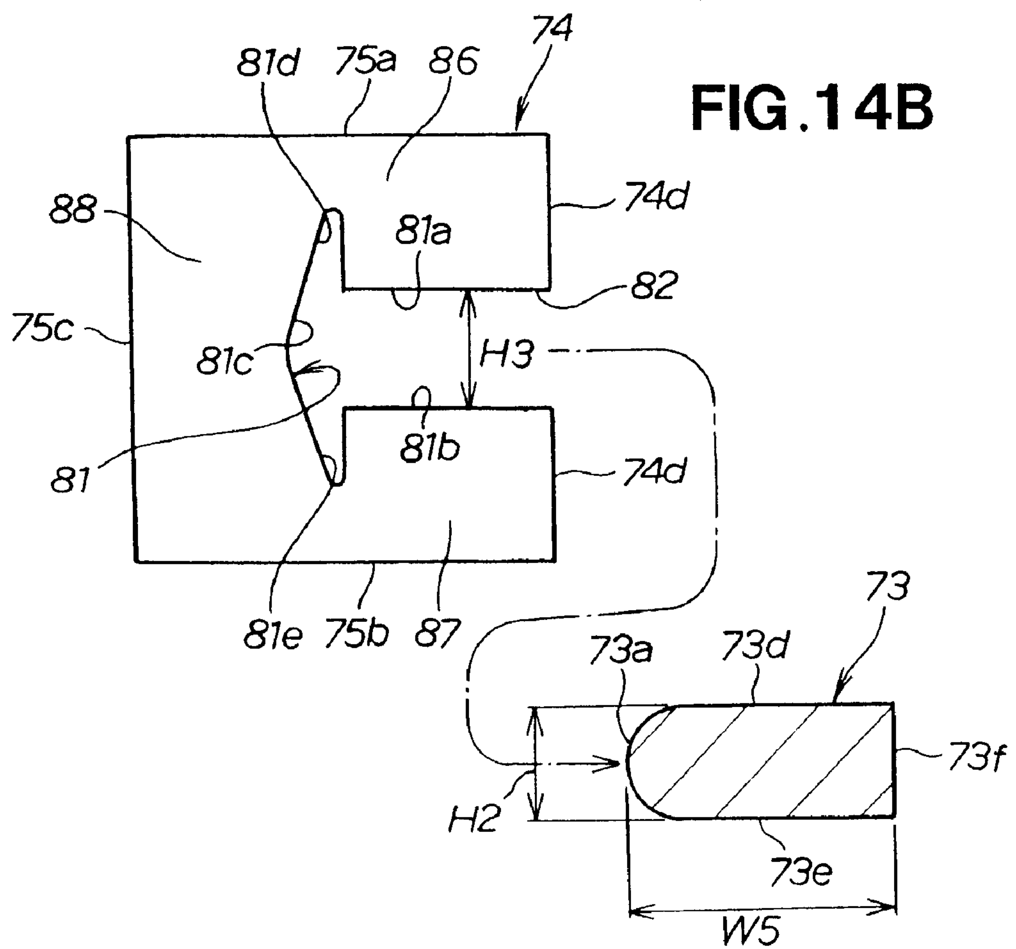
FIG. 14B is an exploded view of the impact-absorbing member of FIG. 14A.

The core element 73 extends in a direction substantially orthogonal to the impact input direction; has a cross-section that is formed substantially in the form of a rectangle, as shown in FIG. 14B (specifically, the front surface 73*a* is formed in a convex curved-shape); and is a strip-shaped member that provides guidance along the inside of the vane-form movable elements 74.

The core element 73 is formed using a lightweight polypropylene (PP) foam material, for example. Specifically, a polypropylene foam material having an expansion ratio of 15 is used as the core element 73. The cross-sectional shape of the core element 73 is set so that the dimension (hereinafter referred to as "width dimension") W5 in the impact input direction is greater than the dimension (hereinafter referred to as "height dimension") H2 in the direction orthogonal to the impact input direction.

In this manner, the width dimension W5 in the impact input direction is set to be greater than the height dimension H2, whereby the impact absorption characteristics during a collision remain at an adequate level, and acceleration can be sufficiently reduced.

Furthermore, the width dimension W5 in the impact input direction is set to be a large value, whereby the amount of deformation (deformable portion) during a collision is kept high and adequate impact-absorption can be maintained.

The impact input direction refers to the arrow direction in which an impact F1 generated by a collision acts on the impact-absorbing device 70 when the impact-absorbing device 70 has collided with an object.

Figure 13:
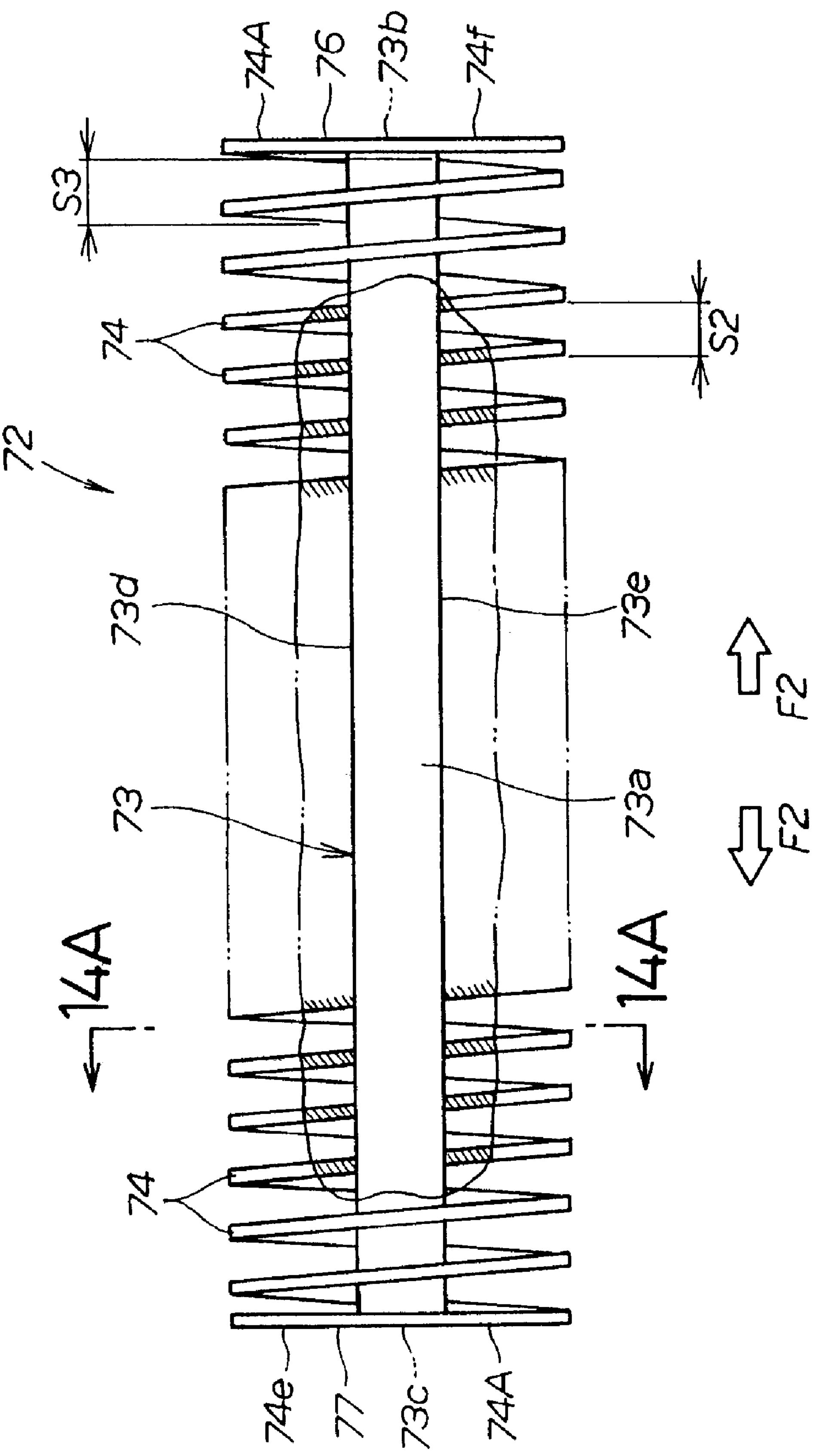
FIG. 13 is a cross-sectional view showing an impact-absorbing member shown in FIG. 12.

The vane-form movable elements 74 are plate-shaped materials that are harder than the core element 73. A plurality of vane-form movable elements 74 is fitted into a predetermined space S2 in the core element 73, and is thereby disposed across the core element 73 from the left end portion 73*b* to the right end portion 73*c* (FIG. 13). The vane-form movable elements 74 act as movable elements capable of moving along the core element 73.

The vane-form movable elements 74 are formed by injection molding polypropylene (PP) resin, for example. The vane-form movable elements 74 are not formed using an foam material, but are rather formed using polypropylene (PP) resin, whereby the rigidity of the vane-form movable elements 74 can be made greater than that of the external peripheral element 32 of the first embodiment. The buildup efficiency of acceleration G in the initial impact can be increased, and the amount of buckling deformation required for impact absorption or the amount of compressive deformation stroke can be reduced.

The vane-form movable elements 74 are flat plate elements having a plate thickness W6 (FIG. 12) formed into a substantially rectangular shape by the front surface 74*a*, the upper and lower surfaces 74*b*, 74*c*, and the rear surface 74*d*, and have a fitting groove 81 formed substantially in the center.

The vane-form movable elements 74 has an upper location 86 located above the fitting groove 81, a lower location 87 located below the fitting groove 81, and a front location 88 located in front of the fitting groove 81. Specifically, the fitting groove 81 extends toward the rear surface 74*d* from substantially the center of the vane-form movable elements 74, as shown in FIG. 14B, and has an opening 82 formed in the rear surface 74*d*.

The fitting groove 81 has upper and lower side walls 81*a*, 81*b* formed in a mutually parallel fashion in the gap H3, and expansion grooves 81*d*, 81*e* that extend in the vertical direction are formed in the front end portion 81*c*. The gap H3 is formed to be slightly larger than the height dimension H2 of the core element 73. Therefore, the fitting groove 81 is fitted onto the core element 73 in the manner indicated by the arrow, as shown in FIG. 14B, whereby the vane-form movable elements 74 are mounted on the core element 73, as shown in FIG. 14A.

The front surface 73*a* of the core element 73 is formed in a concave curved shape, and the front surface 73*a* can thereby be brought into contact with the front end portion 81*c* in a favorable manner.

The upper half 74*e* of the vane-form movable elements 74 is formed so as to slope from the front surface 74*a* to the rear surface 74*d* at angle θ to the right side with respect to a reference line 84. The lower half 74*f* of the vane-form movable elements 74 is formed so as to slope from the front surface 74*a* to the rear surface 74*d* at angle θ to the left side with respect to a reference line 84.

The upper and lower expansion grooves 81*d*, 81*e* are formed on the front end portion 81*c* of the fitting groove 81, whereby the upper half 74*e* and the lower half 74*f* are made to slope at a reasonable angle θ. The reference line 84 is rectilinearly extended so as to be orthogonal to the lengthwise direction of the core element 73. The upper half 74*e* and the lower half 74*f* are each made to slope at angle θ, whereby the vane-form movable elements 74 are configured in a vane shape.

As described above, the vane-form movable elements 74 have a simple shape in comparison with the external peripheral element 32 (FIG. 2) of the first embodiment.

Each of the vane-form movable elements 74 can be separately molded (injection molding), and the vane-form movable elements 74 are therefore molded in a relatively simple manner in comparison with the external peripheral element 32 of the first embodiment. The vane-form movable elements 74 are injection molded using polypropylene (PP), for example.

The upper half 74*e* and lower half 74*f* of the vane-form movable elements 74 are sloped at angle θ, whereby the rear surface 74*d* of the upper half 74*e* and the rear surface 74*d* of the lower half 74*f* are separated by a distance equal to the space S3. Therefore, the vane-form movable elements 74 are formed in a shape that resembles the wound portion 33 (FIG. 2) of the first embodiment.

In this manner, the upper half 74*e* and lower half 74*f* are sloped, and the rear surface 74*d* of the upper half 74*e* and the rear surface 74*d* of the lower half 74*f* are separated by a distance equal to the space S3, whereby the vane-form movable elements 74 can be stably fitted (mounted) onto the core element 73.

The vane-form movable elements 74 haves a shape that resembles the wound portion 33 (FIG. 2). A plurality of vane-form movable elements 74 can thereby be fitted onto the core element 73 having a predetermined space S2 to thereby mount the plurality of vane-form movable elements 74 onto the core element 73 in a substantially helically wound state. In other words, the vane-form movable elements 74 are formed into a shape that resembles the external peripheral element 32 (FIG. 2) of the first embodiment.

In this manner, the plurality of vane-form movable elements 74 is separately formed, and each of the vane-form movable elements 74 is mounted on the core element 73, whereby a helically-shaped movable piece similar to the external peripheral element 32 (FIG. 2) of the first embodiment can be formed in a simple manner.

Among the vane-form movable elements 74, the lower half 74*f* of the vane-form movable elements 74 of the left end portion is formed parallel to the reference line 84, as shown in FIG. 13, and the upper half 74*e* of the vane-form movable elements 74 or the right end portion is formed parallel to the reference line 84.

When the predetermined impact shown in FIG. 13 acts along the core element 73 in the manner indicated by arrow F2, the vane-form movable elements 74 are moved in the lengthwise direction of the core element 73 by the pre-determined impact F2. The predetermined impact F2 is a force that operates when the impact-absorbing device 70 has collided with a rod-shaped object having relatively low rigidity.

In the impact-absorbing member 72, the vane-form movable elements 74 are member that are made to be harder than the core element 73, whereby the vane-form movable elements 74 move in a favorable manner in the lengthwise direction of the core element 73 when the impact-absorbing device 70 has collided with a rod-shaped object having relatively low rigidity.

Figure 12:
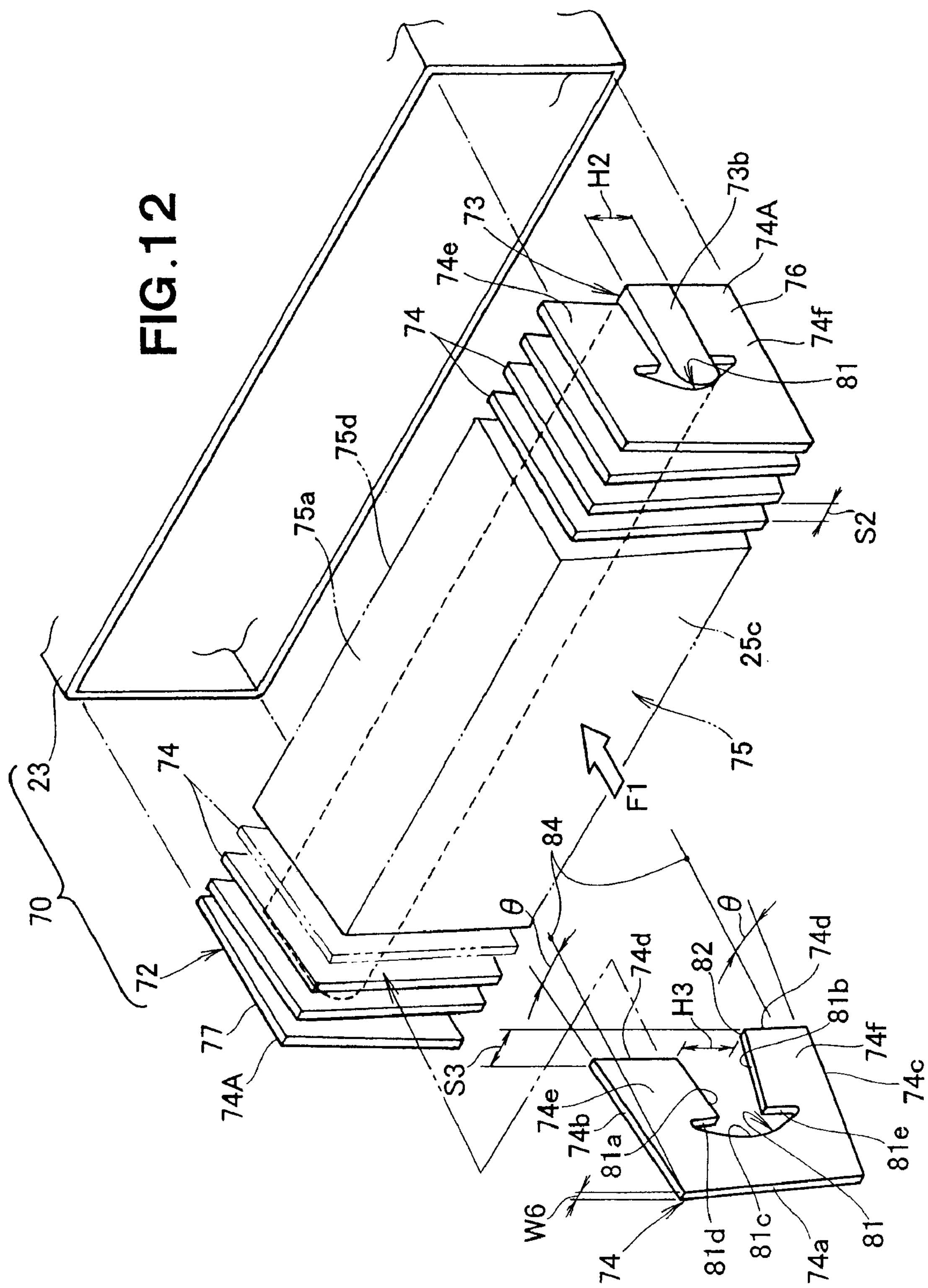
FIG. 12 is an exploded perspective view showing an impact-absorbing device according to a fourth embodiment of the present invention.

The rear surface 74*d* of the upper half 74*e* and the rear surface 74*d* of the lower half 74*f* are separated by a distance equal to the space S3, as shown in FIG. 12, whereby the vane-form movable elements 74 move in an even more favorable manner in the lengthwise direction of the core element 73. This movement generates movement (kinetic) energy in the vane-form movable elements 74, and also generates frictional force (frictional energy) between the core element 73 and the vane-form movable elements 74. The adjacent vane-form movable elements 74, 74 move relative to each other while maintaining mutual contact, and thereby generate frictional force (frictional energy) between the adjacent vane-form movable elements 74, 74.

The impact during a collision is absorbed by the frictional energy generated between the core element 73 and by the vane-form movable elements 74, and the frictional energy generated between the adjacent vane-form movable elements 74, 74, whereby adequate impact absorption can be maintained, and the impact that acts on the reference signal having relatively low rigidity can be reduced in a favorable manner.

In the impact-absorbing member 72, a predetermined space S2 is formed between the adjacent vane-form movable elements 74, 74. Therefore, when the impact-absorbing device 70 has collided with a rod-shaped object having relatively low rigidity and a predetermined impact has acted parallel to the core element 73 in the manner indicated by arrow F2, the adjacent vane-form movable elements 74, 74 make contact with each other after a predetermined length of time has elapsed after the collision. The timing in which the frictional force (frictional energy) is generated between the adjacent vane-form movable elements 74, 74 can thereby be adjusted, and the impact absorption characteristics can be adjusted in a favorable manner.

The impact absorption characteristics in the initial stages of an impact can be weakened by setting the predetermined space S2 between the adjacent vane-form movable elements 74, 74 to be a relatively large value, and the impact absorption characteristics are somewhat increased thereafter.

The impact absorption characteristics in the initial stages of an impact can be increased by setting the predetermined space S2 between the adjacent vane-form movable elements 74, 74 to be a relatively small value, and the impact absorption characteristics can be kept substantially uniform thereafter.

In this manner, an impact that acts on a rod-shaped object having relatively low rigidity can be reduced in an even more favorable manner by adjusting the timing of generating frictional force (frictional energy) between the adjacent vane-form movable elements 74, 74, and adjusting the impact absorption characteristics in a favorable manner.

The vane-form movable elements 74 have a configuration in which, e.g., the width W6 of the vane-form movable elements 74 is 3 mm and the pre-determined space S2 between the adjacent vane-form movable elements 74, 74 is 20 mm, but no limitation is imposed by this configuration.

In the fourth embodiment, an example was described in which the upper half 74*e* of the vane-form movable elements 74 is sloped to the right side, and the lower half 74*f* is sloped to the left side. However, the upper half 74*e* of the vane-form movable elements 74 may be sloped to the left side, and the lower half 74*f* may be sloped to the right side.

The core element 73 and vane-form movable elements 74 are formed from the same material. A lightweight foam material made of polypropylene (PP), for example, is used as the material of the core element 73, and a polypropylene (PP) resin, for example, is used as the material of the vane-form movable elements 74. An example of an foam material of the core element 73 is the use of polypropylene that has an expansion ratio of 15.

The core element 73 is an foam material made of PP, and the vane-form movable elements 74 are PP resin. Therefore, the vane-form movable elements 74 are members that are harder than the core element 73, and the vane-form movable elements 74 move in the lengthwise direction of the core element 73, even when the core element 73 and vane-form movable elements 74 are formed from the same material. This makes it possible to maintain an adequate impact absorption amount or adequate impact absorption characteristics for the impact-absorbing member 72, the materials can be shared among components, and costs can be reduced.

The shape-holding member 23 shown in FIG. 12 surrounds the upper and lower surfaces 75*a*, 75*b* and the left and right end portions 76, 77 of the impact-absorbing member 72. For this reason, among the vane-form movable elements 74, the left and right vane-form movable elements 74, 74 (hereinafter referred to as the left and right end vane-form movable elements 74A, 74A) are held by the shape-holding member 23, and the vane-form movable elements 74 are prevented from moving outward.

The shape-holding member 23 surrounds the impact-absorbing member 72 so that the vane-form movable elements 74 are not obstructed from moving along the core element 73. As an example, among the vane-form movable elements 74, the adjacent vane-form movable elements 74A, 74A of left and right ends slightly protrude in the vertical direction in comparison with the other vane-form movable elements 74, and the shape-holding member 23 is held in a non-contact state with respect to the other vane-form movable elements 74.

The impact-absorbing member 72 is thereby surrounded by the shape-holding member 23, the vane-form movable elements 74 can move along the core element 73 even when the left end portion 76 of the left vane-form movable elements 74A and the right end portion 77 of the right vane-form movable elements 74A are retained, and the vane-form movable elements 74 are prevented from spreading to the left and right side.

For example, low-expansion polypropylene (PP) in the form of a film having a thickness of 100 μm is used as the material of the shape-holding member 23.

Figure 15:
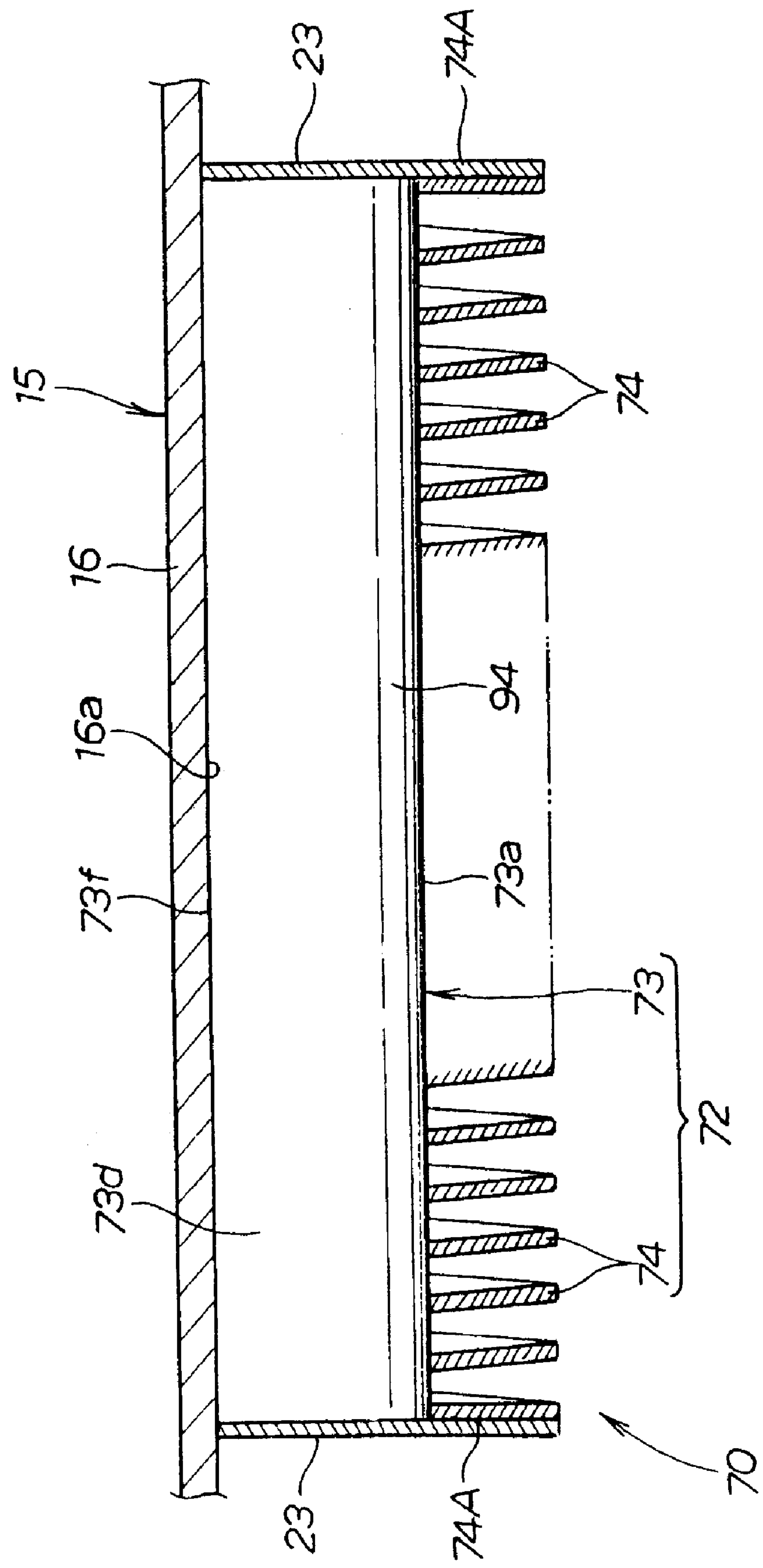
FIG. 15 is a cross-sectional view showing a state in which the impact-absorbing device according to the fourth embodiment is mounted on a front bumper beam.

FIG. 15 shows the state in which the impact-absorbing device 70 of the fourth embodiment is mounted on the front bumper beam 15.

The impact-absorbing device 70 is mounted on the front bumper beam 15 while stored in the bag 21 (FIG. 1) in the same manner as in the first embodiment. Specifically, the impact-absorbing device 70 has a configuration in which the rear surface 73*f* of the core element 73 is joined using an adhesive (not shown) to the center front portion 16*a* of the front bumper beam 15. In this state, the vane-form movable elements 74 are capable of moving along the core element 73 by the impact-absorbing device.

As described above, in the impact-absorbing device 70, the impact-absorbing member 72 is composed two members, i.e., the core element 73 and the vane-form movable elements 74, and the core element 73 and vane-form movable elements 74 are members that can absorb an impact. Therefore, it is possible to reduce impacts against vehicle occupants and against objects having relatively low rigidity.

In this manner, the two members, i.e., the core element 73 and vane-form movable elements 74, are members that are capable of absorbing an impact, and can thereby serve to reduce impacts on objects having relatively low rigidity, and to reduce impacts on vehicle occupants.

The two members, i.e., the core element 73 and vane-form movable elements 74, can be made compact, and the impact-absorbing device 70 can be provided to the front bumper beam 15 in a simple manner by fitting the vane-form movable elements 74 onto the core element 73.

The effects of the impact-absorbing device 70 of the fourth embodiment will be described next with reference to FIGS. 16 through 19.

First, an example will be described in which the impact-absorbing device 70 has collided with a rod-shaped object (object) 41 having relatively low rigidity with reference to FIGS. 16 and 17.

Figure 16A:
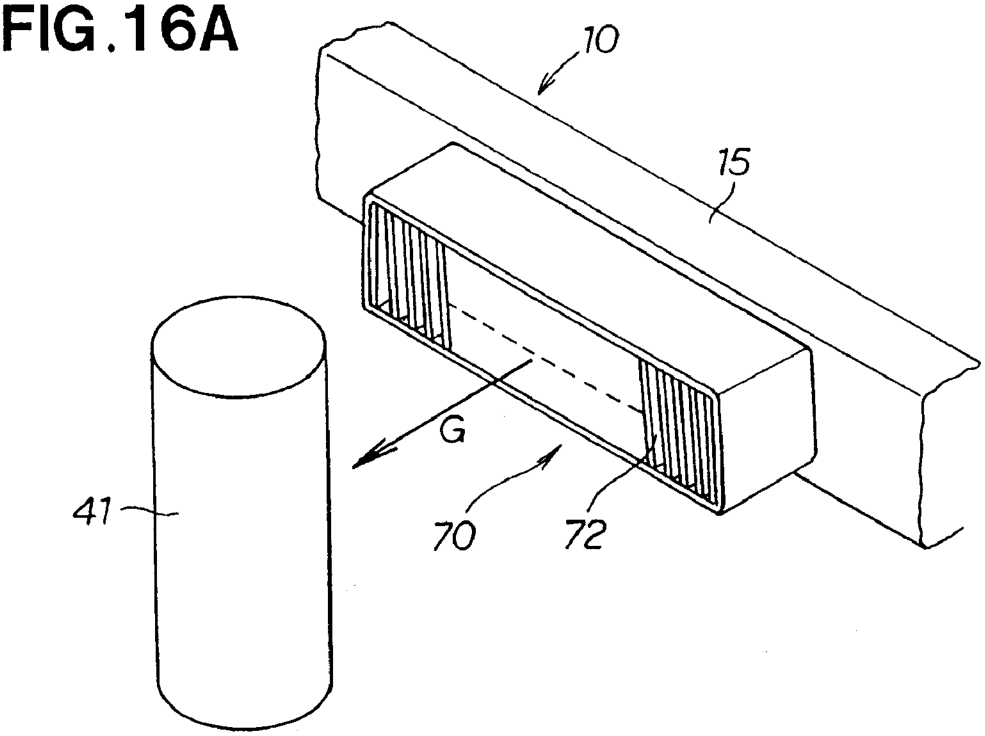
FIGS. 16A and 16B are schematic views showing a state in which the impact-absorbing device according to the fourth embodiment collides with a rod-shaped body.

The vehicle body 10 moves in the manner indicated by arrow G, as shown in FIG. 16A, whereby the impact-absorbing device 70 moves in unison with the front bumper beam 15 in the manner indicated by the arrow toward the rod-shaped object 41 having relatively low rigidity.

Figure 16B:
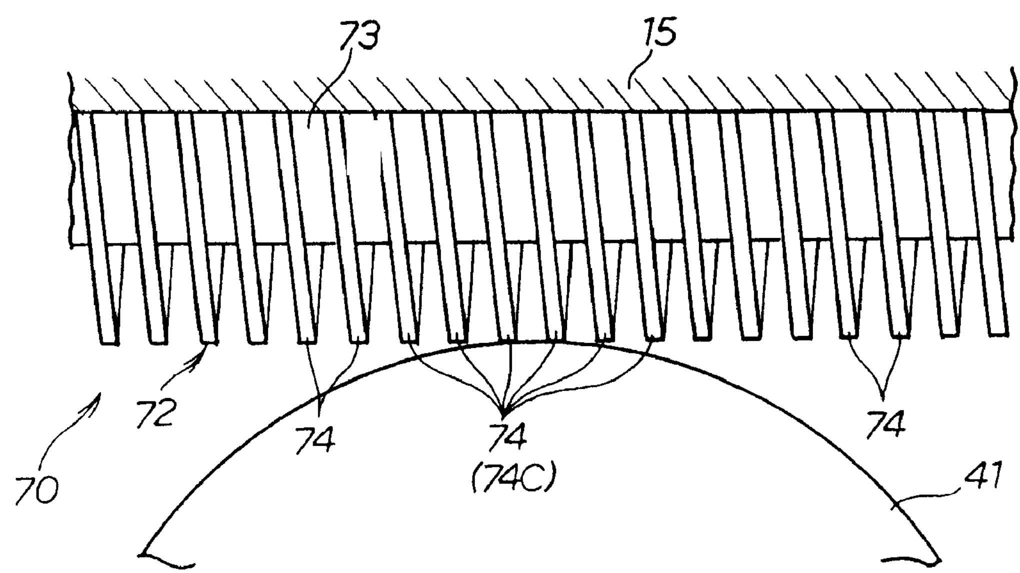

The impact-absorbing device 70 (specifically, the impact-absorbing member 72) collides with the rod-shaped object 41, as shown in FIG. 16B. The rod-shaped object 41 is a cylindrical object that has a relatively small outside diameter, and the plurality of vane-form movable elements 74 (hereinafter referred to as "central vane-form movable elements 74C") positioned in the center of the impact-absorbing member 72 therefore collides with the rod-shaped object 41.

FIGS. 17A through 17D show the state in which an impact is absorbed by the impact-absorbing device 70.

Figure 17A:
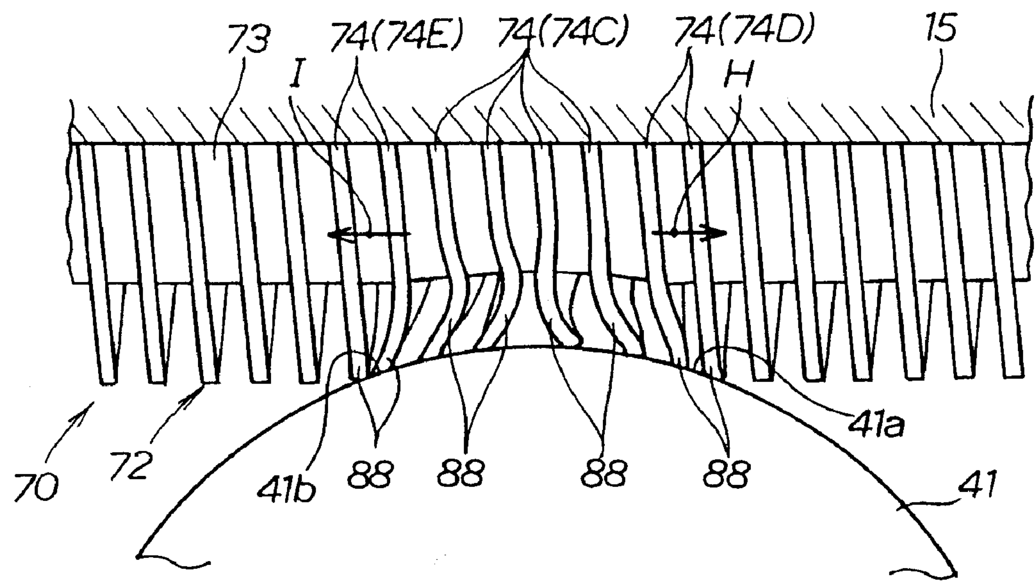
FIGS. 17A to 17D are schematic views showing a state in which impact force that acts on a rod-shaped object is absorbed by the impact-absorbing device shown in FIG. 16.

In FIG. 17A, when the central vane-form movable elements 74C collide with the rod-shaped object 41, a collision force acts on the front locations 88 of the central vane-form movable elements 74C. A buckling load accordingly acts on the central vane-form movable elements 74C, and the central vane-form movable elements 74C undergo buckling deformation. The central vane-form movable elements 74C generate energy (hereinafter referred to as "buckling energy") due to this buckling deformation.

The front locations 88 of the vane-form movable elements 74 (hereinafter referred to as left-side vane-form movable elements 74D) positioned on the left side of the central vane-form movable elements 74C collide with the left-side location 41*a* of the rod-shaped object 41. Therefore, the front locations 88 of the left-side vane-form movable elements 74D undergo bending deformation, are pressed by the left-side location 41*a*, and begin to move in the direction of arrow H.

At the same time, the front locations 88 of the vane-form movable elements 74 (hereinafter referred to as right-side vane-form movable elements 74E) positioned on the right side of the central vane-form movable elements 74C collide with the right-side location 41*b* of the rod-shaped object 41. Therefore, the front locations 88 of the right-side vane-form movable elements 74E undergo bending deformation, are pressed by the right-side location 41*b*, and are caused to start to move in the direction of arrow I.

Figure 17B:
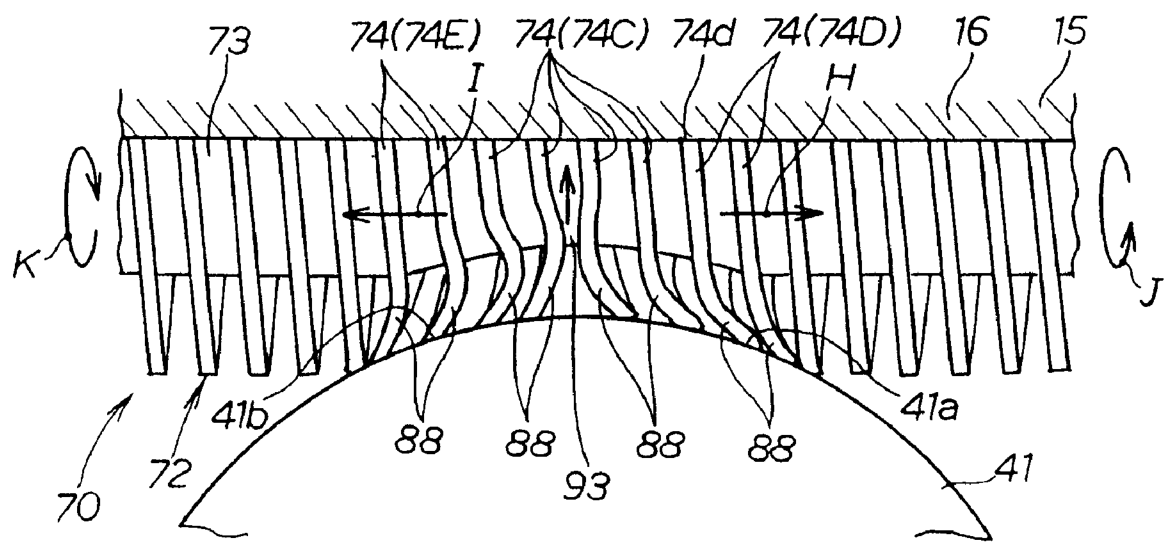

In FIG. 17B, the amount of buckling deformation of the central vane-form movable elements 74C becomes greater than in the state shown in FIG. 17A. Therefore, the front locations 88 of the left-side vane-form movable elements 74D further undergo bending deformation, and the left-side vane-form movable elements 74D move further in the lengthwise direction of the core element 73 in the manner indicated by arrow H. The front locations 88 of the right-side vane-form movable elements 74E also further undergo bending deformation, and the right-side vane-form movable elements 74E move further in the lengthwise direction of the core element 73 in the manner indicated by arrow I.

In this manner, the front locations 88 of the of the left-side vane-form movable elements 74D and the front locations 88 of the right-side vane-form movable elements 74E undergo bending deformation, whereby energy (hereinafter referred to as "bending energy") is generated in the left- and right-side vane-form movable elements 74D and 74E. Additionally, movement (kinetic) energy is generated by the movement of the vane-form movable elements 74, and frictional force (frictional energy) is generated between the moving vane-form movable elements 74 and the core element 73.

Among the vane-form movable elements 74, the left- and right-end vane-form movable elements 74A, 74A (FIG. 15) are held by the shape-holding member 23 so as to not spread to the left and right sides. The left- and right-side vane-form movable elements 74D and 74E move in the lengthwise direction of the core element 73, whereby the adjacent vane-form movable elements 74, 74 are placed in a state of mutual contact.

In this state, the vane-form movable elements 74 move in the lengthwise direction (i.e., the directions of arrows H and I) of the core element 73, whereby the adjacent vane-form movable elements 74, 74 move relative to each other in a state of mutual contact (surface contact). Movement (kinetic)

energy is generated, and the adjacent vane-form movable elements 74, 74 generate frictional force (frictional energy).

Since the vane-form movable elements 74 are substantially helically fitted over the core element 73, the adjacent vane-form movable elements 74, 74 move in the direction of arrow H and the direction of arrow I in a state of mutual contact, and thereby produce torsional force in the vane-form movable elements 74 in the manner indicated by arrows J and K.

The rear surface 74*d* of the vane-form movable elements 74 is in contact with the center portion 16. Therefore, when a torsional force is generated in the vane-form movable elements 74, the torsional force thus generated is expended by the deformation in the lengthwise direction of the core element 73. In this manner, deformation occurs in the lengthwise direction of the core element 73 due to the torsional force generated in the vane-form movable elements 74, and energy (hereinafter referred to as "torsional energy") is produced thereby.

The amount of buckling deformation of the central vane-form movable elements 74C increases, whereby the front location 93 of the core element 73 is pressed by the front locations 88 of the central vane-form movable elements 74C in the manner indicated by the arrow. The front location 93 of the core element 73 is thereby caused to undergo compressive deformation and generate compressive strain energy.

Figure 17C:
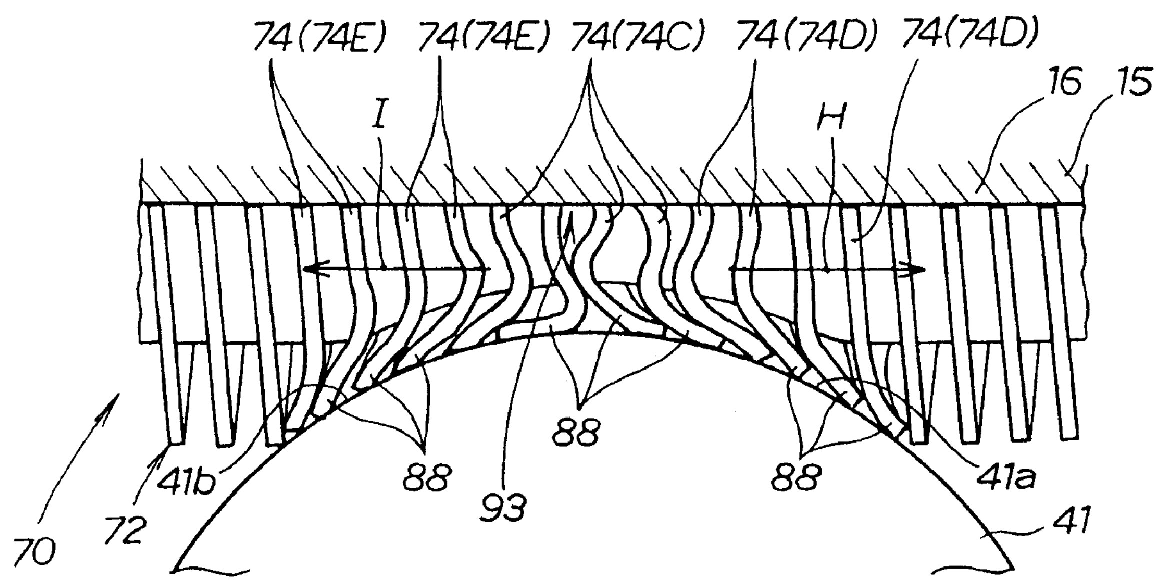

In FIG. 17C, the amount of buckling deformation of the vane-form movable elements 74 becomes greater than in the state shown in FIG. 17B, and the amount of compressive deformation of the front location 93 of the core element 31 becomes greater than in the state shown in FIG. 17B.

Since the front locations 88 of the central vane-form movable elements 74C press the left- and right-side vane-form movable elements 74D and 74E in the left and right directions, the left-side vane-form movable elements 74D move in a favorable manner in the lengthwise direction of the core element 73 in the manner indicated by arrow H, and the right-side vane-form movable elements 74E move in a favorable manner in the lengthwise direction of the core element 73 in the manner indicated by arrow I.

Figure 17D:
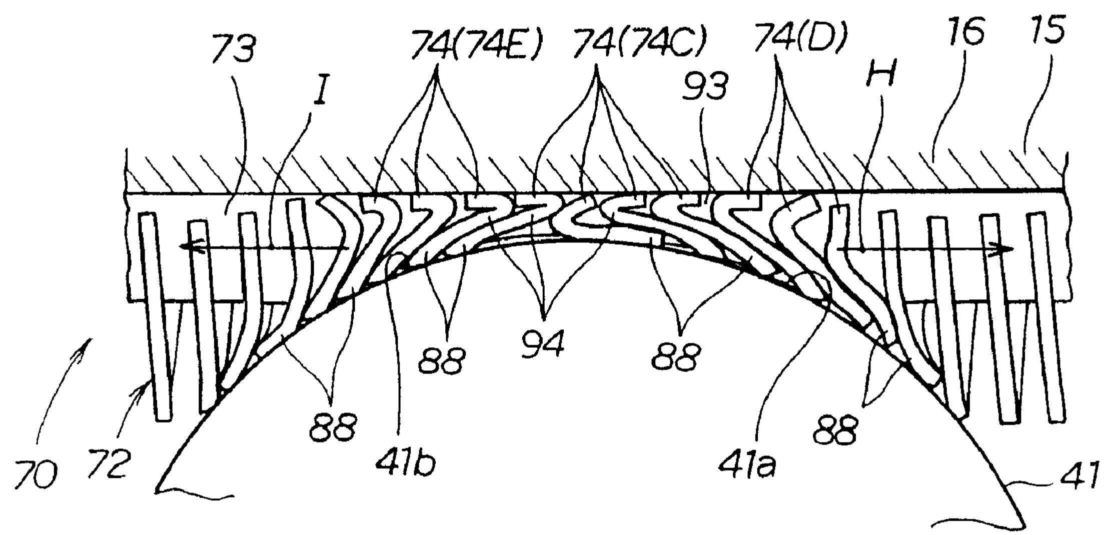

In FIG. 17D, the amount of buckling deformation of the central vane-form movable elements 74C becomes greater than in the state shown in FIG. 17C, whereby the amount of buckling deformation of the front location 93 in the core element 73 becomes greater than in the state shown in FIG. 17C, the left-side vane-form movable elements 74D further undergo bending deformation, and the left-side vane-form movable elements 74D moves further in the lengthwise direction of the core element 73 in the manner indicated by arrow H. In the same manner, the right-side vane-form movable elements 74E further undergoes bending deformation, and the right-side vane-form movable elements 74E moves further in the lengthwise direction of the core element 73 in the manner indicated by arrow I.

At the same time, the buckled and deformed central vane-form movable elements 74C in contact with the contact locations 94 are compressed by the rod-shaped object 41. The contact locations 94 of the central vane-form movable elements 74C are therefore compressively deformed, and compressive strain energy is generated.

In this manner, frictional energy, buckling deformation energy, and compressive strain energy are generated in the vane-form movable elements 74 of the impact-absorbing device 70 when the impact-absorbing device 70 collides with the rod-shaped object 41. At the same time, torsional energy, compressive strain energy, and bending energy are generated in the core element 73 of the impact-absorbing device 70. The impact can thereby be adequately (sufficiently) absorbed by the energy thus generated.

The width dimension W5 of the core element 73 in the impact input direction is set to be greater than the height dimension H2, as shown in FIG. 14B. The amount of deformation (deformable portions) during a collision can therefore be kept at a high level.

In this manner, an impact is adequately absorbed by the generated energy, and the amount of deformation (deformable portions) during a collision is kept high, whereby the impact absorption characteristics remain at an adequate level when the impact-absorbing device 70 has collided with a rod-shaped object 41, and adequate impact absorption can be maintained. The compressive strain energy of the core element 73 can thereby be advantageously generated, and the impact can be absorbed in an even more favorable (sufficient) manner.

Next, an example in which the impact-absorbing device 70 collides with a wall-shaped object (object) 43 will be described with reference to FIGS. 18 and 19.

Figure 18A:
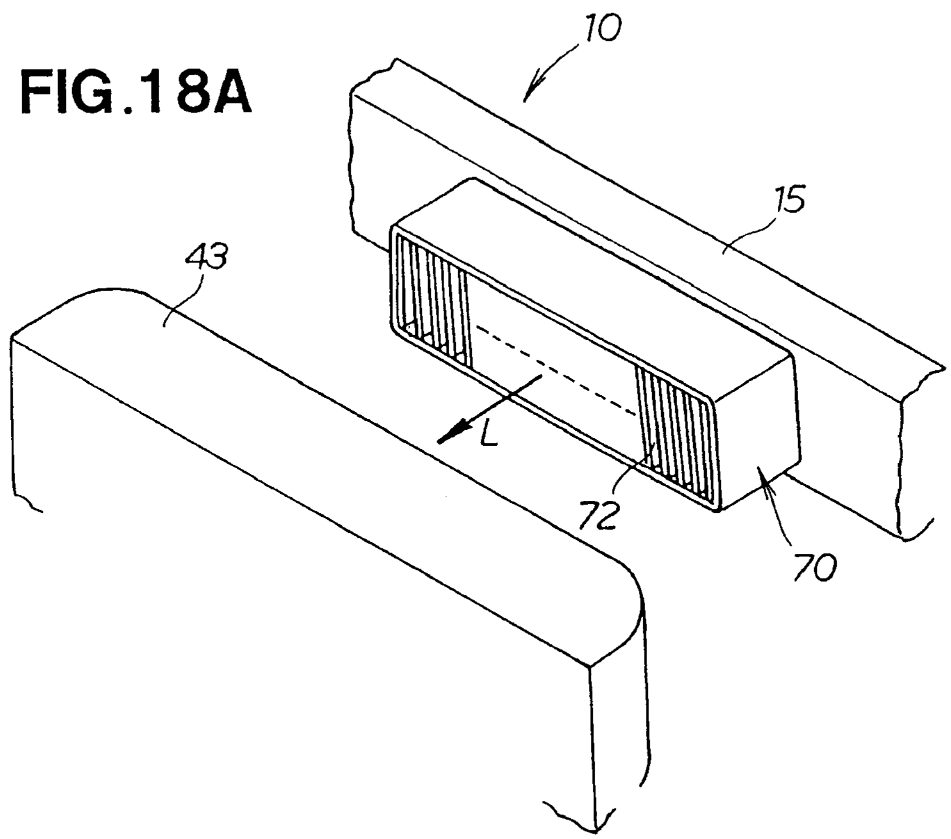
FIGS. 18A and 18B are schematic views showing a state in which the impact-absorbing device according to the fourth embodiment collides with a wall-shaped object.

In FIG. 18A, the vehicle body 10 moves in the manner indicated by arrow L, and the impact-absorbing device 70 thereby moves in unison with the front bumper beam 15 in the manner indicated by arrow L toward the wall-shaped object 43.

Figure 18B:
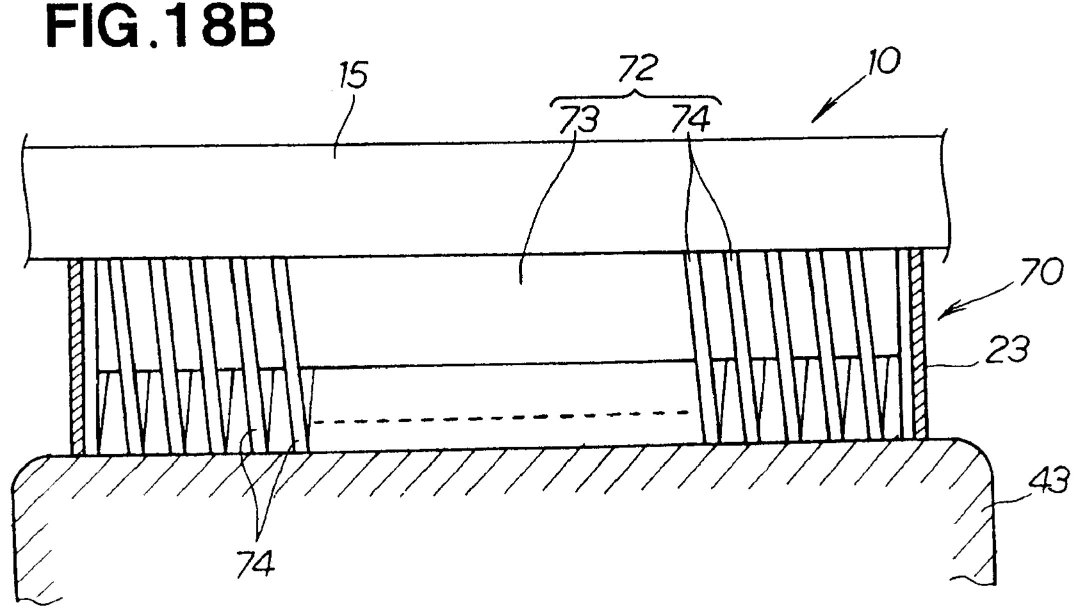

In FIG. 18B, the impact-absorbing device 70 collides with the wall-shaped object 43. Since the wall-shaped object 43 is a wide object, the entire surface of the impact-absorbing device 70 collides with the wall-shaped object 43.

Figure 19A:
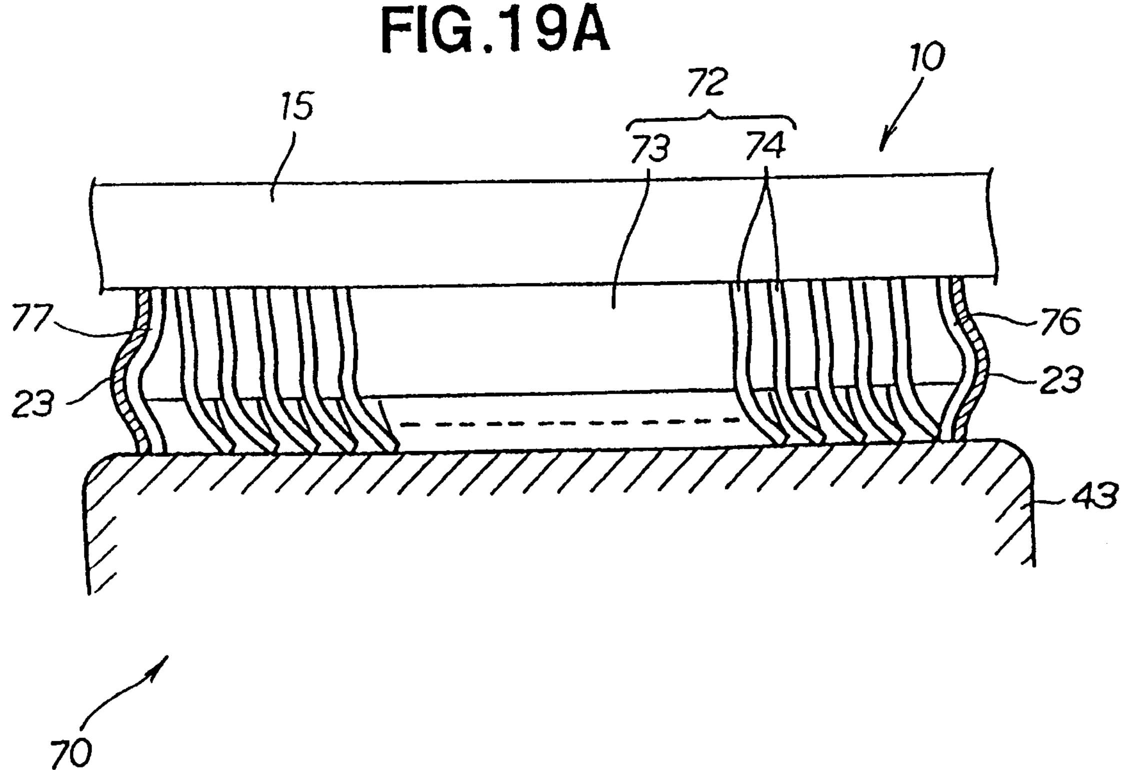
FIGS. 19A and 19B are schematic views showing a state in which an impact force that acts on a vehicle body is absorbed by the impact-absorbing device shown in FIG. 18.
Figure 19B:
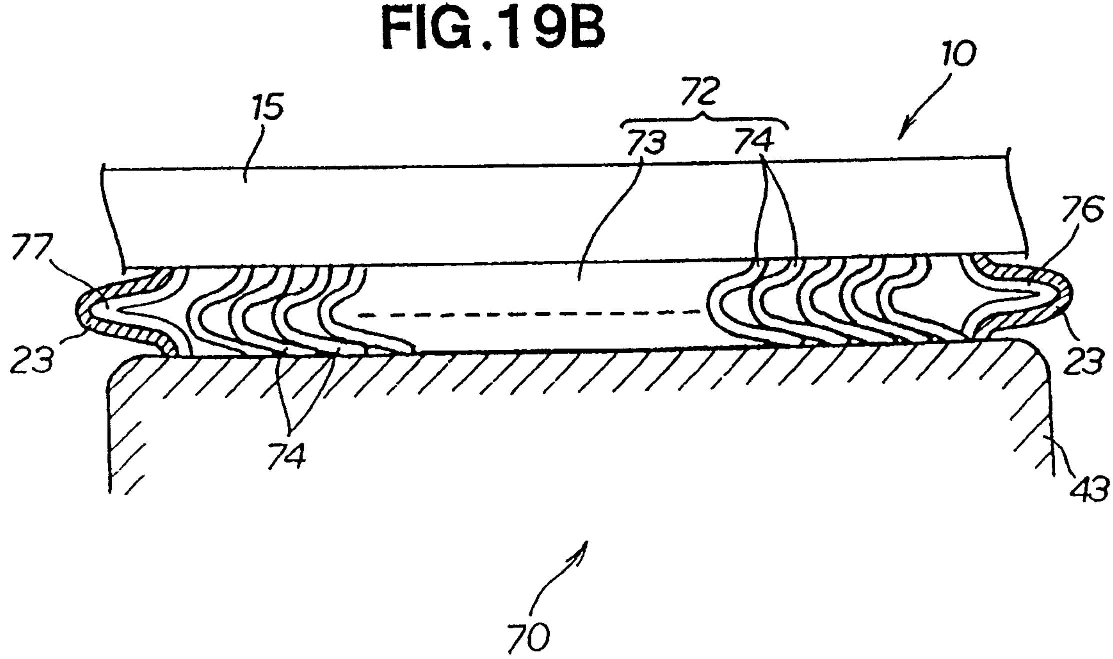

FIGS. 19A and 19B show an example in which an impact is absorbed by the impact-absorbing device 70.

In FIG. 19A, the impact-absorbing device 70 has a configuration in which the left and right end portions 76, 77 of the vane-form movable elements 74 are held by the shape-holding member 23 so as not to spread to the left and right sides. The vane-form movable elements 74 undergo buckling deformation, and the core element 73 undergoes compressive deformation when the entire surface of the impact-absorbing device 70 has collided with the wall-shaped object (object) 43.

In FIG. 19B, the amount of buckling deformation of the vane-form movable elements 74 becomes greater than in the state shown in FIG. 19A, and the amount of compressive deformation of the core element 73 becomes greater than in the state shown in FIG. 19A. The vane-form movable elements 74 undergo sufficient buckling deformation, the core element 73 undergoes sufficient compressive deformation, and the vane-form movable elements 74 then undergo compressive deformation.

In this manner, the impact is absorbed by the buckling deformation energy generated by the buckling deformation of the vane-form movable elements 74, the compressive strain energy generated by the compressive deformation of the core element 73, and the compressive strain energy generated by the compression deformation of the vane-form movable elements 74. The impact can thereby be absorbed in a favorable manner, and the impact on the vehicle occupants can be favorably reduced.

As described above, in the impact-absorbing device 70 of the fourth embodiment, the same effect as the impact-absorbing device 20 of the first embodiment is obtained.

The rigidity of the vane-form movable elements 74 can be increased in comparison with the external peripheral element 32 of the first embodiment by forming the vane-form movable elements 74 using polypropylene (PP) resin rather than using an foam material. The buildup efficiency of acceleration G in the initial impact can be increased, making it possible to reduce the stroke for the amount of compressive deformation or the amount of buckling deformation required for impact absorption.

The vane-form movable elements 74 are separately molded (by injection molding), and the vane-form movable elements 74 are mounted on the core element 73. A helically-shaped movable piece similar to the external peripheral element 32 (FIG. 2) of the first embodiment can thereby be obtained at low cost.

In the fourth embodiment, an example was described in which a plurality of vane-form movable elements 74 is separately formed, but no limitation is imposed by this configuration, and the vane-form movable elements 74 may be integrally formed.

Figure 20:
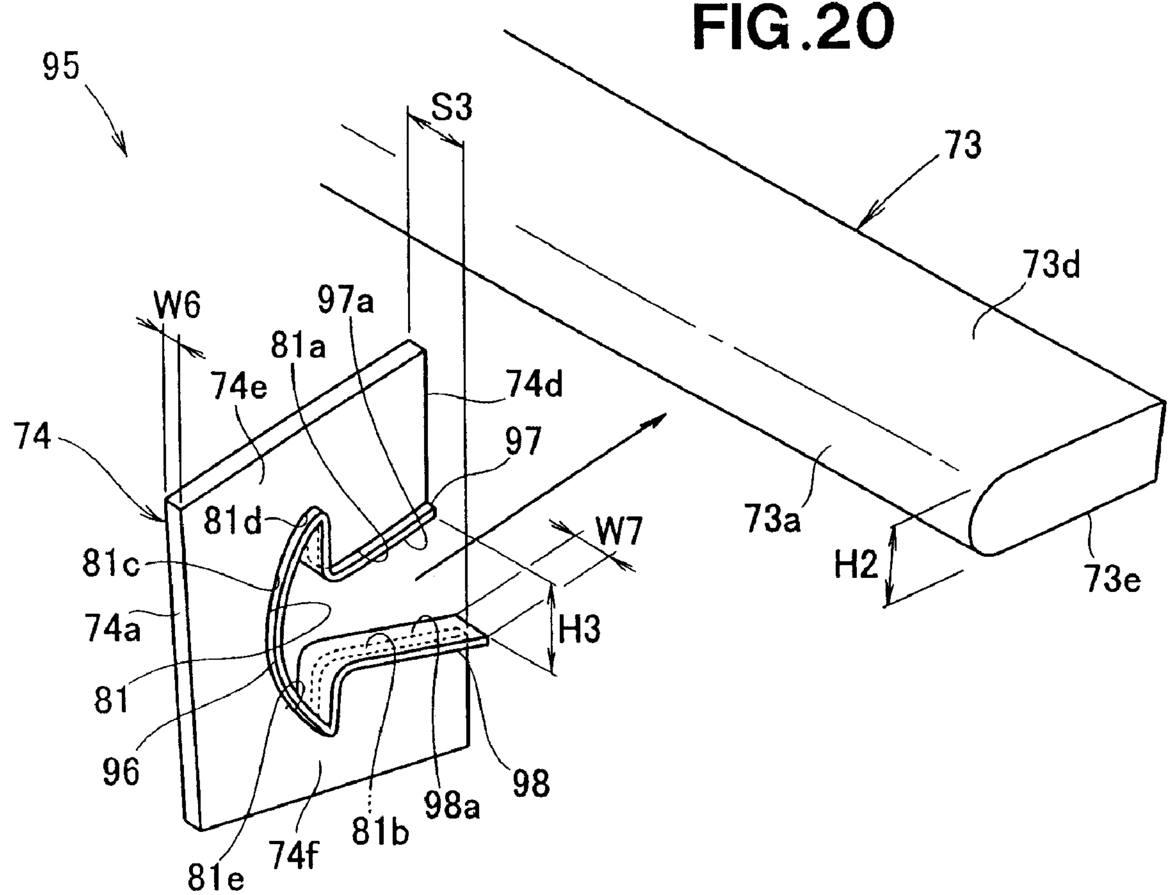
FIG. 20 is an exploded perspective view showing an impact-absorbing device according to a fifth embodiment of the present invention.

FIG. 20 shows an impact-absorbing member 95 of the fifth embodiment. The impact-absorbing member 95 of the fifth embodiment is one in which a projecting piece 96 is added to the impact-absorbing member 72 (FIG. 12) of the fourth embodiment, but the configuration is otherwise the same as that of the impact-absorbing device 70 of the fourth embodiment.

The impact-absorbing member 95 of the fifth embodiment is provided with a core element 73 that is capable of absorbing an impact, a plurality of vane-form movable elements 74 that is fitted onto the core element 73 and is capable of absorbing an impact, and a projecting piece 96 in which the fitting groove 81 of the vane-form movable elements 74 is formed.

The projecting piece 96 is a piece that is projected along upper and lower side walls 81*a*, 81*b*, front end portion 81*c*, and upper and lower expansion grooves 81*d*, 81*e* of the fitting groove 81 shown in FIG. 12, and has a width W7 to the left and right sides of the vane-form movable elements 74. The width W7 of the projecting piece 96 and the width W6 of the vane-form movable elements 74 have a relationship in which W7>W6.

The projecting piece 96 has an upper-side projecting portion 97 and a lower-side projection portion 98. The lower surface 97*a* of the upper-side projecting portion 97 and the upper surface 98*a* of the lower-side projection portion 98 are formed parallel to each other in the gap H3.

The gap H3 is formed to be slightly larger than the height dimension H2 of the core element 73, and the fitting groove 81 is therefore fitted onto the core element 73 in the manner indicated by the arrow. The vane-form movable elements 74 are thereby mounted on the core element 73 in the same manner as in the fourth embodiment.

In the impact-absorbing member 95 of the fifth embodiment, the relationship between the width W7 of the projecting piece 96 and the width W6 of the vane-form movable elements 74 is W7>W6, whereby the vane-form movable elements 74 can be more stably fitted onto the core element 73, and the vane-form movable elements 74 can be moved in the lengthwise direction of the core element 73 in an even more favorable manner.

The gaps between the vane-form movable elements 74 can be suitably adjusted in accordance with the service mode by adjusting the width W7 of the projecting piece 96, and the frictional force that acts between the projecting piece 96 and core element 73 can be suitably adjusted in accordance with the service mode.

In the impact-absorbing member 95 of the fifth embodiment, the same effect as in the impact-absorbing member 72 of the fourth embodiment can be obtained.

Figure 21:
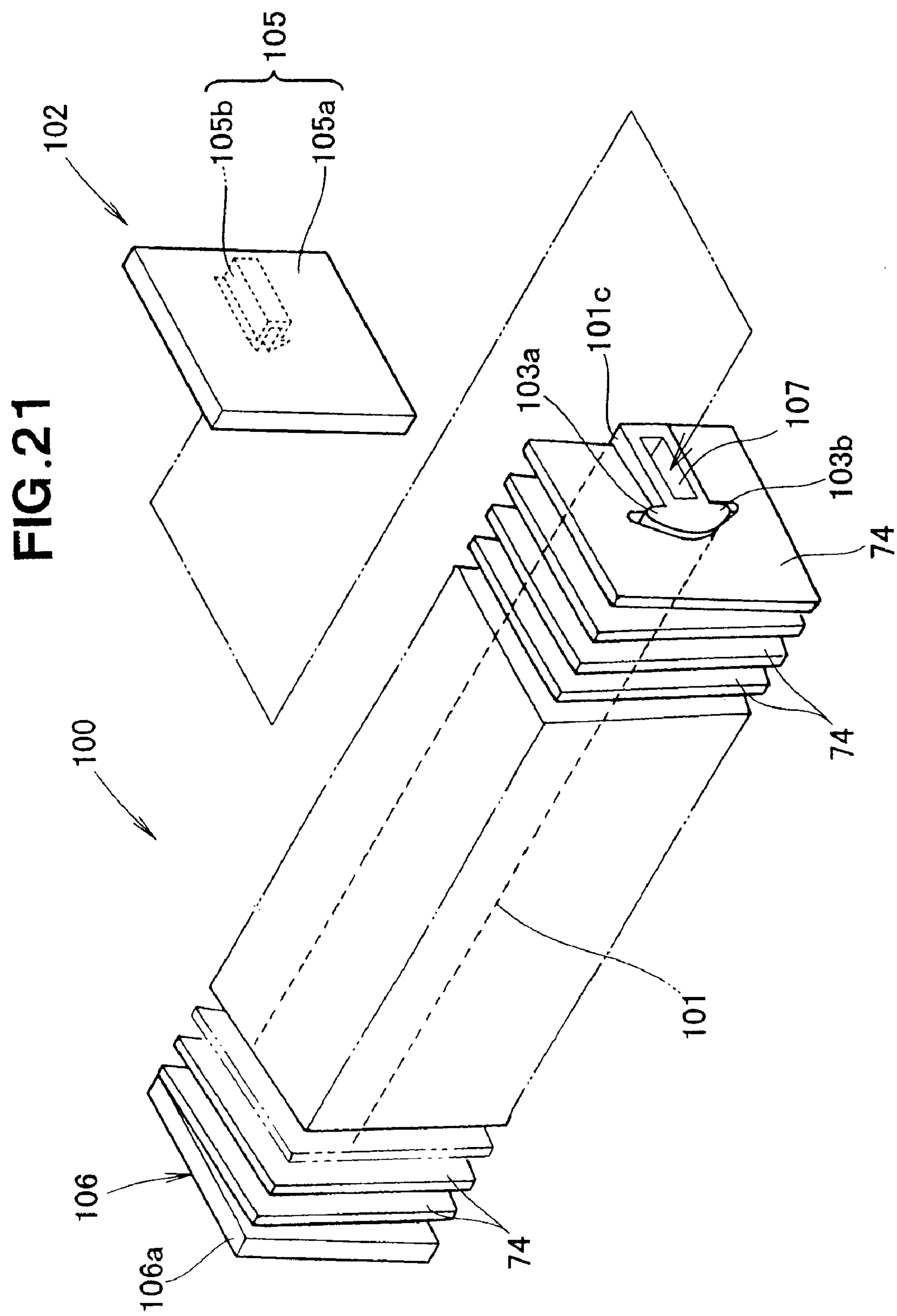
FIG. 21 is an exploded perspective view showing an impact-absorbing device according to a sixth embodiment of the present invention.
Figure 22:
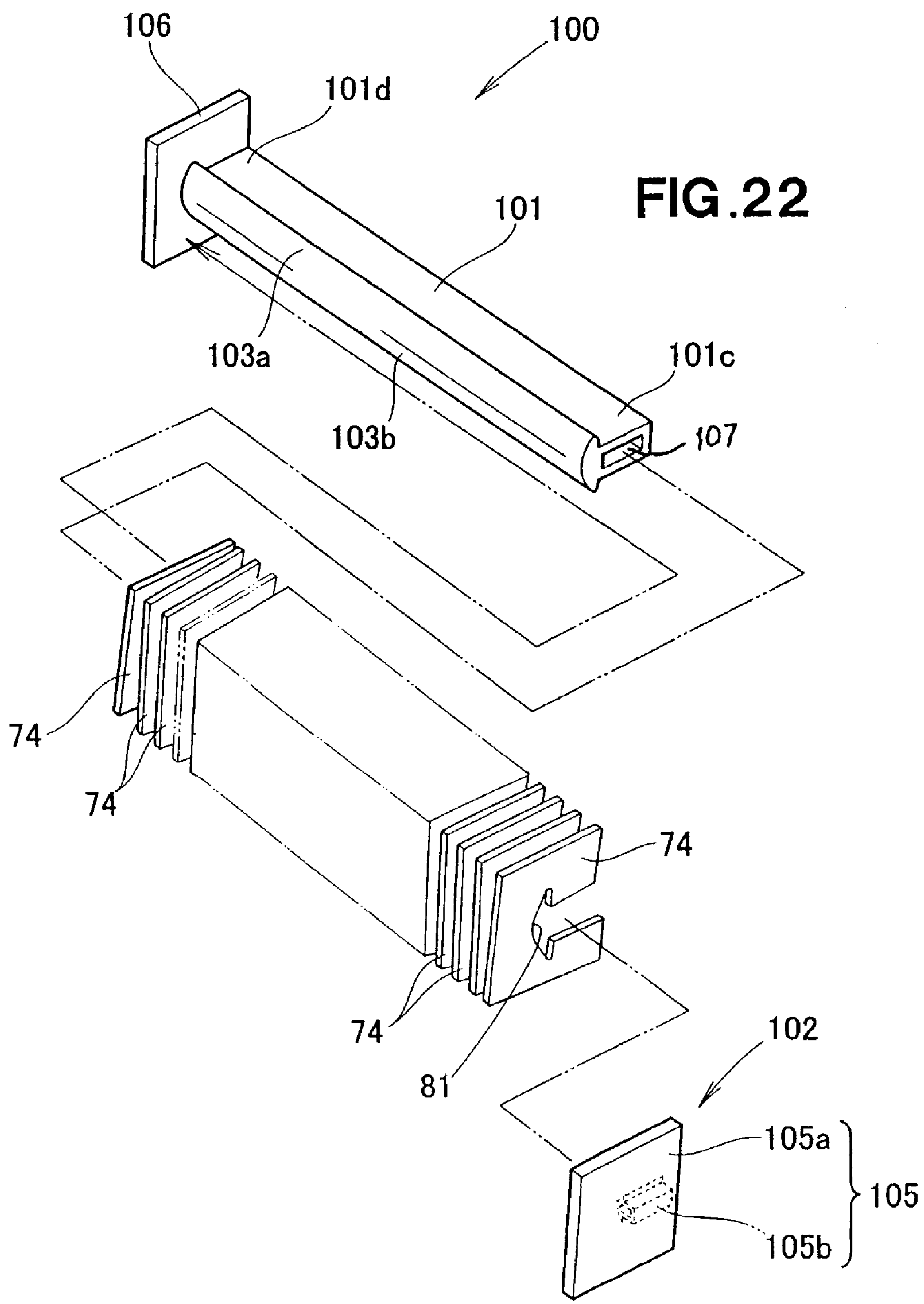
FIG. 22 is a further exploded perspective view of the impact-absorbing device shown in FIG. 21.

FIGS. 21 through 23 show an impact-absorbing device 100 according to a sixth embodiment. The impact-absorbing device 100 of the sixth embodiment uses a shape-holding member 102 and a core element (guide piece) 101 that has a different structure than that of the core element 73 of the fourth embodiment, but the configuration is otherwise the same as that of the impact-absorbing device 70 of the fourth embodiment.

Figure 23A:
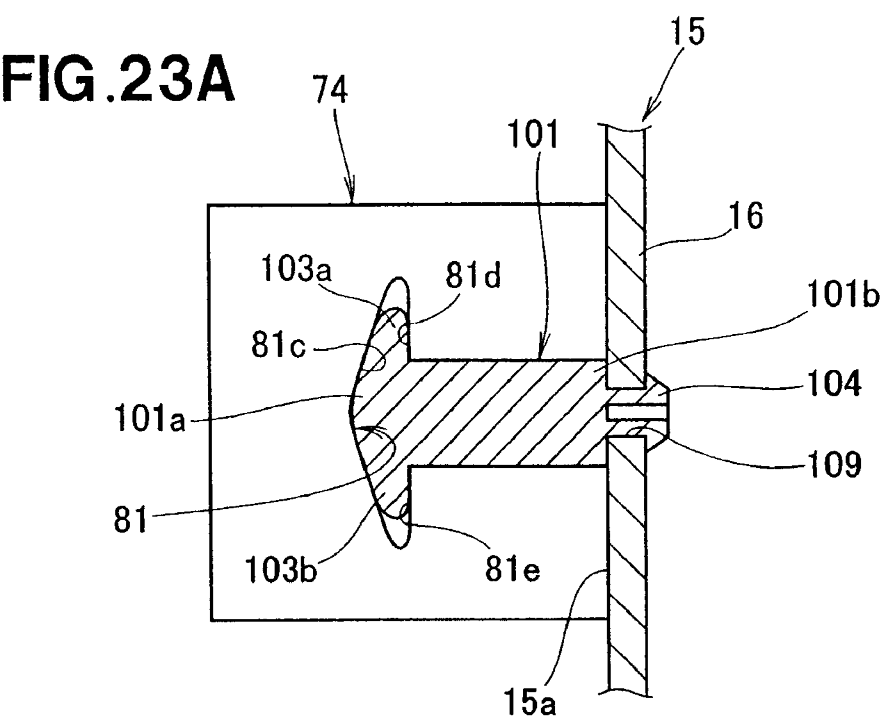
FIGS. 23A and 23B are a cross-sectional view and an exploded view of the impact-absorbing device according to the sixth embodiment.
Figure 23B:
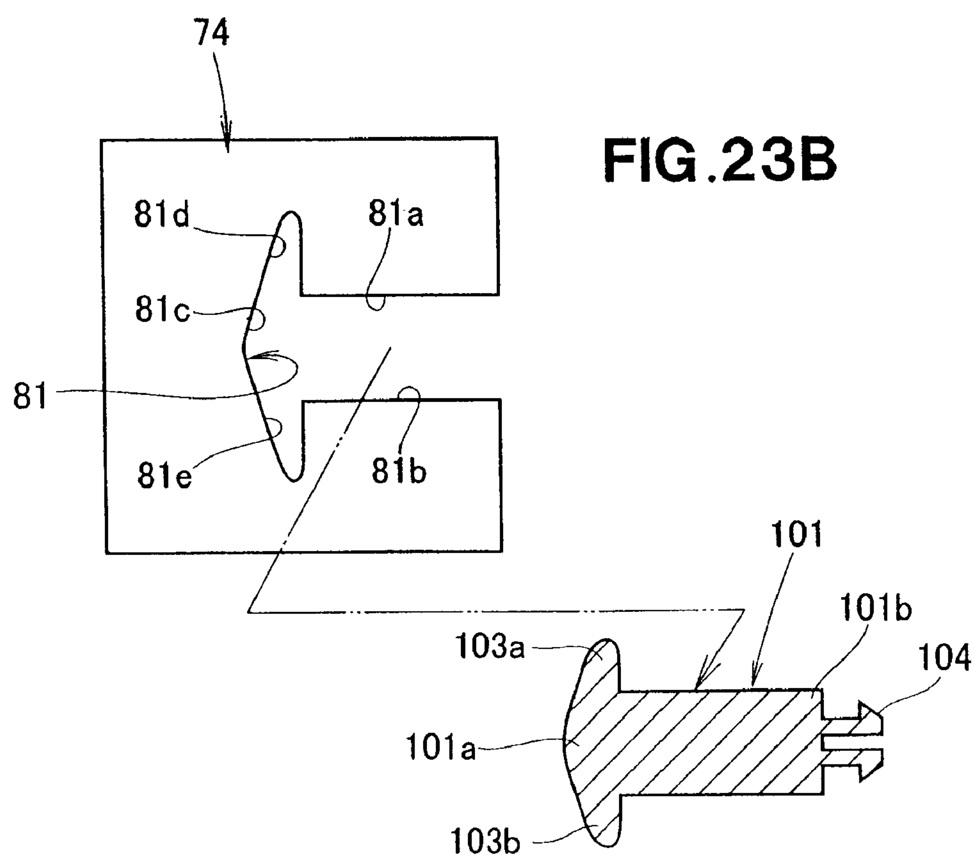
Figure 24:
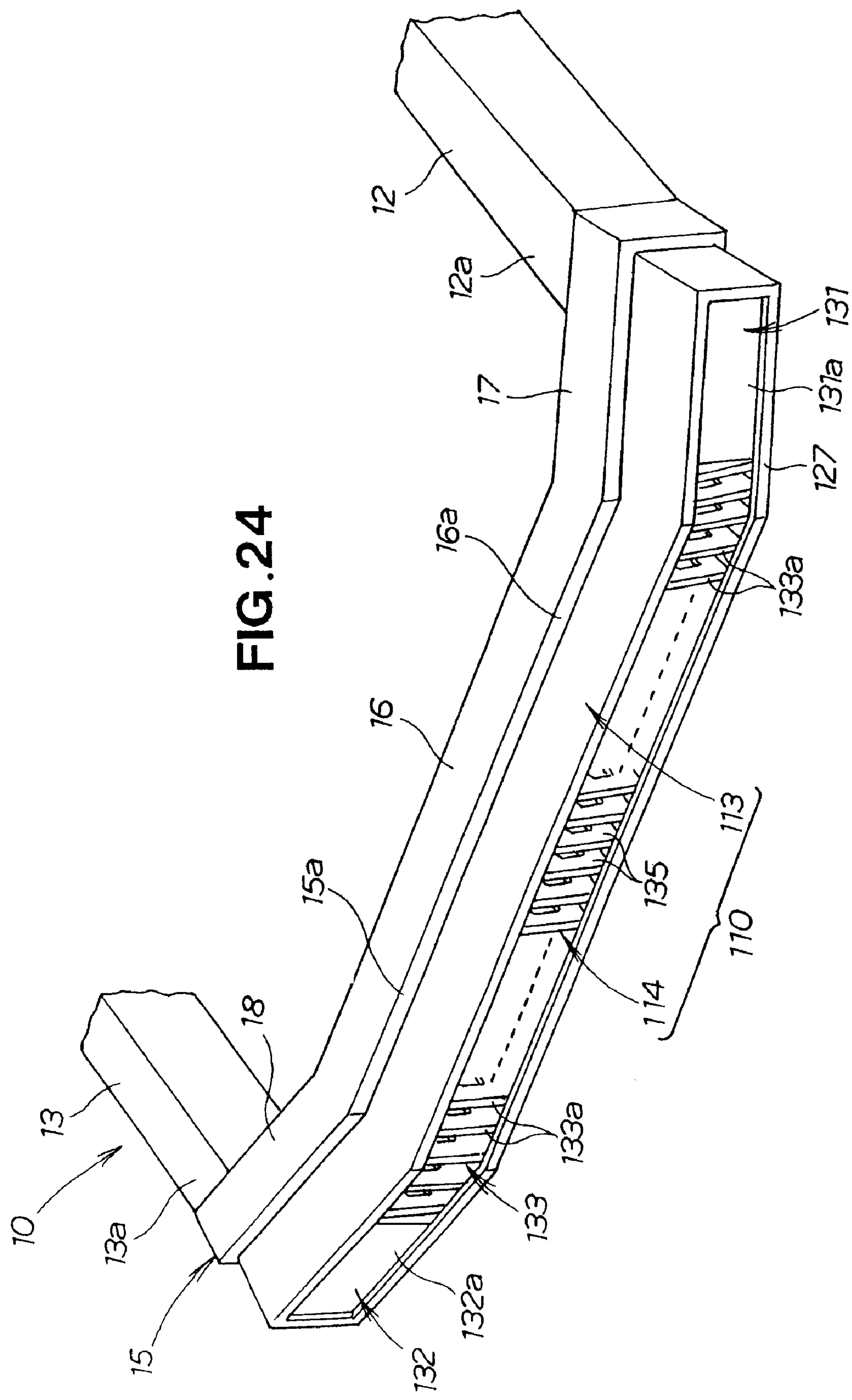
FIG. 24 is a perspective view showing an impact-absorbing device according to a seventh embodiment of the present invention.

The core element 101 has upper and lower projecting portions 103*a*, 103*b* formed on the front end portion 101*a*, as shown in FIGS. 23A and 23B, and a clip 104 formed on the rear end portion 101*b*, but the configuration is otherwise the same as that of the core element 73 of the fourth embodiment.

The upper projecting portion 103*a* can be made to contact the upper expansion groove 81*d* of the vane-form movable elements 74, and the lower projecting portion 103*b* can be made to contact the lower expansion groove 81*e* by forming the upper and lower projecting portions 103*a*, 103*b* on the front end portion 101*a* of the core element 101.

The surface area in which the upper and lower projecting portions 103*a*, 103*b* make contact with the upper and lower expansion grooves 81*d*, 81*e* can be varied by changing the projecting dimensions of the upper and lower projecting portions 103*a*, 103*b*. The vane-form movable elements 74 can thereby be used to adjust the friction during movement along the core element 101, and the impact absorption characteristics can be suitably adjusted in accordance with the service mode.

The shape-holding member 102 has a left holding portion 105 mounted on a left end portion 101*c* of the core element 101, and a right holding portion 106 mounted on a right end portion 110*d* of the core element 101.

The left holding portion 105 has a left holding plate 105*a* formed substantially in the form of a rectangle, and a left stop pawl 105*b* disposed on the left holding plate 105*a*.

The left holding portion 105 is mounted on the left end portion 101*c* of the core 101 by inserting the left stop pawl 105*b* into a left stop groove 107 provided to the left end portion 101*c* of the core 101.

The right holding portion 106 has a right holding plate 106*a* formed substantially in the form of a rectangle, and a right stop pawl (not shown) disposed on the right holding plate 106*a*.

The right holding portion 106 is mounted on the right end portion 101*d* of the core 101 by inserting the right stop pawl into a right stop groove (not shown) provided to the right end portion 101*d* of the core 101.

Among the vane-form movable elements 74 provided to the core 101, the vane-form movable element 74 at the leftmost end is held by the left holding plate 105*a*, and the vane-form movable element 74 at the rightmost end is held by the right holding plate 106*a*. The vane-form movable element 74 at the leftmost end and the vane-form movable element 74 at the rightmost end are thereby prevented from spreading out to the left and right sides, respectively.

First, the right holding portion 106 is mounted on the right end portion 101*d* of the vehicle body 10 during assembly of the impact-absorbing device 100, as shown in FIG. 22. In this state, a plurality of vane-form movable elements 74 is inserted from the left end portion 101*c* of the core 101 in the manner indicated by the arrow.

A clip stop hole 109 is formed in the center portion 16 of the front bumper beam 15, in the manner shown in FIG. 23A. The impact-absorbing device 100 is mounted on the center portion 16 (front surface 15*a*) of the front bumper beam 15 by latching the clip 104 of the core 101 to the clip stop hole 109. The impact-absorbing device 100 is thereby mounted in a simple manner to the center portion 16 of the front bumper beam 15.

The impact-absorbing device 100 of the sixth embodiment produces the same effect as the impact-absorbing device 70 of the fourth embodiment.

In the impact-absorbing device 100 of the sixth embodiment, an example was described in which the vane-form movable elements 74 are held by a shape-holding member 102, but no limitation is imposed by this configuration. For example, the left and right end portions of the core 101 may be riveted using heat to form projecting portions, and the left and right projecting portions thus formed may be configured to hold the vane-form movable elements 74.

FIGS. 24 through 29 show an impact-absorbing device 110 according to a seventh embodiment 7 of the present invention. The impact-absorbing device 110 of the seventh embodiment is one in which a helical member (movable piece) 114 is accommodated in a housing element (guide piece) 113, but the configuration is otherwise the same as the impact-absorbing device 20 of the first embodiment. In other words, the impact-absorbing device 110 is provided with a housing element 113 that is capable of absorbing an impact, and with a helical member 114 that is accommodated in the housing element 113 and is capable of absorbing an impact, whereby an impact that has occurred can be absorbed.

The impact-absorbing device 110 is configured so that an impact on an object is reduced when a collision has occurred with a rod-shaped object (object) having relatively low rigidity, and that an impact on the vehicle occupants can be reduced when a collision has occurred with a wall-shaped object (object).

In the impact-absorbing device 110, the reverse surface of the housing element 113 is mounted onto the front surface 15*a* of the front bumper beam 15 using a fastening member, e.g., the clip 104 shown in FIG. 23B.

Figure 25:
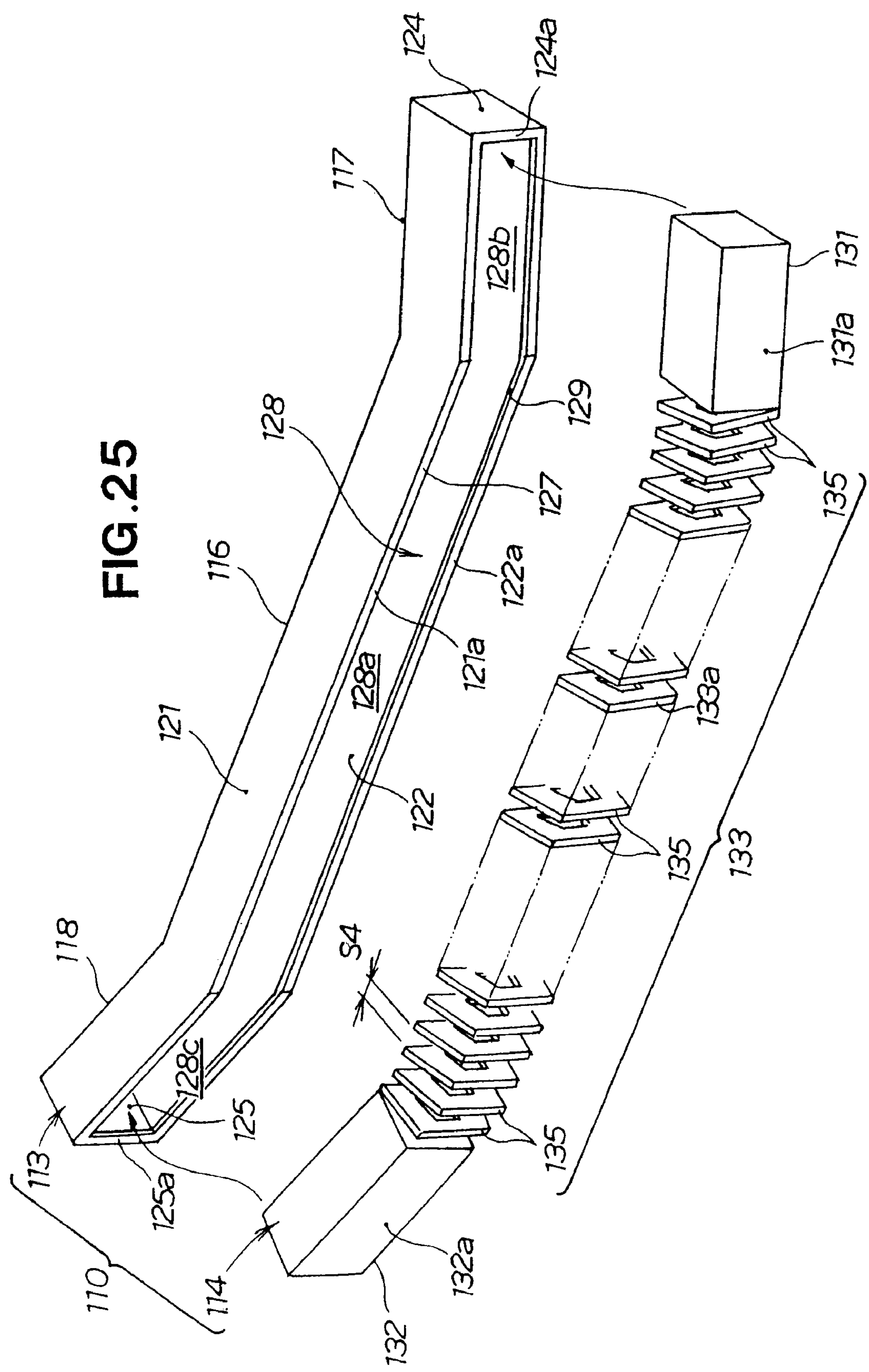
FIG. 25 is an exploded perspective view of the impact-absorbing device shown in FIG. 24.

The housing element 113 extends in the direction substantially orthogonal to the impact input direction and absorbs impacts, as shown in FIG. 25. Specifically, the housing element 113 is composed of a center location 116, a left-sloping location 117 extended in a sloping fashion from the left end portion of the center location 116 toward the rear direction of the vehicle body, and a right-sloping location 118 extended in a sloping fashion from the right end portion of the center location 116 toward the rear direction of the vehicle body. The element extends along the front surface 15*a* (FIG. 24) of the front bumper beam 15.

Figure 26:
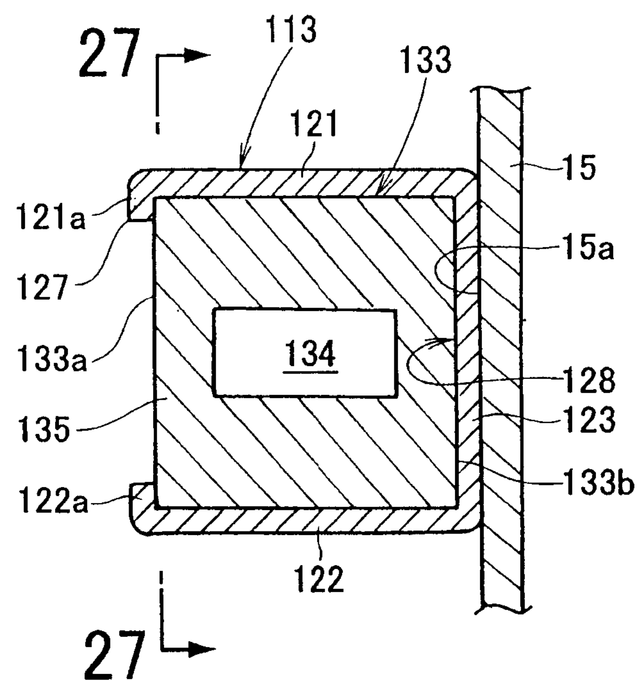
FIG. 26 is a cross-sectional view of the impact-absorbing member according to the seventh embodiment.

The housing element 113 has a cross-sectional U-shape formed by an upper wall 121, a lower wall 122, and a rear wall 123, as shown in FIG. 26, and has a left wall 124 at the left end portion and a right wall 125 at the right wall portion, as shown in FIG. 25.

The housing element 113 has a downward-facing upper stop piece 121*a* in the front area of the upper wall 121, and an upward-facing lower stop piece 122*a* in the front area of the lower wall 122, as shown in FIG. 26.

The left wall 124 of the housing element 113 has a rightward-facing left stop piece 124*a* formed in the front area thereof, and the right wall 125 has a leftward-facing right stop piece 125*a* formed in the front area thereof. A frame-shaped stop piece 127 is formed from the upper and lower stop pieces 121*a*, 122*a* and the left and right stop pieces 124*a*, 125*a*.

The housing element 113 has an housing space 128 formed from the upper wall 121, lower wall 122, rear wall 123 (FIG. 26), left and right wall portions 124, 125, and frame-shaped stop piece 127. An opening 129 is formed by the frame-shaped stop piece 127.

The helical member 114 is a member that is harder than the housing element 113 and is composed of left and right block portions 131, 132 and a helical movable element 133 disposed between the left and right block portions 131, 132.

The left block portion 131 is formed having a cross section that is substantially rectangular, and is accommodated in the left end portion side 128*b* of the housing space 128.

The right block portion 132 is formed having a cross section that is substantially rectangular, and is accommodated in the right end portion side 128*c* of the housing space 128.

The helical movable element 133 has a hollow area 134 formed in the center by helical windings, and the external periphery is formed in substantially rectangular shape in the same manner as the left and right block portions 131, 132. The helical movable element 133 has a plurality of singly-wound locations 135 (hereinafter referred to as "wound portions 135"), and has a predetermined space S4 formed between adjacent wound portions 135. The helical movable element 133 is accommodated in the center portion 128*a* of the housing space 128 of the housing element 113 and acts as a movable element that can move along the housing element 113.

The helical movable element 133 and left and right block portions 131, 132 are accommodated in the housing space 128. In this state, the front surface 133*a* of the helical movable element 133 and the front surfaces 131*a*, 132*a* of the left and right block portions 131, 132, respectively, correspond to the opening 129. The frame-shaped stop piece 127 stops at the peripheral edge of the front surface 133*a* and at the front surfaces 131*a*, 132*a*. The helical member 114 (i.e., the helical movable element 133 and left and right block portions 131, 132) is thereby reliably held in the housing space 128.

Figure 27:
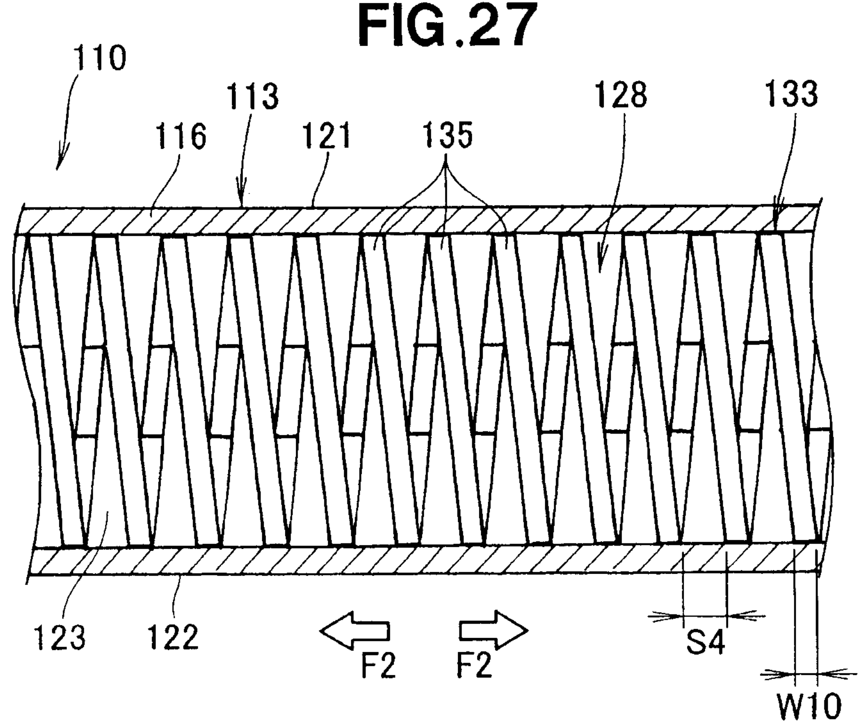
FIG. 27 is a cross-sectional view taken along line 27-27 of FIG. 26.

In this state, the helical movable element 133 is held so that the wound portions 135 can move in the lengthwise direction of the center location 116 due to a predetermined impact F2 even if the predetermined impact acts along the center location 116 of the housing element 113 in the manner indicated by arrow F2, as shown in FIG. 27. The predetermined impact F2 is a force that acts when the impact-absorbing device 110 has collided with a rod-shaped object having relatively low rigidity.

In the impact-absorbing device 110 described above, the helical movable element 133 is a member that is harder than the housing element 113, whereby movement (kinetic) energy is generated because the wound portions 135 of the helical movable element 133 move along the lengthwise direction of the center location 116 of the housing element 113 when the impact-absorbing device 110 has collided with a rod-shaped object having relatively low rigidity. Additionally generated is a frictional force (frictional energy) between the wound portions 135 and the center location 116 of the housing element 113, and adjacent wound portions 135, 135 move relative to each other while in a state of mutual contact.

The impact during a collision is absorbed by the frictional energy generated between the wound portions 135 and the center location 116 of the housing element 113 and by the frictional energy generated among the wound portions 135, 135, allowing impacts to be adequately absorbed. The impact that acts on a rod-shaped object having relatively low rigidity can be favorably reduced.

In the helical movable element 133, a predetermined space S4 is formed between adjacent wound portions 135, 135. Therefore, when the impact-absorbing device 110 collides with a rod-shaped object having relatively low rigidity and a predetermined impact has acted parallel to the housing element 113 (center location 116) in the manner indicated by arrow F2, the adjacent wound portions 135, 135 make contact with each other after a predetermined length of time has elapsed from the collision. The timing for generating frictional force (frictional energy) among the adjacent wound portions 135, 135 can thereby be adjusted, and the impact absorption characteristics can also be adjusted in a favorable manner. For example, when the predetermined space S4 between the adjacent wound portions 135, 135 is set to be relatively large, the impact absorption characteristics are weakened in the initial stages of a collision, and the impact absorption characteristics are somewhat improved thereafter. Conversely, when the predetermined space S4 between the adjacent wound portions 135, 135 is set to be relatively small, the impact absorption characteristics in the initial stages of a collision are increased, and the impact absorption characteristics remain substantially uniform thereafter.

In this manner, the timing for generating frictional force (frictional energy) among adjacent wound portions 135, 135 is adjusted, and the impact absorption characteristics are also adjusted, whereby the impact that acts on a rod-shaped object having relatively low rigidity can be reduced in a more favorable manner.

The helical movable element 133 may, for example, have a configuration in which the width W10 of the wound portion 135 is 3 mm and the predetermined space S4 between adjacent wound portions 135, 135 is 20 mm, but no limitation is imposed by this configuration.

In the seventh embodiment, an example was described in which the helical orientation of the helical movable element 133 is a clockwise direction from the left block portion 131 to the right block portion 132, as shown in FIG. 25. However, the helical orientation of the helical movable element 133 may also be the counterclockwise direction.

The housing element 113 and helical movable element 133 are formed using the same material. A lightweight foam material made of polypropylene (PP), for example, is used as the material of the housing element 113 and helical movable element 133.

The foam material of the helical movable element 133 has an expansion ratio that is set to be lower than that of the foam material of the housing element 113. As an example, polypropylene having an expansion ratio of 8 is used as the foam material of the helical movable element 133, and polypropylene having an expansion ratio of 15 is used as the foam material of the housing element 113.

A foam material is a material that can deform and absorb an impact in a favorable manner when an impact has occurred. The impact absorption characteristics of the housing element 113 and the helical movable element 133 can be favorably assured and the amount of impact absorption can be sufficiently attained with a lightweight material by forming the housing element 113 and the helical movable element 133 from an foam material.

The housing element 113 and helical movable element 133 are formed from the same material, and the expansion ratio of the helical movable element 133 is set to be less than that of the housing element 113. The helical movable element 133 can thereby be made into a harder member that the housing element 113, even when the housing element 113 and helical movable element 133 are formed using the same material, and the wound portions 135 of the helical movable element 133 can move in a favorable manner along the lengthwise direction of the housing element 113. The impact absorption characteristics and impact absorption amount can thereby be adequately maintained in the impact-absorbing device 110. The housing element 113 and helical movable element 133 are formed from the same material, whereby the material can be shared among components and costs can be reduced.

As described above, the impact-absorbing device 110 is composed of two members, i.e., the housing element 113 and the helical member 114, and the housing element 113 and helical member 114 are members that can absorb an impact. Therefore, the members can reduce impacts against vehicle occupants as well as against objects having relatively low rigidity.

A configuration is used in which the helical member 114 is accommodated in the housing element 113, whereby the two members, i.e., the housing element 113 and helical member 114, can be made compact and the impact-absorbing device 110 can be provided to the front bumper beam 15 in a simple manner.

Furthermore, the helical member 114 can be held by the housing element 113 by accommodating the helical member 114 in the housing element 113, and the shape-holding member 23 and the bag 21 used in the first embodiment can be made unnecessary.

Next, the effect of the impact-absorbing device 110 of the seventh embodiment will be described with reference to FIGS. 28 and 29.

First, an example will be described in which the impact-absorbing device 110 collides with a rod-shaped object (object) 41 having relatively low rigidity with reference to FIG. 28.

Figure 28A:
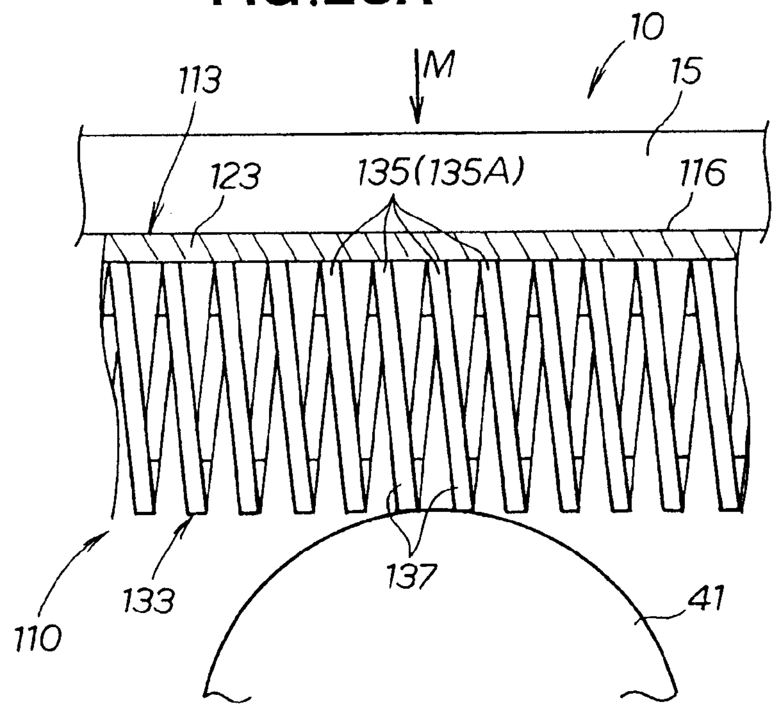
FIGS. 28A through 28C are schematic views illustrating a state in which the impact-absorbing device according to the seventh embodiment collides with a rod-shaped object and absorbs the impact force.

In FIG. 28A, the wound portions 135 (hereinafter referred to as "central wound portions 135A") positioned in the center of the impact-absorbing device 110 collide with the rod-shaped object 41 in the manner indicated by arrow M. The impact acts on the front locations 137 of the central wound portions 135A.

Figure 28B:
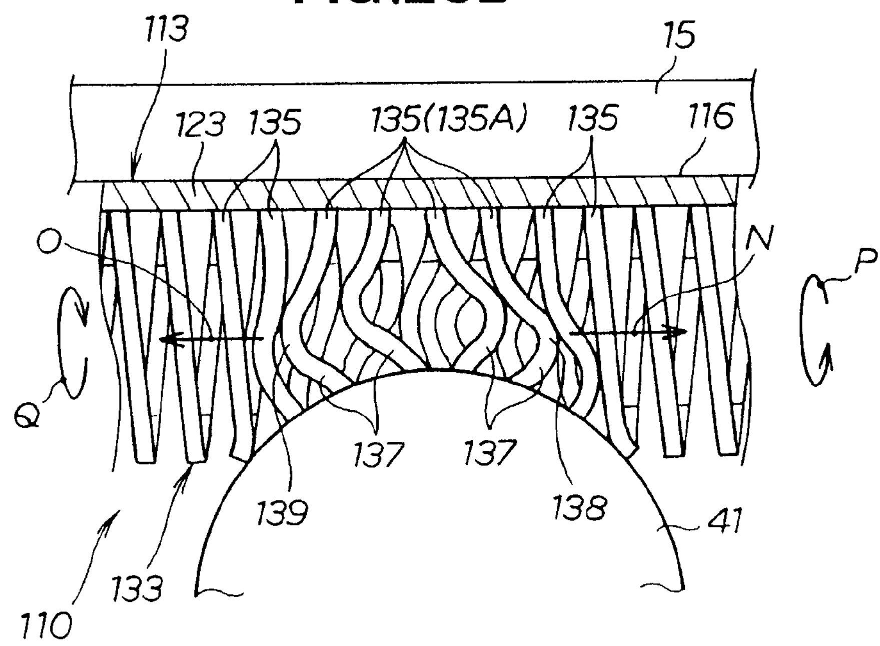

In FIG. 28B, the collision force acts on the front locations 137 of the central wound portions 135A, a buckling load thereby acts on the central wound portion 135A, the central wound portions 135A undergo buckling deformation, and the central wound portions 135A generate energy (hereinafter referred to as "buckling energy").

Of the central wound portions 135A, the location 138 of the left-side central wound portions 135A bulge to the left side, and the left-side wound portions 135 are pressed by the location 138 in the manner indicated by arrow N.

Of the central wound portions 135A, the location 139 of the right-side central wound portions 135A bulge to the right side, and the right-side wound portions 135 are pressed by the location 139 in the manner indicated by arrow O.

The helical movable element 133 is a member that is harder than the housing element 113. Therefore, the left-side wound portions 135 move in the lengthwise direction of the housing element 113 (center location 116) in the manner indicated by arrow N. At the same time, the right-side wound portions 135 move in the lengthwise direction of the housing element 113 (center location 116) in the manner indicated by arrow O. Movement (kinetic) energy is generated by the movement of the wound portions 135, and frictional force (frictional energy) is generated between the moving wound portions 135 and the housing element 113 (center location 116).

The helical movable element 133 is wound in a helical manner. Therefore, the adjacent wound portions 135, 135 move in the direction of arrow N and the direction of arrow O in a state of mutual contact, and thereby produce torsional force in the helical movable element 133 in the manner indicated by arrows P and Q.

The helical movable element 133 has a rear surface 133*b* (FIG. 26) that in contact with the rear surface 123 of the housing element 113. When torsional force is generated in the helical movable element 133, the generated torsional force is expended by the deformation in the lengthwise direction of the housing element 113 (center location 116).

In this manner, deformation occurs in the lengthwise direction of the housing element 113 (center location 116) due to the torsional force generated in the helical movable element 133, and energy (hereinafter referred to as "torsional energy") is produced thereby.

The central wound portions 135A undergo buckling deformation, whereby the upper and lower walls 121, 122 (FIG. 25) of the housing element 113 undergo compressive deformation, and the upper and lower stop pieces 121*a*, 122*a* (FIG. 25) undergo bending deformation.

Figure 28C:
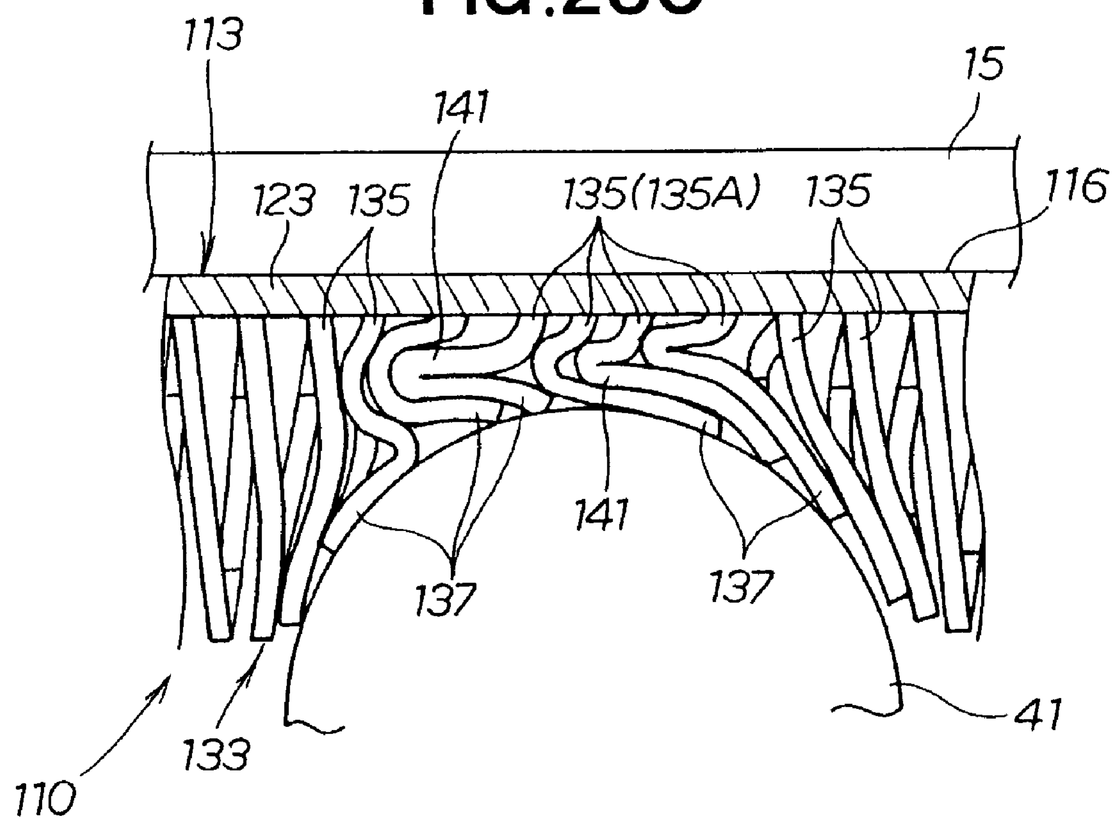

As shown in FIG. 28C, the amount of buckling deformation of the central wound portions 135A is greater than that shown in FIG. 28B. The buckled and deformed central wound portions 135A are compressed by the rod-shaped object 41 while in contact with the contact locations 141, and compressive strain energy is generated in the contact locations 141 of the central wound portions 135A.

The amount of buckling deformation of the central wound portions 135A is greater than that shown in FIG. 28B, whereby the amount of compressive deformation of the upper and lower walls 121, 122 shown in FIG. 25 is greater than that shown in FIG. 28B, and the amount of bending and deformation of the upper and lower stop pieces 121*a*, 122*a* shown in FIG. 25 is greater than that shown in FIG. 28B. The rear wall 123 (FIG. 26) of the housing element 113 is also compressively deformed. The rear wall 123 and upper and lower walls 121, 122 of the housing element 113 undergo compressive deformation, and compressive strain energy is generated. The upper and lower stop pieces 121*a*, 122*a* undergo bending deformation, and bending energy is generated.

In this manner, frictional energy, buckling deformation energy, and compressive strain energy are generated in the helical movable element 133 of the impact-absorbing device 110 when the impact-absorbing device 110 has collided with the rod-shaped object 41. At the same time, torsional energy, compressive strain energy, and bending energy are generated in the housing element 113 of the impact-absorbing device 110. The impact can thereby be sufficiently absorbed by the energy thus generated.

Next, an example in which the impact-absorbing device 110 of the seventh embodiment collides with a wall-shaped object (object) 43 will be described with reference to FIG. 29.

Figure 29A:
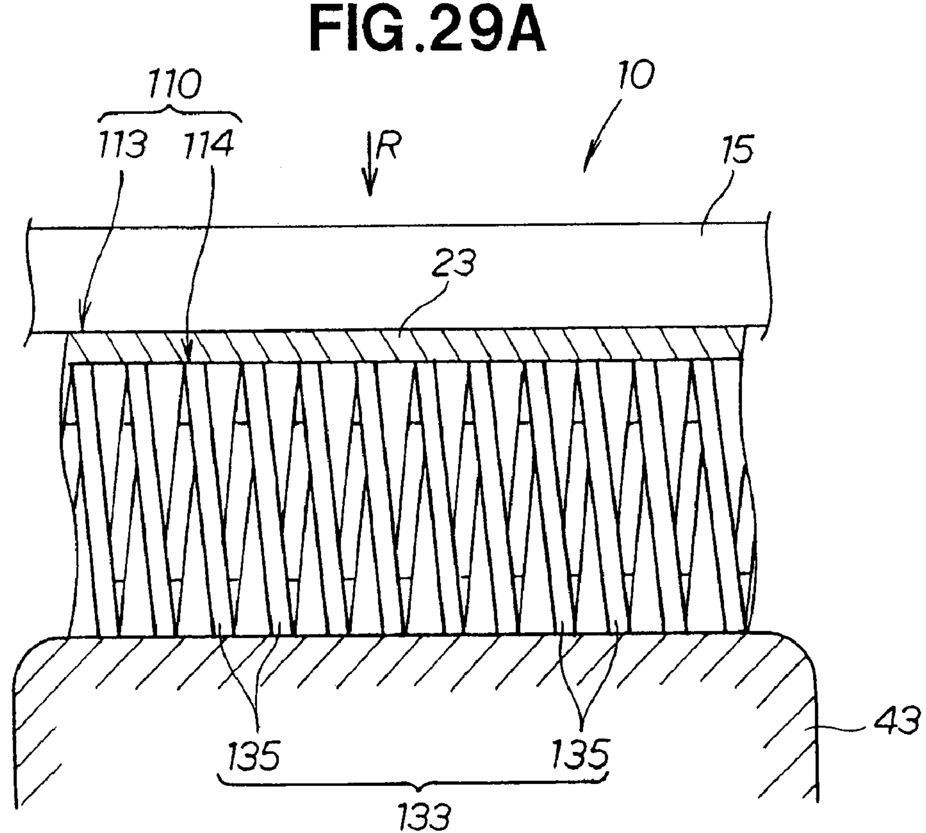
FIGS. 29A through 29C are schematic views illustrating a state in which an impact force acts on a vehicle body and is absorbed by the impact-absorbing device according to the seventh embodiment.

In FIG. 29A, the impact-absorbing device 110 collides with the wall-shaped object 43 in the manner indicated by arrow R. Since the wall-shaped object 43 is a wide object, the entire surface of the impact-absorbing device 110 collides with the wall-shaped object 43.

Figure 29B:
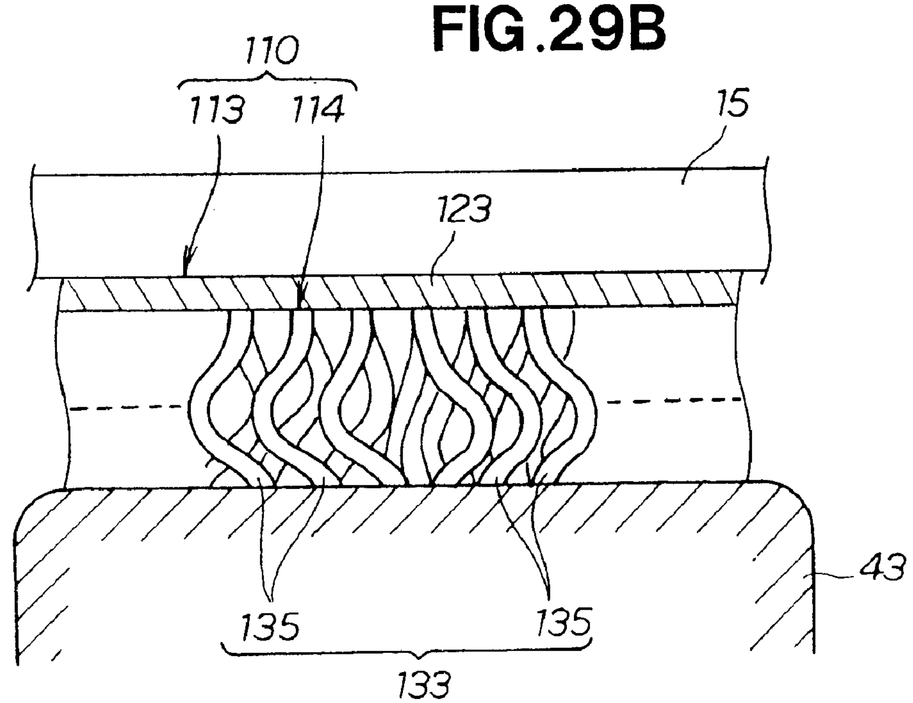

When the entire surface of the impact-absorbing device 110 collides with the wall-shaped object (object) 43, as shown in FIG. 29B, the wound portions 135 undergo buckling deformation to generate buckling deformation energy. At the same time, the upper and lower walls 121, 122 (FIG. 25) of the housing element 113 undergo compressive deformation.

Figure 29C:
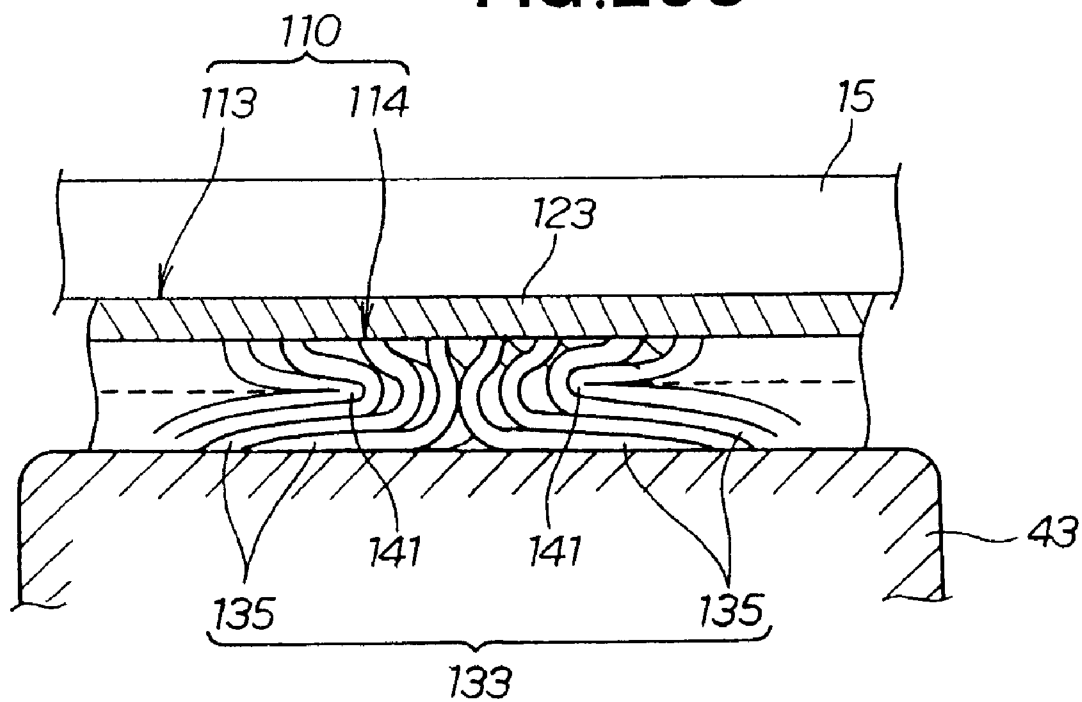

The amount of buckling and deformed of the wound portions 135 is greater than that shown in FIG. 29B, as shown in FIG. 29C, and the amount of compressive deformation of the housing element 113 is greater than that shown FIG. 29B.

The wound portions 135 are compressed by the wall-shaped object 43 in a state of contact with the contact locations 141.

The upper and lower walls 121, 122 and the upper and lower stop pieces 121*a*, 122*a* (FIG. 25) undergo compressive deformation, as does the rear wall 123 (FIG. 26), and compressive strain energy is generated.

In this manner, the impact is absorbed by the buckling deformation energy generated by the buckling deformation of the wound portions 135, the compressive strain energy generated by the compressive deformation of the wound portions 135, and the compressive strain energy generated by the compressive deformation of the housing element 113. The impact can be adequately absorbed and the impact on the vehicle occupants can be adequately reduced.

As described above, the impact-absorbing device 110 of the seventh embodiment can yield the same effect as the impact-absorbing device 20 of the first embodiment.

Furthermore, the impact-absorbing device 110 of the seventh embodiment has a configuration in which the helical member 114 is accommodated in the housing element 113, whereby the helical member 114 is held by the housing element 113. The shape-holding member 23 and the bag 21 used in the first embodiment can thereby be made unnecessary, the configuration can be simplified, and costs can be reduced.

Figure 30:
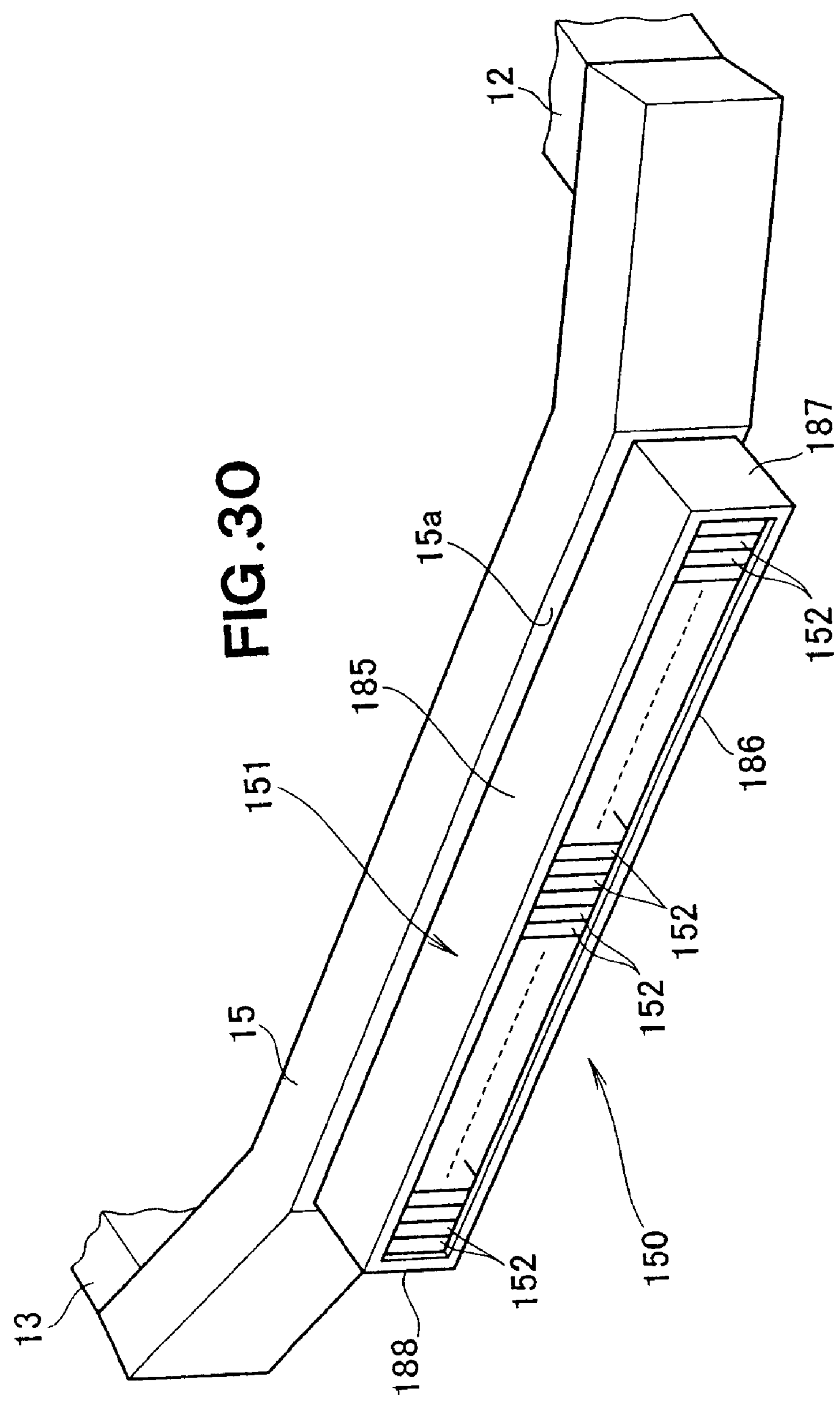
FIG. 30 is a perspective view showing an impact-absorbing device according to an eighth embodiment of the present invention.

FIG. 30 shows an impact-absorbing device 150 according to an eighth embodiment of the present invention. The impact-absorbing device 150 of the eighth embodiment accommodates a plurality of flat plate elements (movable piece) 152 in a housing element (guide piece) 151, but the configuration is otherwise the same as that of the impact-absorbing device 110 of the seventh embodiment.

The impact-absorbing device 150 of the seventh embodiment described above is provided with a housing element 151 that can absorb an impact, and a plurality of flat plate elements 152 that are accommodated in the housing element 151 and that can absorb an impact, allowing an impact force that acts during a collision to be absorbed.

In the impact-absorbing device 150, the reverse surface of the housing element 151 is mounted onto the front surface 15*a* of the front bumper beam 15 using a clip, not shown. The clip is a fastening member made of resin normally used in automobile assembly, and the clip 104 shown in FIG. 23B is used as an example.

The housing element 151 is a member that has the same cross-sectional shape but a different length dimension than the housing element 113 of the seventh embodiment.

The flat plate element 152 is a plate formed as a flat plate having a thickness of 70 mm, for example. The flat plate element 152 has an external shape that is formed in a substantially rectangular shape in the same manner as the helical member 114 of the seventh embodiment. Expanded polypropylene (EPP), for example, having an expansion ratio of 8 is used as the material of the flat plate element 152.

The impact-absorbing device 150 of the eighth embodiment produces the same effect as the impact-absorbing device 110 of the seventh embodiment. In other words, the impact-absorbing device 150 of the eighth embodiment reduces impact force on objects when a collision is made with the rod-shaped object (object) having relatively low rigidity, and reduces impacts on vehicle occupants when a collision is made with a wall-shaped object (object).

In the eighth embodiment, the amount of load that is transmitted to the left and right sides is kept low in comparison with the seventh embodiment, and the movement distance in the left and right direction of the plurality of flat plate elements (movable piece) 152 is slightly reduced. Such a configuration is therefore advantageous in cases in which the movement distance is set low, the amount of absorption produced by buckling deformation in the load direction is set high, and in other cases.

Figure 31:
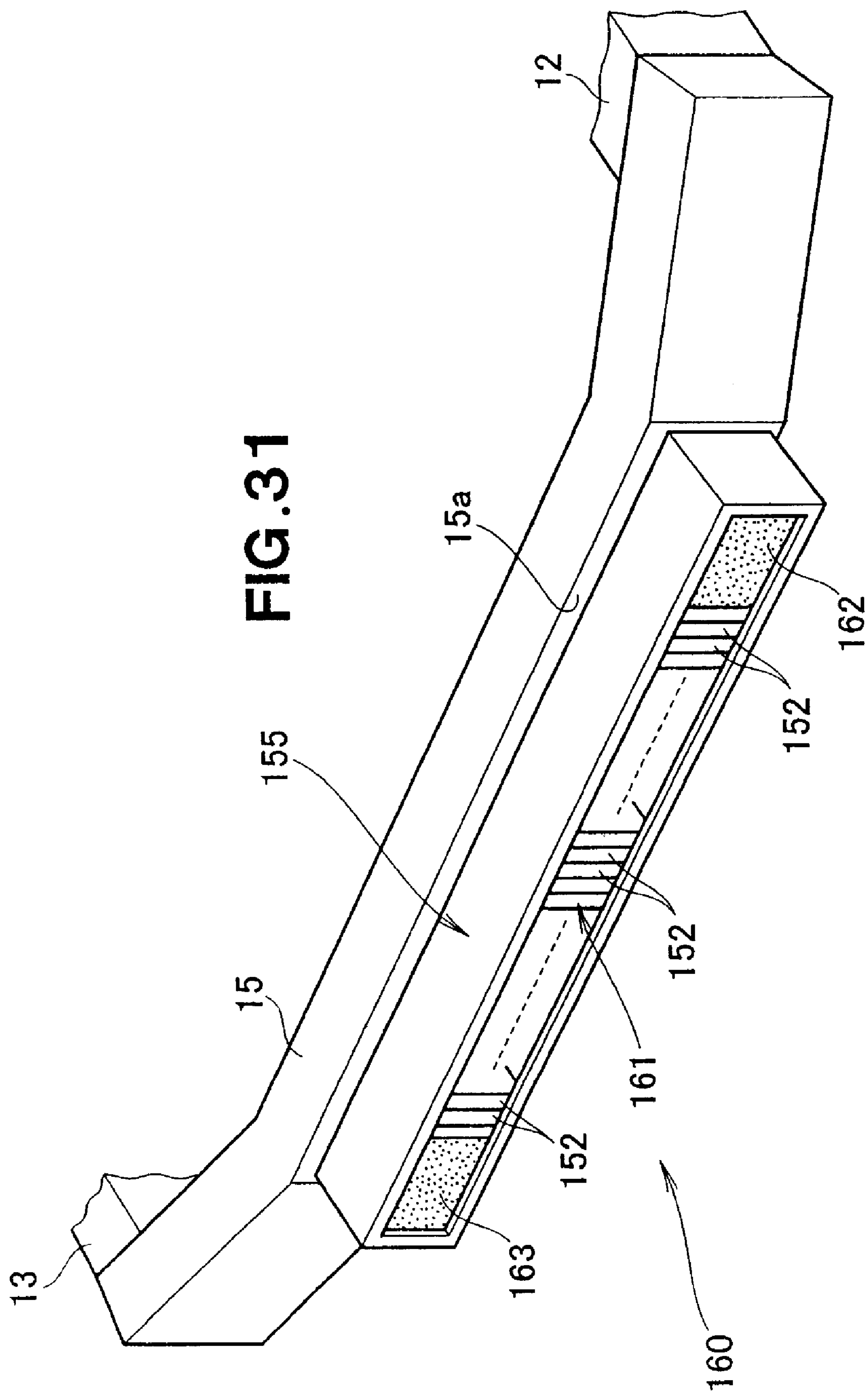
FIG. 31 is a perspective view showing an impact-absorbing device according to a ninth embodiment of the present invention.

FIG. 31 shows an impact-absorbing device 160 according to a ninth embodiment of the present invention. The impact-absorbing device 160 of the ninth embodiment uses a movable piece 161 that has a different structure than the movable bodies 152 (i.e., plurality of flat plate elements) shown in the eighth embodiment, but the configuration is otherwise the same as that of the impact-absorbing device 150 of the eighth embodiment.

The movable piece 161 has a plurality of flat plate elements 152 formed into the shape of a flat plate, and left and right soft locations 162, 163 disposed outside of the outermost flat plate elements 152, 152 from among the flat plate elements 152. The soft locations 162, 163 are softer than the flat plate element 152.

The impact-absorbing device 160 is configured so that the flat plate elements 152 first undergo buckling deformation to absorb impact force when an impact acts on the flat plate elements 152. Pressing force operates on the adjacent flat plate element 152 together with the buckling deformation of the flat plate elements 152, the pressing force is transmitted to the left and right soft locations 162, 163, and the soft locations 162, 163 are compressively deformed. The flat plate elements 152 are thereby moved to the left and right sides, and the impact force is absorbed.

In this manner, the soft locations 162, 163 of the movable piece 161 are made to be softer than the flat plate elements 152, whereby the flat plate elements 152 are caused to undergo buckling deformation to absorb the impact force, and the flat; plate elements 152 are thereafter caused to move to the left and right sides to absorb the impact force.

The impact-absorbing device 160 of the ninth embodiment produces the same effect as the impact-absorbing device 110 of the seventh embodiment.

In the ninth embodiment, the amount of load that is transmitted to the left and right sides is kept low in comparison with the seventh embodiment, and the movement distance in the left and right direction of the plurality of flat plate elements 152 is slightly reduced. Such a configuration is therefore advantageous in cases in which the movement distance is set low, the amount of absorption produced by buckling deformation in the load direction is set high, and in other cases.

Figure 32:
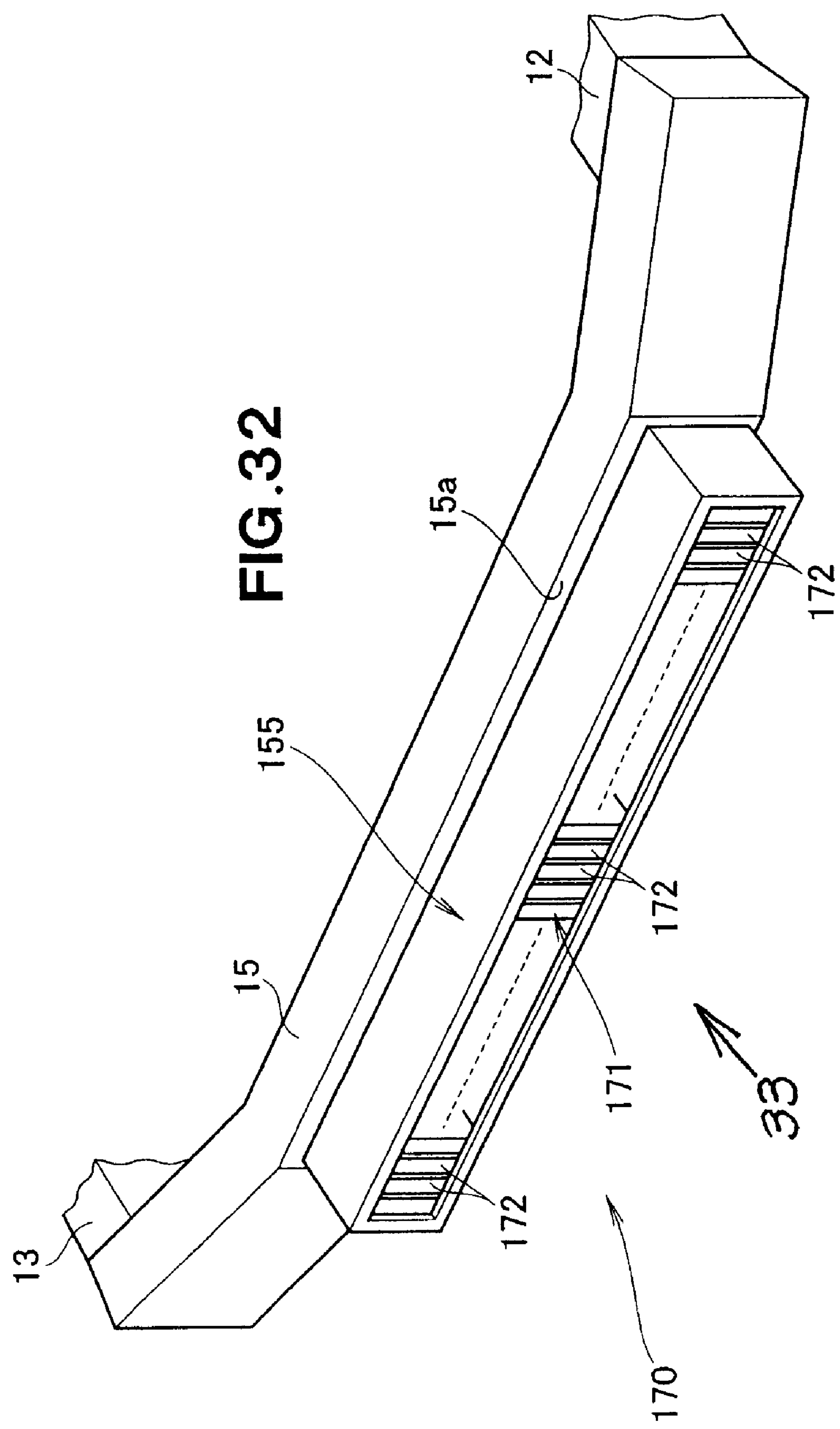
FIG. 32 is a perspective view showing an impact-absorbing device according to a tenth embodiment of the present invention.
Figure 33:
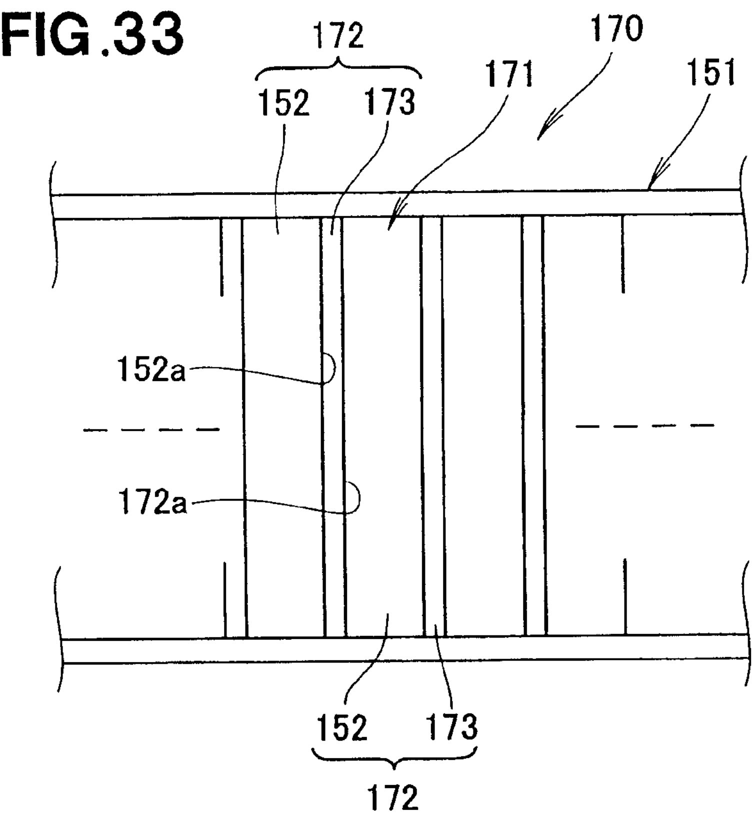
FIG. 33 is a view as seen from the direction of arrow 33 of FIG. 32.

FIGS. 32 and 33 show an impact-absorbing device 170 according to a tenth embodiment of the present invention. The impact-absorbing device 170 of the tenth embodiment uses a movable piece 171 that has a different structure than the movable bodies 152 (i.e., plurality of flat plate elements) shown in the eighth embodiment, but the configuration is otherwise the same as that of the impact-absorbing device 150 of the eighth embodiment.

The movable piece 171 has a plurality of flat plate portions (flat plate elements) 172. The flat plate portions 172 are composed of a flat plate element 152 and a soft plate element (soft location) 173 provided to the side surface 152*a* of the flat plate element 152. In other words, the flat plate portions 172 have a side surface 172*a* that is a soft location 173.

In the impact-absorbing device 170 of the tenth embodiment, the flat plate elements 152 and soft plate elements 173 are first caused to undergo buckling deformation to absorb an impact when an impact acts on the flat plate portions 172.

A pressing force acts on the adjacent flat plate portions 172 together with the buckling deformation of the flat plate elements 152 and the soft plate elements 173. The soft plate elements 173 are compressively deformed by the pressing force. The flat plate elements 172 are thereby moved to the left and right sides and the impact force is absorbed.

In this manner, the side surface 172*a* of the flat plate portions 172 is composed of a soft plate element 173, whereby the flat plate elements 152 and the soft plate elements 173 are caused to undergo buckling deformation to absorb the impact, and the flat plate elements 152 and the soft plate elements 173 are thereafter caused to move to the left and right sides to absorb the impact.

The impact-absorbing device 170 of the tenth embodiment produces the same effect as the impact-absorbing device 110 of the seventh embodiment.

Figure 34:
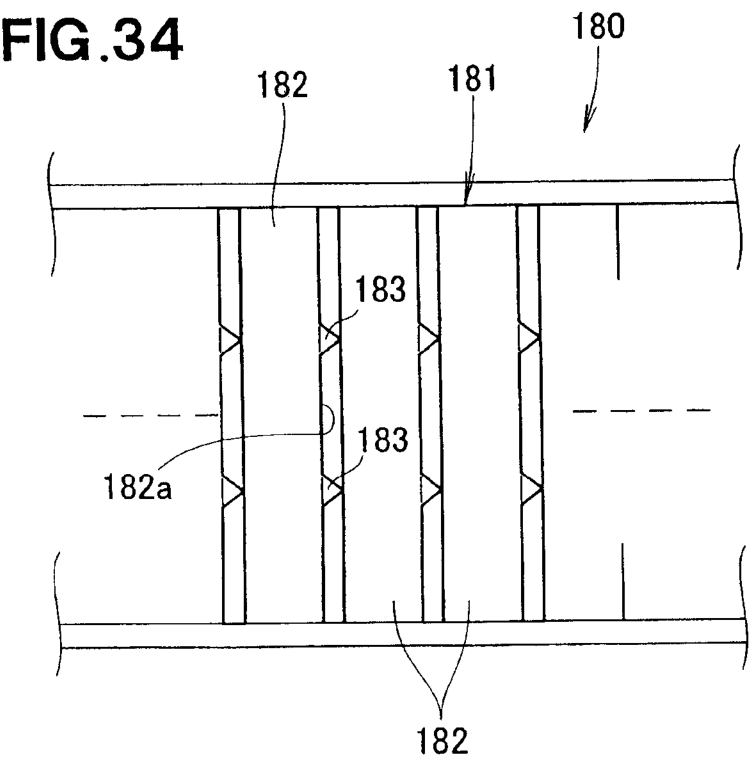
FIG. 34 is a front view showing an impact-absorbing device according to an eleventh embodiment of the present invention.

FIG. 34 shows an impact-absorbing device 180 according to an eleventh embodiment of the present invention. The impact-absorbing device 180 of the eleventh embodiment uses a movable piece 181 that has a different structure than the movable piece (i.e., plurality of flat plate elements 172) 171 shown in the tenth embodiment, but the configuration is otherwise the same as that of the impact-absorbing device 170 of the tenth embodiment.

The movable piece 181 has a plurality of flat plate elements 182. The flat plate elements 182 have two protrusions 183 formed on the side surface 182*a*.

The flat plate elements 182 are formed from expanded polypropylene (EPP), which is the same material as that of the flat plate element 152 of the eighth embodiment. Two protrusions 183 are used in the example shown in the diagram, but a single protrusion or more than two protrusions may also be used. Further-more, the protrusions 183 may be in point contact or linear contact with the adjacent flat plate portion 182.

In the impact-absorbing device 180 of the eleventh embodiment, the flat plate portions 182 are first caused to undergo buckling deformation to absorb an impact when the impact acts on the flat plate portions 182. A pressing force acts on the adjacent flat plate portions 182 together with the buckling deformation of the flat plate elements 182. The protrusions 183 are crushed by the pressing force. The flat plate elements 182 are thereby moved to the left and right sides, and the impact force is absorbed.

In this manner, protrusions 183 are provided to the side surface 182*a* of the flat plate portions 182, whereby the flat plate portions 182 are caused to undergo buckling deformation, and thereby absorb an impact, and the flat plate elements 182 are thereafter moved to the left and right sides and the impact force is absorbed.

The impact-absorbing device 180 of the eleventh embodiment produces the same effect as the impact-absorbing device 110 of the seventh embodiment.

An impact-absorbing device according to a twelfth of embodiment of the present invention will be described next. The impact-absorbing device of the twelfth embodiment has a structure in which the thickness of the upper wall 185 and lower wall 186 of the housing element 151 of the eighth embodiment shown in FIG. 30 is varied. The amount of impact absorption due to the buckling deformation of the upper wall 185 and lower wall 186 is adjusted by varying the plate thickness. The left wall 187 and right wall 188 of the housing element 151 are soft locations.

In the impact-absorbing device of the twelfth embodiment, the flat plate element 152 and the upper and lower walls 185 and 186 are caused to undergo buckling deformation to absorb an impact when the impact acts on the flat plate element 152. A pressing force acts on the adjacent flat plate elements 152 together with the buckling deformation of the flat plate elements 152. The pressing force is transmitted to the soft left and right walls 187, 188, and the left and right walls 187 and 188 undergo deformation. The flat plate elements 152 are thereby moved to the left and right sides to absorb impact force.

In this manner, the impact-absorbing device of the twelfth embodiment is configured so that the flat plate element 152 and the upper and lower walls 185 and 186 are caused to undergo buckling deformation to absorb an impact, and the flat plate elements 152 are thereafter caused to move to the left and right sides to absorb an impact force.

In the first to twelfth embodiments, examples were described in which the impact-absorbing bodies 20, 50, 60, 70, 100, 110, 150, 160, 170, and 180 were applied to a front bumper beam 15, but no limitation is imposed thereby, and application can be made to the reverse side of a vehicle body pillar, seat, and other interior element, and to other interior locations.

In the first to sixth embodiments, examples were described in which the impact-absorbing bodies 20, 70, and 100 were accommodated in the bag 21, but the impact-absorbing bodies 20 and 70 may also be used without being accommodated in the bag 21.

In the second embodiment, an example was described in which the shape-holding member 51 was bolted down to the center front portion 16*a*, but a clip or another fastening member may be used in place of a bolt to mount the shape-holding member 51 on the center front portion 16*a*.

In the first and second embodiments and in the fourth to sixth embodiments, examples of impact-absorbing bodies 20, 50, 70, and 100 were described in which the shape-holding members 23, 51, and 102 were used as the impact-absorbing members 22 and 72, but no limitation is imposed thereby, and the impact-absorbing bodies may be used without the use of shape-holding members 23, 51, and 102 as the impact-absorbing members 22 and 72.

In the first to twelfth embodiments, examples were described in which the guide piece (core elements 31 and 73, and housing element 113) and the movable piece (external peripheral element 32, vane-form movable elements 74, helical member 114, and flat plate elements 152 and 182) were formed using the same material, but the guide piece and movable piece may be formed using different materials.

In the impact-absorbing bodies of the embodiments, the movable piece and guide piece may be disposed so as to slope in the load input direction in order to facilitate movement in a specific direction.

The impact-absorbing device of the present invention can be used particularly advantageously in an automobile provided with a front bumper beam, a rear bumper beam, and the like.

Obviously, various minor changes and modifications of the present invention are possible in light of the above teaching. It is therefore to be understood that within the scope of the appended claims the invention may be practiced otherwise than as specifically described.

What is claimed is:

1. A device for absorbing an impact, comprising:

an impact-absorbing guide piece extending in a horizontal direction which is substantially orthogonal to a direction of input of the impact; and an impact-absorbing movable piece supported movably along the guide piece, wherein the movable piece is moved along a length of the guide piece when the impact has acted on the movable piece, and the guide piece and the movable piece are caused to deform to thereby absorb the impact.

2. The impact-absorbing device according to claim 1, wherein the guide piece comprises a core element for guiding an inside of the movable piece.

3. The impact-absorbing device according to claim 2, wherein the core element has a cross-sectional shape set such that a dimension in the impact input direction is greater than a dimension in a direction vertically orthogonal to the impact input direction.

4. The impact-absorbing device according to claim 1, wherein the movable piece has a helically wound external peripheral element.

5. The impact-absorbing device according to claim 4, wherein the external peripheral element has a predetermined space formed in adjacent wound portions, where a location of a single helically formed winding is taken to be a wound portion.

6. The impact-absorbing device according to claim 1, wherein the movable piece comprises a plurality of vane-form movable elements formed substantially in the form of a plate.

7. The impact-absorbing device according to claim 6, wherein the plurality of vane-form movable elements has a predetermined space formed between adjacent vane-form movable elements.

8. The impact-absorbing device according to claim 1, wherein the movable piece and the guide piece are each formed from a foam material.

9. The impact-absorbing device according to claim 8, wherein the movable piece is made of a same material as that of the guide piece, and the movable piece material has an expansion ratio set below that of the guide piece material.

10. The impact-absorbing device according to claim 1, wherein the movable piece is made of a resin material, and the guide piece is made of a foam material.

11. The impact-absorbing device according to claim 1, wherein the guide piece comprises a housing element designed to guide an external side of the movable piece.

12. The impact-absorbing device according to claim 11, wherein the movable piece comprises a helically wound member.

13. The impact-absorbing device according to claim 11, wherein the movable piece comprises:

a plurality of flat plate elements formed in the shape of a flat plate; and a soft part that is softer than the flat plate elements and disposed on an exterior side of an outermost flat plate selected from among the plurality of flat plate elements.

14. The impact-absorbing device according to claim 11, wherein the movable piece comprises a plurality of flat plate elements each in the shape of a flat plate; and one side of each of the flat plate elements comprises the soft part.

15. The impact-absorbing device according to claim 11, wherein the movable piece comprises a plurality of flat plate elements each in the shape of a flat plate; and each of the flat plate elements has a projection disposed on one side thereof.

16. The impact-absorbing device according to claim 1, wherein the movable piece is formed using a member that is harder than the guide piece.

* * * * *